US007751706B2

(12) United States Patent
Ooi et al.

(10) Patent No.: US 7,751,706 B2
(45) Date of Patent: Jul. 6, 2010

(54) CHROMATIC DISPERSION COMPENSATING APPARATUS

(75) Inventors: Hiroki Ooi, Kawasaki (JP); Takashi Iwabuchi, Sapporo (JP); Takafumi Terahara, Kawasaki (JP); Junichi Kumasako, Yasu (JP); George Ishikawa, Kawasaki (JP); Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/292,019

(22) Filed: Nov. 10, 2008

(65) Prior Publication Data

US 2009/0080894 A1 Mar. 26, 2009

Related U.S. Application Data

(62) Division of application No. 10/364,451, filed on Feb. 12, 2003, now Pat. No. 7,466,920.

(30) Foreign Application Priority Data

Mar. 29, 2002 (JP) .............................. 2002-098074

(51) Int. Cl.
*H04J 14/02* (2006.01)
*H04B 10/18* (2006.01)
(52) U.S. Cl. ......................................... 398/18; 398/147
(58) Field of Classification Search .................. 398/81, 398/147–150
See application file for complete search history.

(56) References Cited

U.S. PATENT DOCUMENTS

| 5,636,046 | A | 6/1997 | Ishikawa et al. ............ 398/147 |
| 5,943,151 | A * | 8/1999 | Grasso et al. ................ 398/147 |
| 6,754,420 | B2 * | 6/2004 | Tsuritani et al. ............. 385/123 |
| 6,823,108 | B1 | 11/2004 | Leisching ..................... 385/27 |
| 2002/0012162 | A1 | 1/2002 | Tanaka et al. |
| 2002/0015207 | A1 | 2/2002 | Ooi et al. |
| 2002/0021862 | A1 | 2/2002 | Zhou et al. |
| 2002/0093728 | A1 | 7/2002 | Sugaya et al. ............ 359/341.1 |
| 2002/0105719 | A1 * | 8/2002 | Tanaka et al. ............. 359/337.5 |
| 2006/0216035 | A1 * | 9/2006 | Nissov et al. ................ 398/148 |

FOREIGN PATENT DOCUMENTS

| DE | 199 13 374 | 10/2000 |
| EP | 0862285 | 9/1998 |
| JP | 10-276172 | 10/1998 |
| JP | 11-215058 | 8/1999 |

(Continued)

OTHER PUBLICATIONS

Morita, I., et al., "40 Gb/s Single-Channel Soliton Transmission Over Transoceanic Distances by Reducing Gordon-Haus Timing Jitter and Soliton-Soliton Interaction", Journal of Lightwave Technology, IEEE Service Center, New York, NY, US, vol. 17, No. 12, Dec. 1, 1999, pp. 2506-2511.

(Continued)

*Primary Examiner*—Leslie Pascal
(74) *Attorney, Agent, or Firm*—Staas & Halsey LLP

(57) ABSTRACT

In order to compensate for chromatic dispersion ad dispersion slope over an entire wavelength band of the optical signal, the wavelength band is split into a plurality of bands, and chromatic dispersion compensation is made to make chromatic dispersion in a central wavelength of each of the bands zero.

2 Claims, 41 Drawing Sheets

FOREIGN PATENT DOCUMENTS

| | | |
|---|---|---|
| JP | 2000-244402 | 9/2000 |
| JP | 2000-357993 | 12/2000 |
| JP | 2001-094511 | 4/2001 |
| JP | 2002-057622 | 2/2002 |
| JP | 2002-540676 | 11/2002 |

OTHER PUBLICATIONS

European Office Action issued Mar. 5, 2007 in corresponding European Patent Application No. 06 007 684.1-2415.
European Office Action issued Mar. 6, 2007 in corresponding European Patent Application No. 03 002 522.5-2415.
"Product Bulletin" WD1515 RR/RB Series Red/Blue Band-Split WDM Couplers, Nov. 1999.
"Product Bulletin" 100/200 GHz Active Interleavers IMC Series, Aug. 2001.
"Product Bulletin" IBC Interleaver 50/100 GHz, 100/200 GHz Passive Interleavers, Oct. 2001.
"Power Filter" Wavelength Separator, Wavelength Band Separator PFB Series, 2000.
JDS Uniphase, WD1515RR-A3 Specification, Nov. 8, 2001, p. 1 of 1.
JDS Uniphase, WD1515RR-A3 Specification, Nov. 8, 2001, p. 1-2.
C Band Red/Blue Pass Micro-Optic MWDMCR/CB Series, Oplink Communications, Inc. 2001-2002, pp. 53-54.
Band Wavelength Division Multiplexers, BWDM Series, Oplink Communications, Inc. 2001-2002 pp. 35-36.
M. Shirasaki, et al., Variable Dispersion Compensator Using the Virtually Imaged Phased Array (VIPA) For 40-Gbit/s WDM Transmission Systems, 2000.
"Power Filter" Wavelength Separator/Data Sheet, Wavelength Band Separator PFB Series, 2000.
Office Action for U.S. Appl. No. 10/364,541, filed Mar. 28, 2006.
Office Action for U.S. Appl. No. 10/364,541, filed May 30, 2006.
Final Office Action for U.S. Appl. No. 10/364,541, filed Dec. 7, 2006.
Advisory Action for U.S. Appl. No. 10/364,541, filed Jul. 5, 2007.
Office Action for U.S. Appl. No. 10/364,541, filed Sep. 27, 2007.
Office Action for U.S. Appl. No. 10/364,541, filed Feb. 19, 2008.
Notice of Allowance for U.S. Appl. No. 10/364,541, filed Aug. 11, 2008.
Search Report for corresponding European Application 03002522.5; dated Feb. 6, 2006.
European Search Report issued Aug. 16, 2006 in European Application 06007684.1-2415.
Notice of Rejection Grounds for the corresponding Japanese Application 2002-098074; mailed Dec. 5, 2006.
Japanese Office Action of Application JP2002-09874; dated May 15, 2007.
Chinese Patent Office Action, mailed Apr. 11, 2008 and issued in corresponding Chinese Application 2005101031169.
Office Action for Parent U.S. Appl. No. 10/364,451; mailed Mar. 28, 2006.
Office Action for Parent U.S. Appl. No. 10/364,451; mailed May. 30, 2006.
Final Office Action for Parent U.S. Appl. No. 10/364,451; mailed Dec. 7, 2006.
Advisory Action for Parent U.S. Appl. No. 10/364,451; mailed Jul. 5, 2007.
Office Action for Parent U.S. Appl. No. 10/364,451; mailed Sep. 27, 2007.
Office Action for Parent U.S. Appl. No. 10/364,451; mailed Feb. 19, 2008.
Notice of Allowance for Parent U.S. Appl. No. 10/364,451; Aug. 11, 2008.
Chinese Office Action for corresponding Chinese Application 200510103116.9; issued Jan. 8, 2010.

* cited by examiner

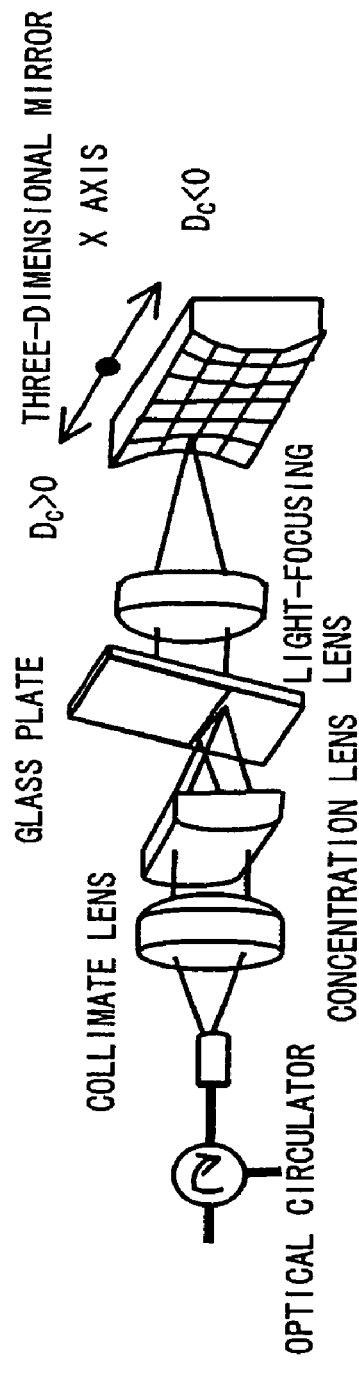
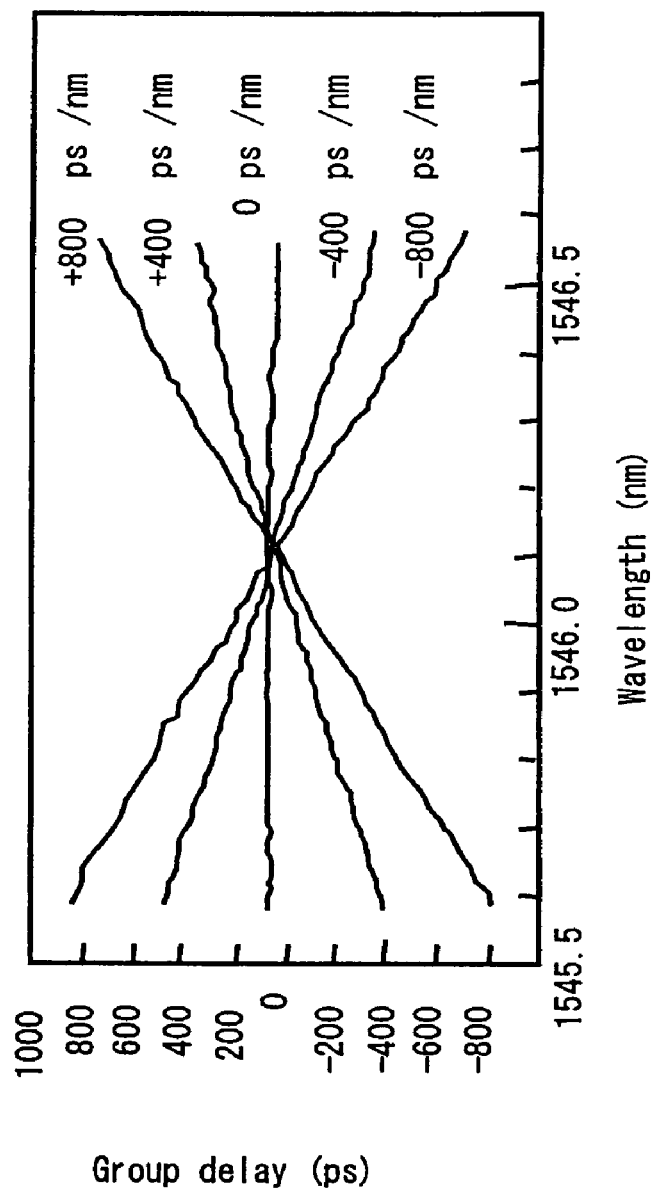
FIG. 5 PRIOR ART

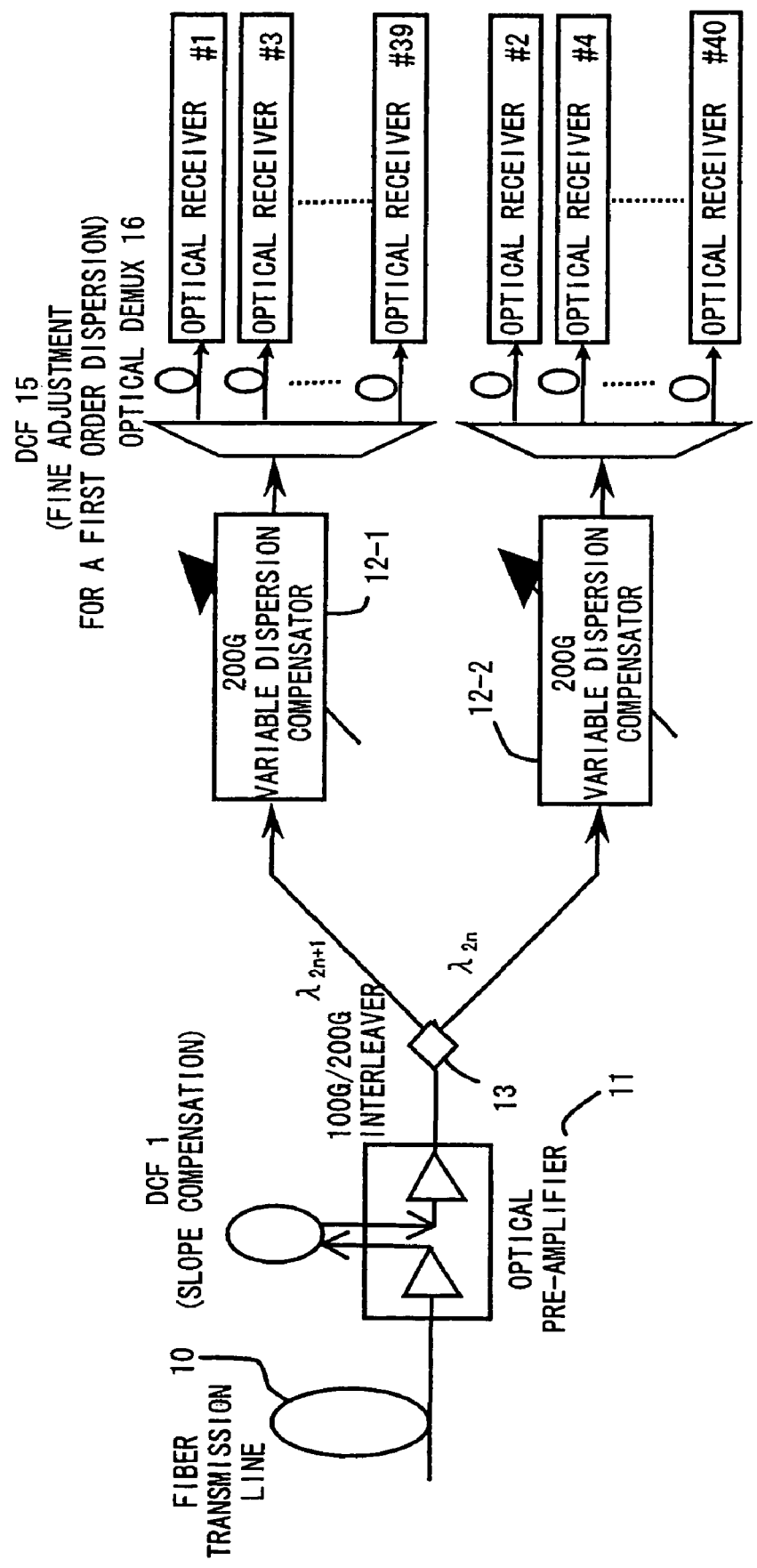
F I G. 24

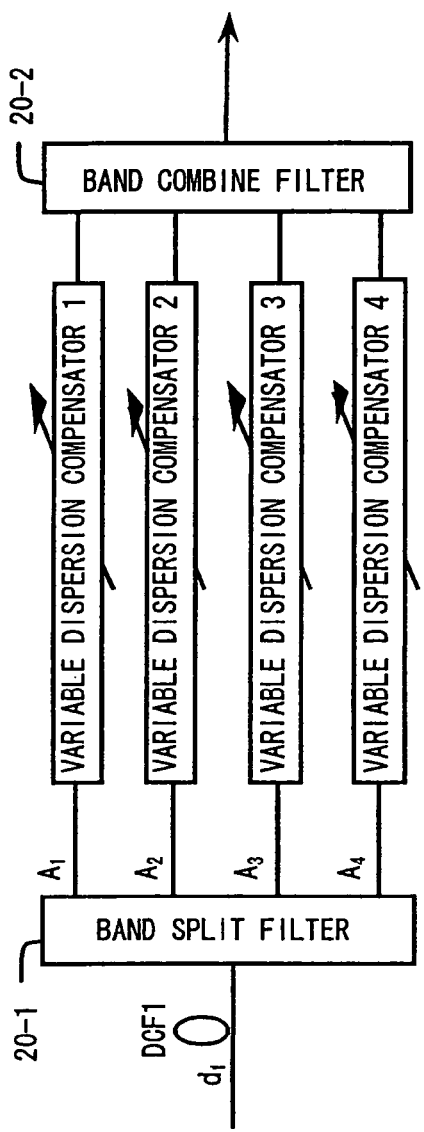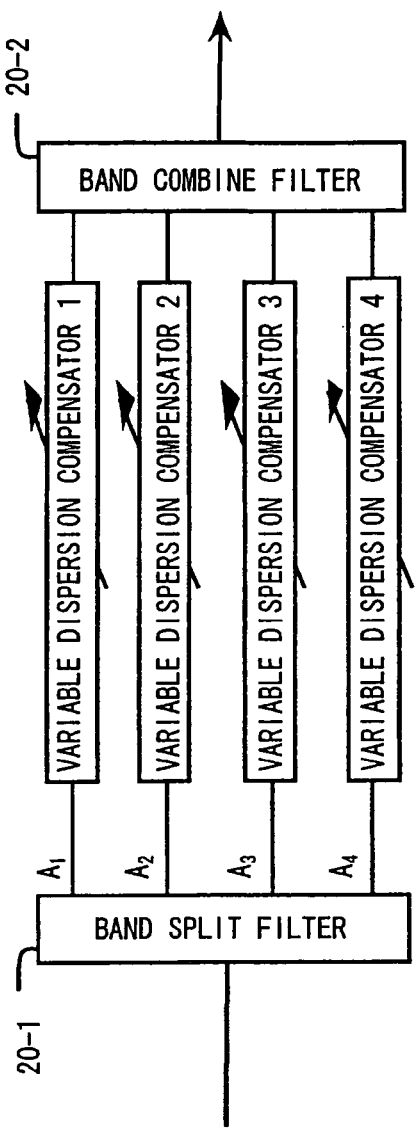

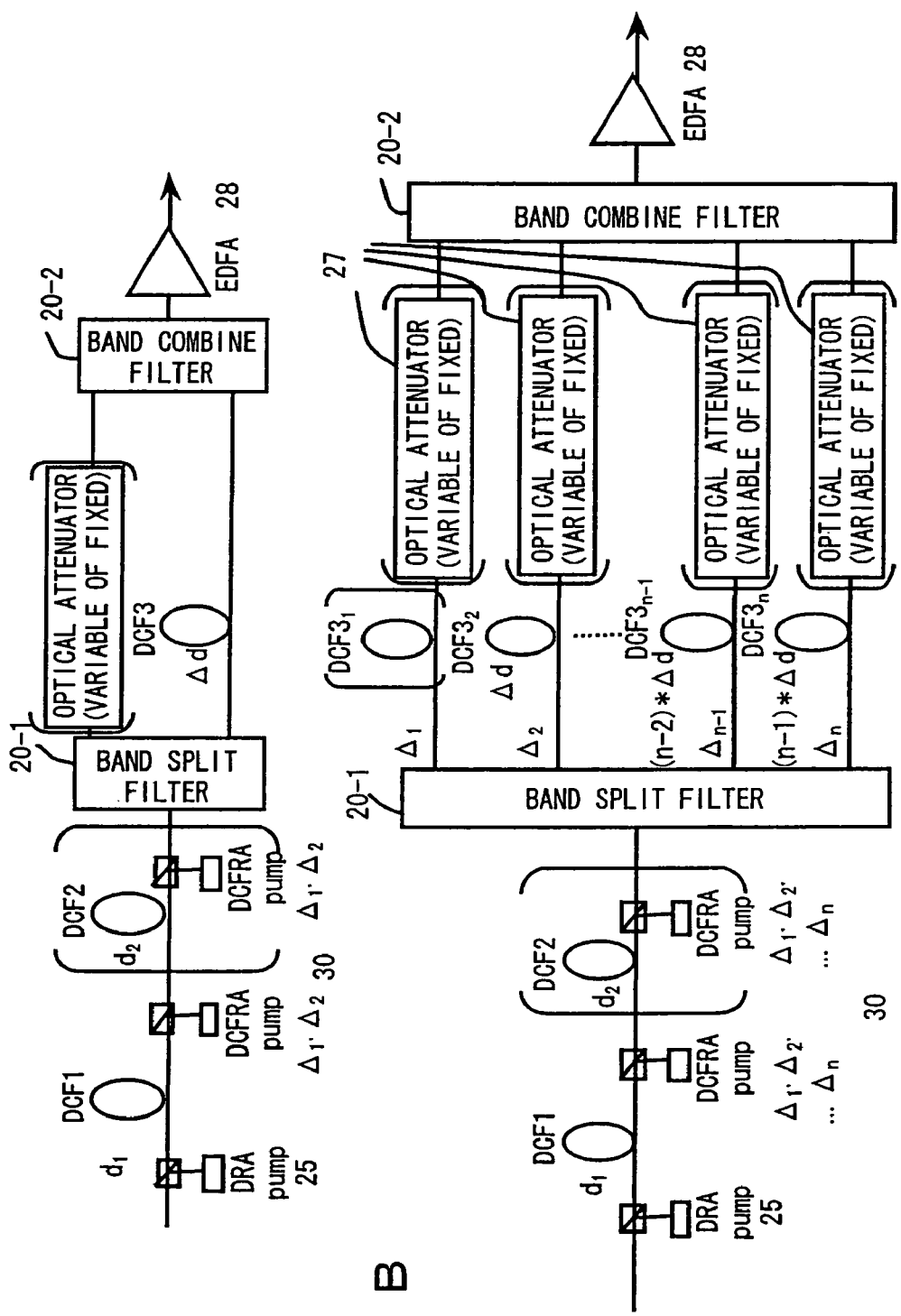
F I G. 31A
F I G. 31B

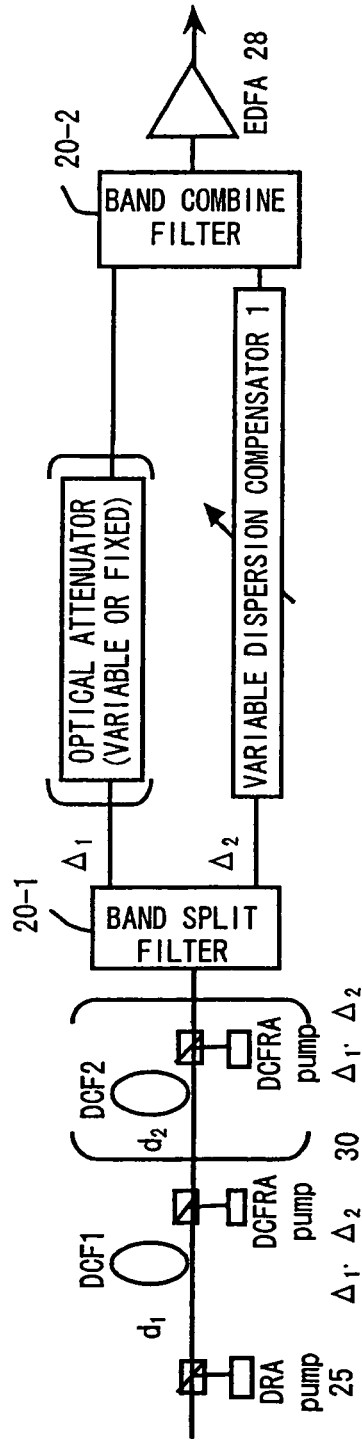
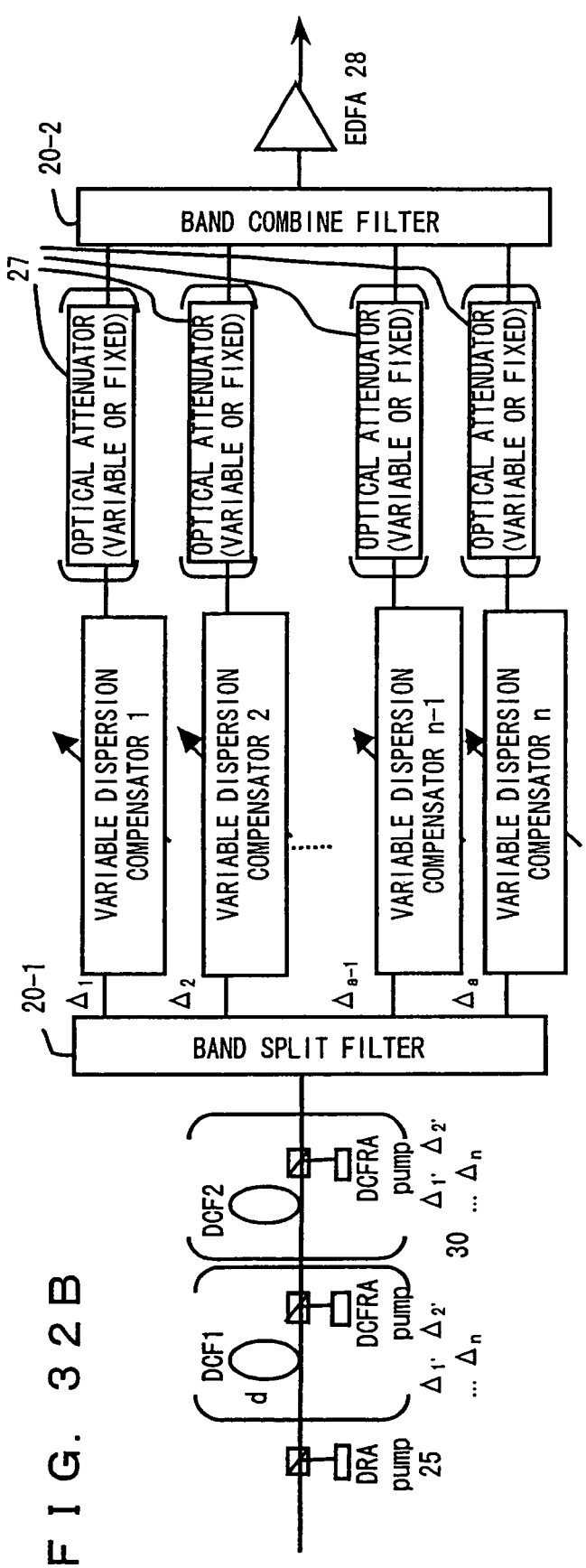
FIG. 32A
FIG. 32B

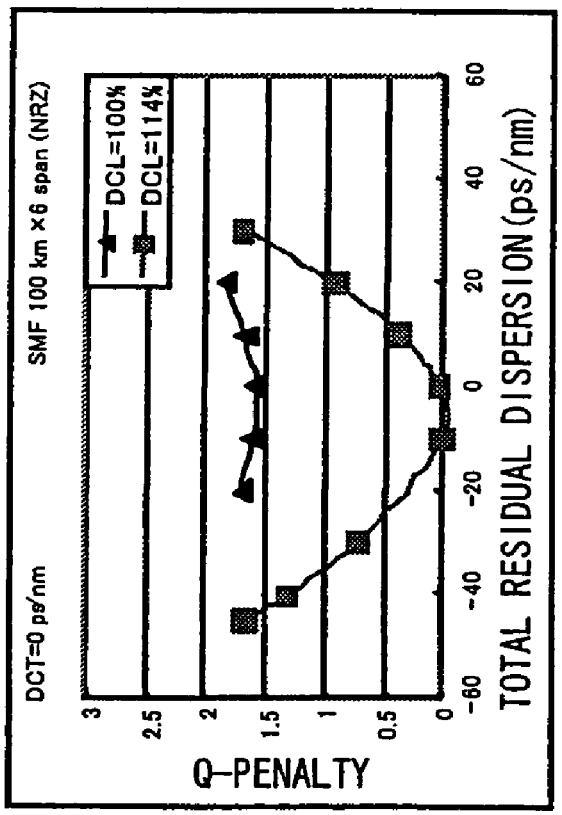
FIG. 37A
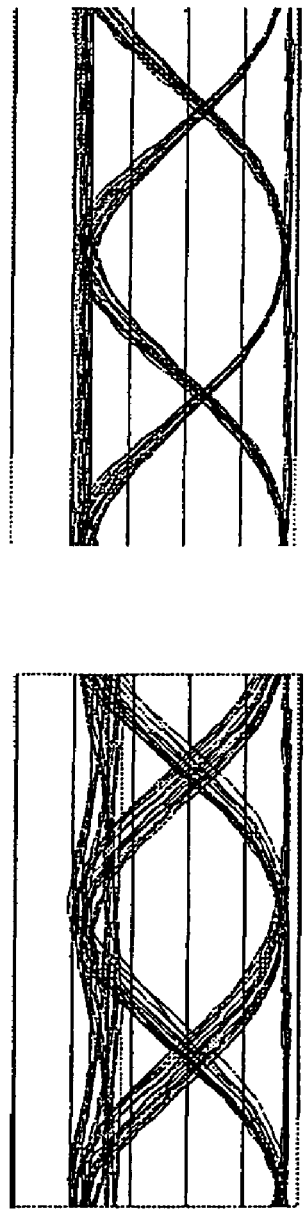
FIG. 37C
FIG. 37B

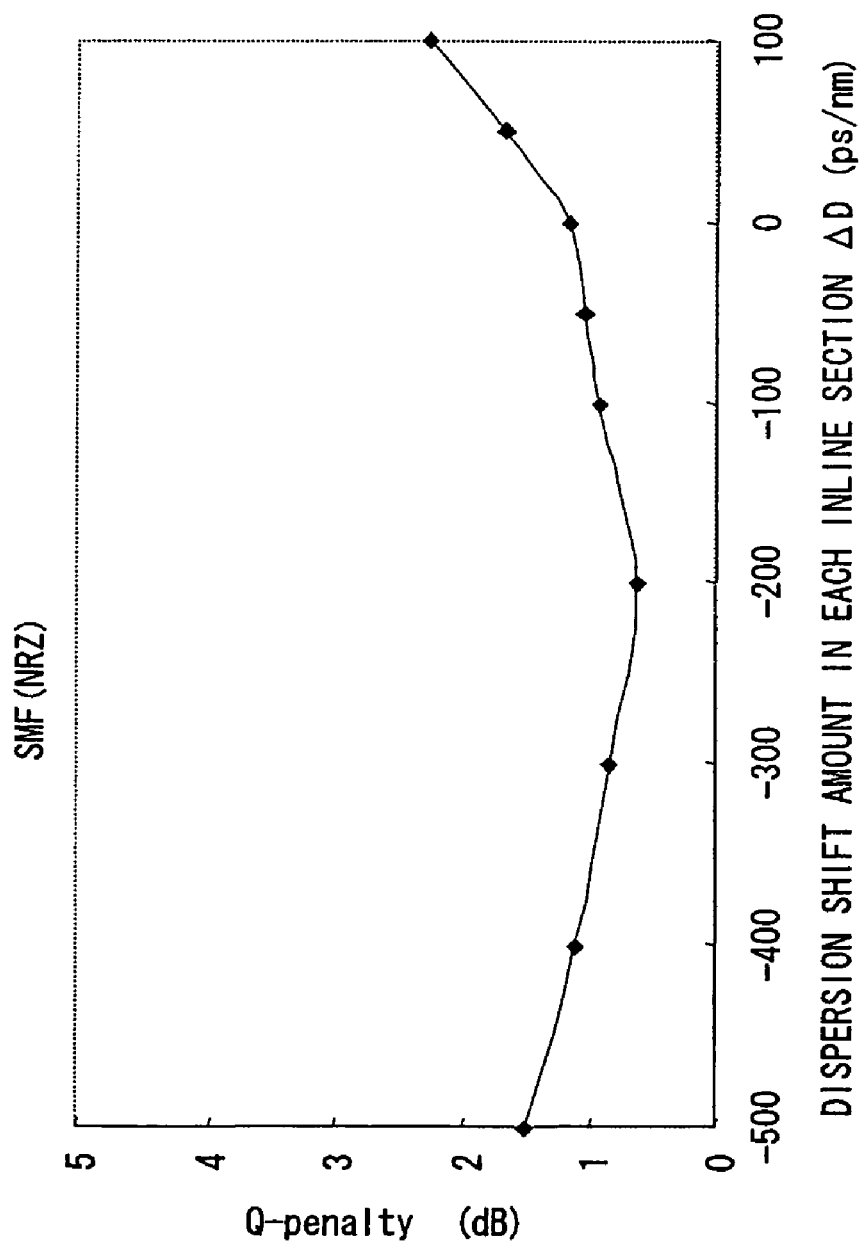
F I G. 38

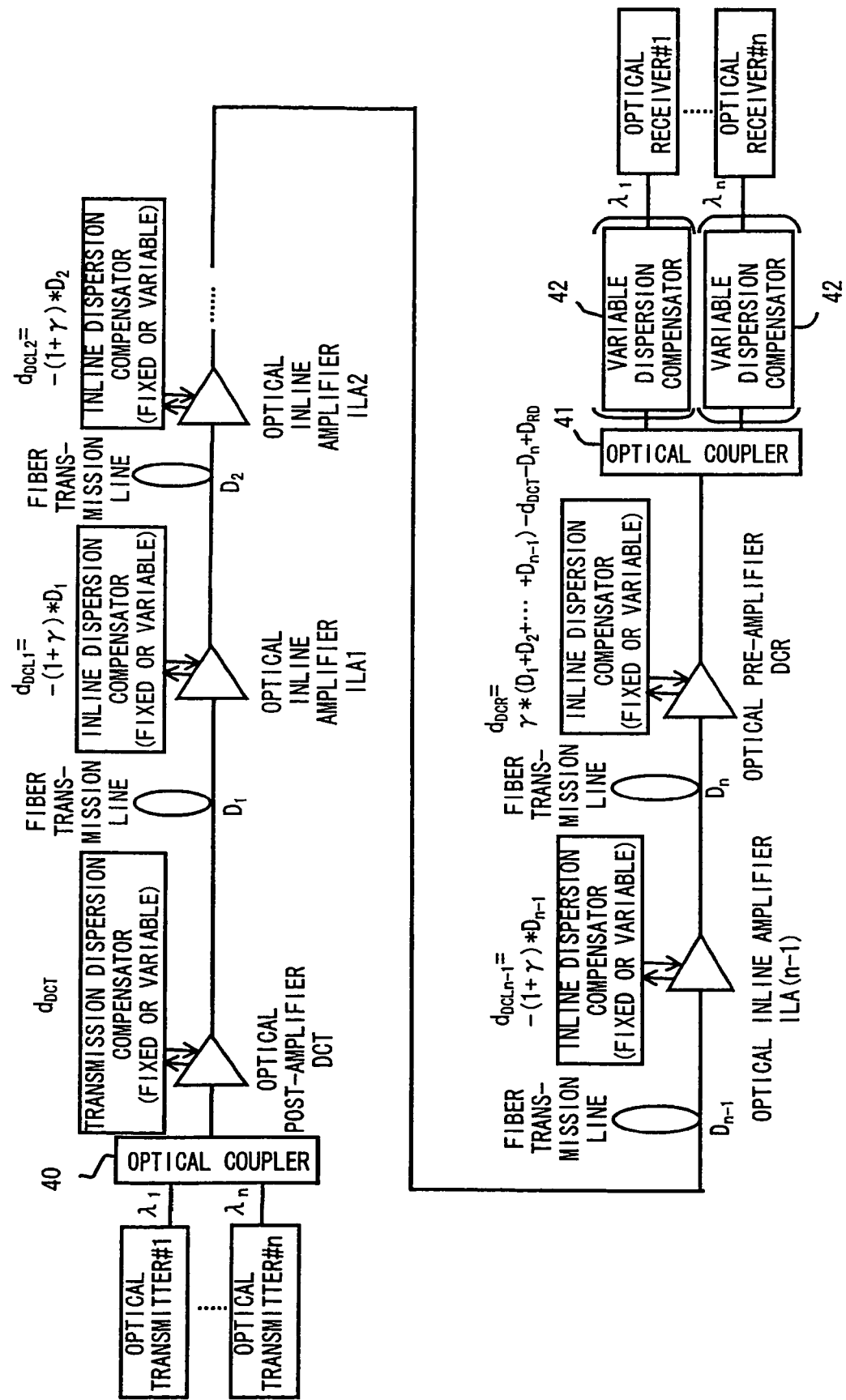
F I G. 3 9

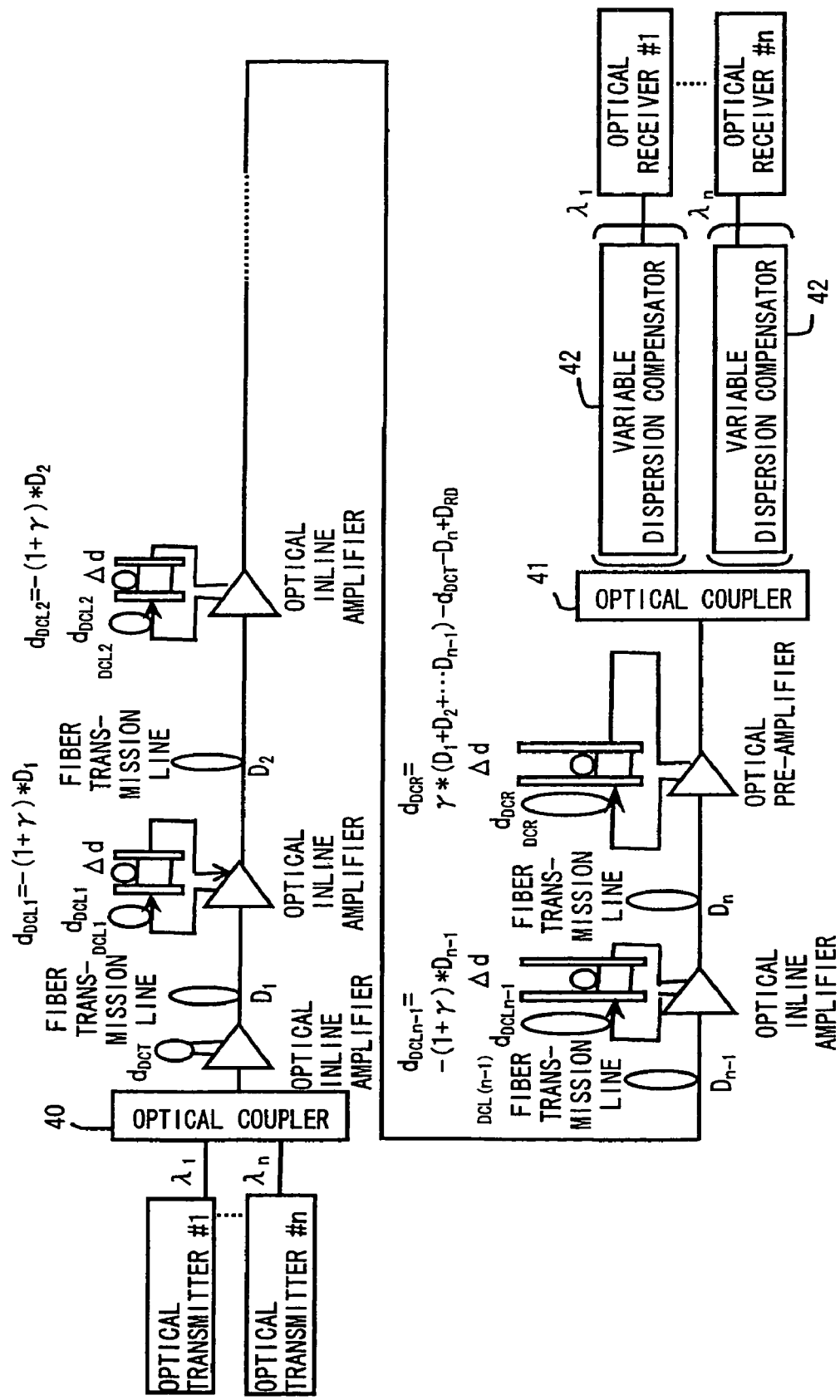
F I G. 41

CHROMATIC DISPERSION COMPENSATING APPARATUS

CROSS-REFERENCE TO RELATED APPLICATIONS

This application is a divisional of Ser. No. 10/364,451, filed on Feb. 12, 2003, now U.S. Pat. No. 7,466,920 the disclosure of which is incorporated here in by reference.

BACKGROUND OF THE INVENTION

1. Field of the Invention

The present invention relates to a chromatic dispersion compensating apparatus for further increasing the capacity, the speed, and the distance of an optical communications system hereafter.

2. Description of the Related Art

With the sharply growing network use in recent years, the demand for further increasing the capacity of a network has been rising. Currently, a wavelength multiplexing (WDM) optical transmission system on a basis of a transmission rate of 10 Gb/s per channel has been put into practical use. Hereafter, a further increase in the capacity is expected to be required, and an ultrahigh-speed transmission system of 40 Gb/s or faster per channel is demanded from the viewpoints of frequency use efficiency and cost. In an ultrahigh-speed transmission system, wavelength degradation caused by dispersion of a transmission line must be compensated with high accuracy.

In an optical transmission system having a transmission rate of 10 Gb/s or faster, a chromatic dispersion tolerance is very small. For example, the chromatic dispersion tolerance of a 40-Gb/s NRZ system is equal or smaller than 100 ps/nm. In the meantime, for a terrestrial optical transmission system, span length are not always uniform. In the case of a system using a 1.3-μm zero dispersion single mode fiber (SMF) of approximately 17 ps/nm/km, a chromatic dispersion tolerance is exceeded if the length differs only several kms. However, in an optical fiber network possessed by a communications carrier, most span length and chromatic dispersion values are not accurately grasped at present. Additionally, since a chromatic dispersion value changes with time depending on a fiber temperature, stress, etc., a dispersion compensation amount for each span must be adjusted not only at the start of system operations but also in system use while strictly monitoring a chromatic dispersion amount. For example, a temperature change of 100° C. occurs on a 500-km DSF (Dispersion Shifted Fiber) transmission line, its chromatic dispersion change amount becomes approximately 105 ps/nm that is almost equal to a chromatic dispersion tolerance of a 40-Gb/s NRZ signal.

(chromatic dispersion change amount) =

(temperature dependency of a zero dispersion wavelength) ×

(temperature change amount of a transmission line) ×

(dispersion slope of the transmission line) × (transmission distance) =

0.03 (nm/° C.) × 100 (° C.) × 0.07 (ps/nm$^2$/km) × 500 (km) =

105 ps/nm.

Therefore automatic dispersion compensation is essential for a system using not only an SMF transmission line, but also a 1.55-μm zero dispersion shifted fiber (DSF) or an NZ-DSF transmission line.

Furthermore, when a wavelength-division multiplexed (WDM) signal is transmitted, a dispersion slope as well as chromatic dispersion must be considered.

FIG. 1 exemplifies the configuration of a WDM transmission system. FIG. 2 shows a change in a chromatic dispersion amount of a transmission line due to various change factors.

In the configuration shown in FIG. 1, optical signals of respective wavelengths are transmitted from optical transmitters #1 to #n of a transmitting end station device, and coupled by an optical multiplexer. The multiplexed optical signal is amplified and output by an optical post-amplifier. When the process for amplifying the optical signal is performed by the optical post-amplifier, dispersion compensation is made for the optical signal by a transmission dispersion compensator in the transmitter, whose dispersion compensation amount is fixed or variable. The optical signal which propagates over a fiber transmission line is amplified so that a transmission line loss is compensated by an optical inline amplifier, which exists partway of the fiber transmission line. Additionally, chromatic dispersion that the optical signal undergoes as a result of propagating over the transmission line is compensated by an inline dispersion compensator, when the amplification is made by the optical inline amplifier. The dispersion compensation amount of the inline dispersion compensator may be fixed or variable. Furthermore, the optical signal is propagated over the fiber transmission line via an inline amplifier, and input to an optical receiver.

In the optical receiver, the propagated optical signal is amplified so that its attenuation is compensated. At this time, dispersion compensation also at the receiver side is made by a reception dispersion compensator in the receiver. Then, the propagated optical signal is split into respective wavelengths by an optical demultiplexer. For example, variable dispersion compensators remove residual dispersion from the optical signals of the demultiplexed wavelengths, and the signals are received by optical receivers #1 to #n. Here, the reason why the variable dispersion compensators are enclosed by brackets is that they are not always necessary. Whether or not the variable dispersion compensator is included can be determined by a designer depending on the details of a design. If a constituent element is enclosed by brackets also in the subsequent configuration drawings, it means that the constituent element is not always required to be included at the discretion of a designer.

For a temperature change in the chromatic dispersion of an optical signal, a chromatic dispersion characteristic (a) shifts to (c) according to a temperature change (approximately 0.03 nm/° C.) in a zero dispersion wavelength as shown in FIG. 2. In this case, a dispersion slope does not change. Additionally, if a transmission distance is different, the chromatic dispersion characteristic (a) changes to (b). In this case, also the dispersion slope changes with the dispersion amount. For an actual transmission line fiber (and a dispersion compensation fiber (DCF)), the chromatic dispersion value ((a)→(c)), and the dispersion slope ((a)→(d)) have variations due to a problem of a fiber manufacturing ability, even if the length of a transmission line is the same.

As a means for compensating for chromatic dispersion and a dispersion slope, the following methods are considered.

(a) Implementing a broadband variable dispersion compensator that can independently vary a chromatic dispersion amount and a dispersion slope amount, and making dispersion compensation simultaneously for signals of all of wavelengths.

(b) Independently arranging a broadband variable dispersion compensator that can vary a chromatic dispersion amount, and a broadband variable dispersion slope compensator that can vary a dispersion slope amount, and making dispersion compensation collectively for signals of all of wavelengths.

(c) Independently arranging a broadband variable dispersion compensator that can vary a chromatic dispersion amount, and a fixed dispersion slope compensator whose dispersion slope amount compensates a slope amount of a transmission line, and making dispersion compensation simultaneously for signals of all of wavelengths.

(d) Individually arranging for each channel a variable dispersion compensator that can vary a chromatic dispersion amount, and making dispersion compensation.

The most important point in the methods (a) to (d) is the practicability of a variable dispersion compensator.

FIG. 3 shows a VIPA (Virtually Imaged Phased Array) as an example of a variable dispersion compensator. As documents about a VIPA, please see M. Sirasaki et al., "Variable Dispersion Compensator Using the Virtually Imaged Phased Array (VIPA) for 40-Gbit/s WDM Transmission System", ECOC 2000, Post-deadline paper 2.3., etc.

In a dispersion compensator using a VIPA, a dispersion compensation amount can be successively changed in a range from −800 ps/nm to +800 ps/nm by moving a three-dimensional mirror in the direction of an x axis.

FIG. 4 shows a transmittance characteristic and a group delay characteristic of a VIPA variable dispersion compensator.

The transmittance characteristic shown in an upper portion of this figure exhibits a periodical wavelength dependence of transmittance in a VIPA. Accordingly, a design must be made so that optical signals of respective wavelengths of wavelength multiplexed light (WDM light) pass through a high portion of the transmittance, namely, a transmittance window. Additionally, the figure of the group delay represents that the group delay is periodically given to an optical signal. It is proved from this figure that the slope of the group delay in a portion where the transmittance window is opened is decreasing on the right, and negative dispersion is given to an optical signal that passes through the window. For example, a VIPA is designed to have a cyclic structure where a transmission characteristic has a frequency interval (free spectral range: FSR) of 200 GHz (wavelength interval is 1.6 nm), and advantageous to simultaneously compensate for a WDM signal. However, the VIPA cannot compensate for a dispersion slope. A system implemented by combining a VIPA dispersion compensator and a dispersion compensation fiber in order to collectively compensate for the dispersion compensation and the dispersion slope is proposed by Japanese Patent Application No. 2000-238349.

FIG. 5 shows the group delay characteristic of a VIPA variable dispersion compensator in a channel passband.

In a variable dispersion compensator using a VIPA shown in an upper portion of FIG. 5, changes in the slope of a group delay shown in a lower portion of FIG. 5 are obtained by moving a three-dimensional mirror in the direction of an x axis. Dispersion is obtained by differentiation of wavelengths of a group delay. Therefore, simultaneous dispersion compensation can be varied and made depending on need for all of channel bands by moving the three-dimensional mirror.

FIG. 6 exemplifies the configuration of an optical receiver according to a conventional technique.

In the configuration example shown in this figure, a DCF whose dispersion slope amount (a dispersion slope of a transmission line) arranged to compensate for a dispersion slope of the transmission line. Furthermore, chromatic dispersion caused by the transmission line and the DCF is collectively compensated by using a VIPA variable dispersion compensator. As shown in FIG. 4, the VIPA has the periodical structure of 200 GHz intervals in order to secure a transmission band. In a current dense WDM transmission system, 100 GHz channel spacing (wavelength interval of 0.8 nm) is demand. Accordingly, in FIG. 6, a received signal of 100-GHz spacings is separated into even- and odd-numbered channels of 200-GHz intervals by using an interleaver, and dispersion compensation is simultaneously made by arranging VIPA dispersion compensators respectively for the even- and odd-numbered channels. As shown in FIG. 7, a transmittance window of the interleaver is opened in predetermined cycles (200 GHz in this case). A solid line shown in this figure is a window for extracting odd-numbered channels, whereas a dotted line shown in this figure is a window for extracting even-numbered channels. As described above, the interleaver alternately samples a wavelength multiplexed optical signal, and separates the optical signal into even- and odd-numbered channels, so that the channel intervals of the optical signal after being separated are widened.

However, this configuration has a problem stemming from the wavelength dependency of a dispersion slope of a transmission line and a DCF, leading to a difficulty in simultaneous dispersion compensation.

FIG. 8 shows a typical example of a dispersion characteristic on a fiber transmission line.

Mainly on a DCF, a dispersion curve derived from the wavelength dependency of a dispersion slope occurs due to a manufacturing problem (however, an almost linear dispersion characteristic is possessed in a transmission fiber). Accordingly, residual dispersion derived from the wavelength dependency of a dispersion slope occurs on a transmission line and a DCF. In a long-haul transmission, this residual dispersion becomes a value that exceeds the dispersion tolerance of a 40-Gb/s signal. Therefore, simultaneous compensation is difficult with the configuration of FIG. 6 itself.

Also an implementation of a dispersion monitor for detecting a chromatic dispersion amount (and a slope amount), which a transmission line undergoes, is important to realize an automatic dispersion compensating system.

As an example of a dispersion monitor method, there is a method using the intensity of a particular frequency component within a received baseband signal.

FIG. 9 shows a result of detecting the intensity of a 40-GHz component within a received baseband signal of a 40-Gb/s NRZ signal. Source: Y Akiyama et al., "Automatic Dispersion Equalization in 40 Gbit/s Transmission by Seamless-switching between Multiple Signal Wavelengths", ECOC '99, pp. 1-150-151.

As is known from a calculation result shown on the left side, the intensity of a 40-GHz component varies with a chromatic dispersion amount, and becomes zero when the dispersion amount is zero. In an experimental result of a 100-km DSF transmission on the right side, the dispersion amount of a transmission line varies with a wavelength. Therefore, the intensity characteristic of a 40-GHz component is obtained in a similar manner as in the calculation result. A zero dispersion wavelength of the transmission line varies with a change in the temperature of the transmission line by approximately 0.03 nm/° C. However, it can be verified that also the minimum point of an intensity monitor of the 40-GHz component varies with that change. It is known that the intensity of a B Hz component is available as a chromatic dispersion monitor for a B b/s modulation signal also with other modulation methods. It is known, for example, when chromatic dispersion is zero, the intensity of a B Hz component becomes a maximum for an RZ signal, and becomes a minimum for an OTDM signal (Japanese Patent Application No. Hei 9-224056).

As another means, a method monitoring a bit error rate characteristic or a Q value, which is detected by each optical receiver, is considered.

To implement a low-cost dispersion monitor in a wavelength multiplexing system, a method arranging a dispersion monitor is important. For example, in the case of (a) or (b) shown in FIG. 2, if chromatic dispersion amounts of at least two signals such as signals of wavelengths at both ends of a signal wavelength band can be detected, a dispersion slope can be learned by extrapolation, and a chromatic dispersion amount of a different signal wavelength can be detected.

Additionally, in the case of (c), the dispersion slope amount of the transmission line does not vary with a temperature change. Therefore, if a chromatic dispersion amount of at least one signal such as a central wavelength signal, etc. of a signal wavelength band can be detected, a chromatic dispersion amount of a different signal wavelength can be detected from the chromatic dispersion amount and the known dispersion slope amount.

Also in the case of (d), a chromatic dispersion amount of a different signal wavelength can be detected by extrapolation, if a chromatic dispersion value of at least one wavelength signal can be detected when a dispersion slope amount (or the length of a transmission line) is known, or if chromatic dispersion values of at least two wavelength signals can be detected when the dispersion slope amount is unknown.

The above described problems of conventional techniques are summarized below.

In an optical transmission system having a transmission rate of 10 Gb/s or faster, a chromatic dispersion tolerance is very small. For example, the chromatic dispersion tolerance of a 40-Gb/s NRZ system is equal to approximately 100 ps/nm or smaller. In the meantime, for the chromatic dispersion of a transmission line, the following change factors exist. If a wavelength-division multiplexed (WDM) signal is transmitted, not only chromatic dispersion but also a dispersion slope must be considered.

(1) Difference in the Length of a Transmission Line

For a terrestrial optical transmission system, lengths of its span length are not always uniform. In the case of a system using a 1.3-μm zero dispersion single-mode fiber (SMF) of approximately 17 ps/nm/km, a chromatic dispersion tolerance is exceeded if the length is different by only several kilometers. However, in an optical fiber network possessed by a communications carrier, most span length and chromatic dispersion values are not accurately grasped at present. As shown in FIG. 2, the chromatic dispersion characteristic (a) changes to (b) if a transmission distance is different. In this case, also the dispersion slope as well as the dispersion amount changes.

(2) Incompleteness of a Slope Compensation Ratio of a Dispersion Compensation Fiber (DCF)

To make dispersion compensation and dispersion slope compensation simultaneously for a wavelength multiplexed signal, a dispersion compensating fiber (DCF) having a dispersion slope rate (dispersion slope coefficient/chromatic dispersion coefficient) that matches a transmission line must be used. However, especially for an NZDSF fiber (such as Enhanced LEAF, TrueWave Plus, TrueWave Classic, etc.) having a small chromatic dispersion coefficient, a DCF that can be manufactured is only a DCF whose slope compensation ratio is as low as 50 to 60 percent.

FIG. 10 shows fluctuations of chromatic dispersion on a transmission line due to dispersion slope variations.

In this figure, to compensate for a dispersion slope characteristic (a) of the transmission line by 100 percent, it is ideal that a DCF matches a characteristic (a)' of its reverse sign. Actually, however, a slope compensation ratio as high as (a)' cannot be obtained, and the ratio becomes like (b). As a result, residual dispersion indicated by (c) occurs on the transmission line and the DCF.

(3) Manufacturing Variations of a Chromatic Dispersion Coefficient and a Dispersion Slope Coefficient of a Transmission Line Fiber and a Dispersion Compensating Fiber (DCF)

Since a chromatic dispersion coefficient (chromatic dispersion amount per unit length. The unit is ps/nm/km), and a dispersion slope coefficient (chromatic dispersion slope per unit length. The unit is $ps/nm^2/km$) of a transmission line and a dispersion compensating fiber (DCF) reach the limits of manufacturing accuracy, they have relatively large variations. Therefore, as shown in FIG. 2, the chromatic dispersion amount (the unit is ps/nm. (a)→(c), –(a)→(b)'), and the dispersion slope amount (the unit is $ps/nm^2$, ((a)→(d), –(a)→(d)')) vary, even if the lengths of the transmission line and the DCF are the same.

(4) Temperature Change in a Zero Dispersion Wavelength of a Fiber

Since the zero dispersion wavelength of a transmission line fiber changes with time depending on a temperature, a dispersion compensation amount for each span must be suitably set while strictly monitoring a chromatic dispersion amount not only at the start of system operations, but also in system use.

For example, if a temperature change of 100° C. occurs on a 600-km transmission line, a chromatic dispersion change amount becomes approximately 108 ps/nm, which is almost equal to the chromatic dispersion tolerance of a 40-Gb/s NRZ signal.

$$\text{(chromatic dispersion change amount)} =$$
$$\text{(temperature dependency of zero dispersion wavelength)} \times$$
$$\text{(temperature change amount of transmission line)} \times$$
$$\text{(dispersion slope of transmission line)} \times \text{(transmission distance)} =$$
$$0.03 \text{ (nm/° C.)} \times 100° \text{ C.} \times 0.06 \text{ } (ps/nm^2/km) \times 600 \text{ (km)} = 108 \text{ ps/nm}$$

In FIG. 2, the chromatic dispersion characteristic (a) changes to (c) due to a temperature change (approximately 0.03 nm/° C.) of the zero dispersion wavelength. In this case, the dispersion slope does not vary.

(5) Influence of the Wavelength Dependency of a Transmission Line Fiber and a DCF As shown in FIG. 8, a dispersion curve derived from the wavelength dependency of a dispersion slope occurs due to a problem of design principle also on a transmission line, mainly on a DCF (the transmission fiber has an almost linear dispersion characteristic). Accordingly, residual dispersion derived from the wavelength dependency of the dispersion slope occurs on the transmission line and the DCF. In a long-haul transmission, this residual dispersion becomes a large value that exceeds the dispersion tolerance of a 40-Gb/s signal. This becomes a serious problem when dispersion compensation is made collectively for all of channels.

Measures according to a known technique is as follows. A variable dispersion compensator must be applied to cope with time-varying chromatic dispersion fluctuations in (4). As an example of the variable dispersion compensator, the VIPA shown in FIG. 3 exists. As a method arranging a variable dispersion compensator, there are a method making compensation simultaneously for all of channels by also comprising a slope compensation function, a method making compensation simultaneously for all of channels by combining with a variable or fixed dispersion slope compensator, or a method arranging a variable dispersion compensator for each channel (see Japanese Patent Application No. 2000-238349) is considered.

SUMMARY OF THE INVENTION

An object of the present invention is to provide a chromatic dispersion compensating apparatus that can minimize residual dispersion as much as possible at possibly lowest cost, and its arrangement configuration.

A first chromatic dispersion compensating apparatus according to the present invention, in a wavelength multiplexed optical transmission system, comprises: a band splitting unit splitting a wavelength multiplexed optical signal into a plurality of wavelength bands; and a fixed dispersion compensating unit making compensation for residual dispersion for split wavelength multiplexed optical signals.

A second chromatic dispersion compensating apparatus according to the present invention, in a wavelength multiplexed optical transmission system, comprises: a band spitting unit splitting a wavelength multiplexed optical signal into a plurality of wavelength bands; and a variable dispersion compensating unit making compensation simultaneously for split wavelength multiplexed optical signals.

A third chromatic dispersion compensating apparatus according to the present invention, in a wavelength multiplexed optical transmission system, comprises: a variable dispersion compensating unit making dispersion compensation simultaneously for a whole or part of a wavelength multiplexed optical signal; an optical splitting unit splitting the wavelength multiplexed optical signal; and a fixed dispersion compensating unit making compensation for residual dispersion of an optical signal of each split channel.

A fourth chromatic dispersion compensating apparatus, in a wavelength multiplexed optical transmission system, comprises: a band splitting unit splitting a wavelength multiplexed optical signal into a plurality of wavelength bands; and a dispersion compensating unit reducing a residual dispersion difference between bands for respective split wavelength bands.

A fifth chromatic dispersion compensating apparatus, in a multi-span optical transmission system, comprises a dispersion compensating unit making 105- to 120-percent over-compensation for a chromatic dispersion amount of each span in each inline amplifier after span.

According to the present invention, an efficient and effective chromatic dispersion compensating apparatus and a method thereof can be provided at low cost.

BRIEF DESCRIPTION OF THE DRAWINGS

FIG. 5 shows a group delay characteristic of a VIPA variable dispersion compensator;

FIG. 24 exemplifies a twelfth configuration of the preferred embodiment according to the present invention;

FIGS. 28A and 28B show the configurations in the case where fixed dispersion compensators for respective wavelength bands are replaced by variable dispersion compensators in correspondence with FIG. 25;

FIGS. 31A and 31B exemplify the configurations of a specific inline amplifier in the case where wavelength band split compensation is made (No. 3);

FIGS. 32A and 32B exemplify the configurations of a specific inline amplifier in the case where wavelength band split compensation is made (No. 4);

FIGS. 37A to 37C show a Q penalty for residual dispersion in the case of an inline dispersion compensation ratio $D_{DCL}=100$ percent and 114 percent in a 600-km SMF transmission;

FIG. 38 shows a Q penalty characteristic against an inline residual dispersion amount in the case where residual dispersion is made zero by adjusting a dispersion compensation amount at a receiver side in each case in a 600-km SMF transmission;

FIG. 39 exemplifies a first configuration corresponding to a preferred embodiment for optimizing an inline dispersion compensation amount;

FIG. 41 exemplifies the configuration implemented by combining band split dispersion compensation and inline over-compensation.

DESCRIPTION OF THE PREFERRED EMBODIMENTS

In preferred embodiments according to the present invention, dispersion compensation is made by splitting a wavelength band into predetermined bands, if residual dispersion derived from the wavelength dependency of a dispersion slope of a transmission line and a DCF is too large to be ignored.

Figure 1:
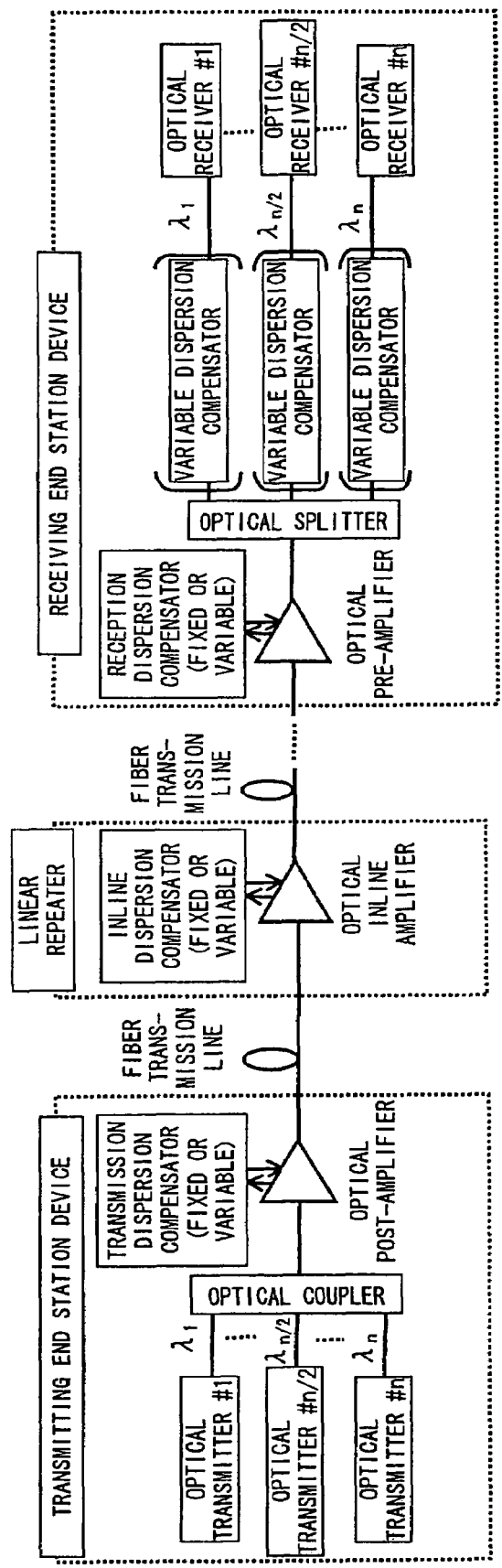
FIG. 1 exemplifies the configuration of a wavelength multiplexing transmission system.
Figure 2:
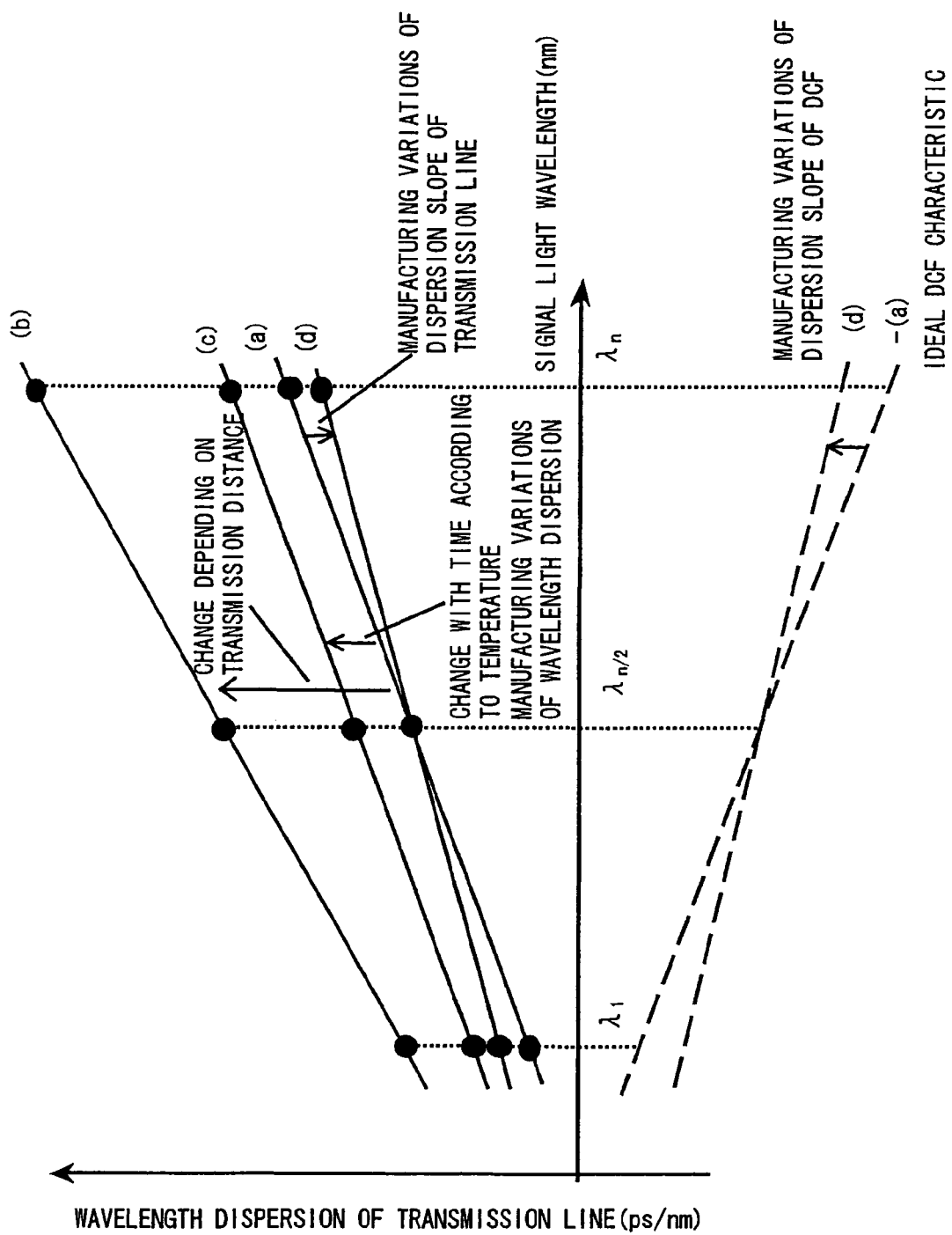
FIG. 2 shows changes in a chromatic dispersion amount of a transmission line due to various change factors.
Figure 3:
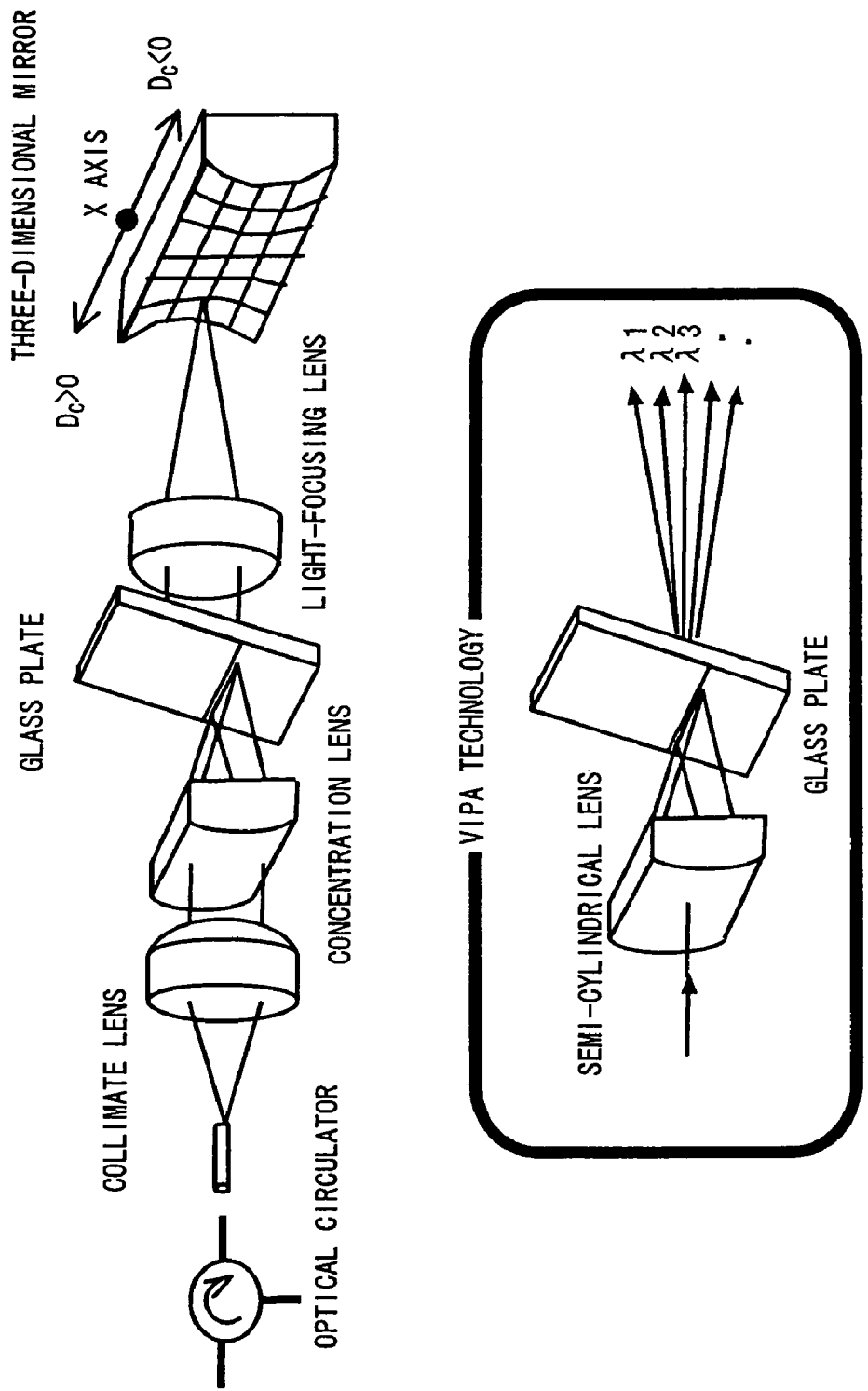
FIG. 3 shows a VIPA (Virtually Imaged Phased Array) as an example of a variable dispersion compensator.
Figure 4:
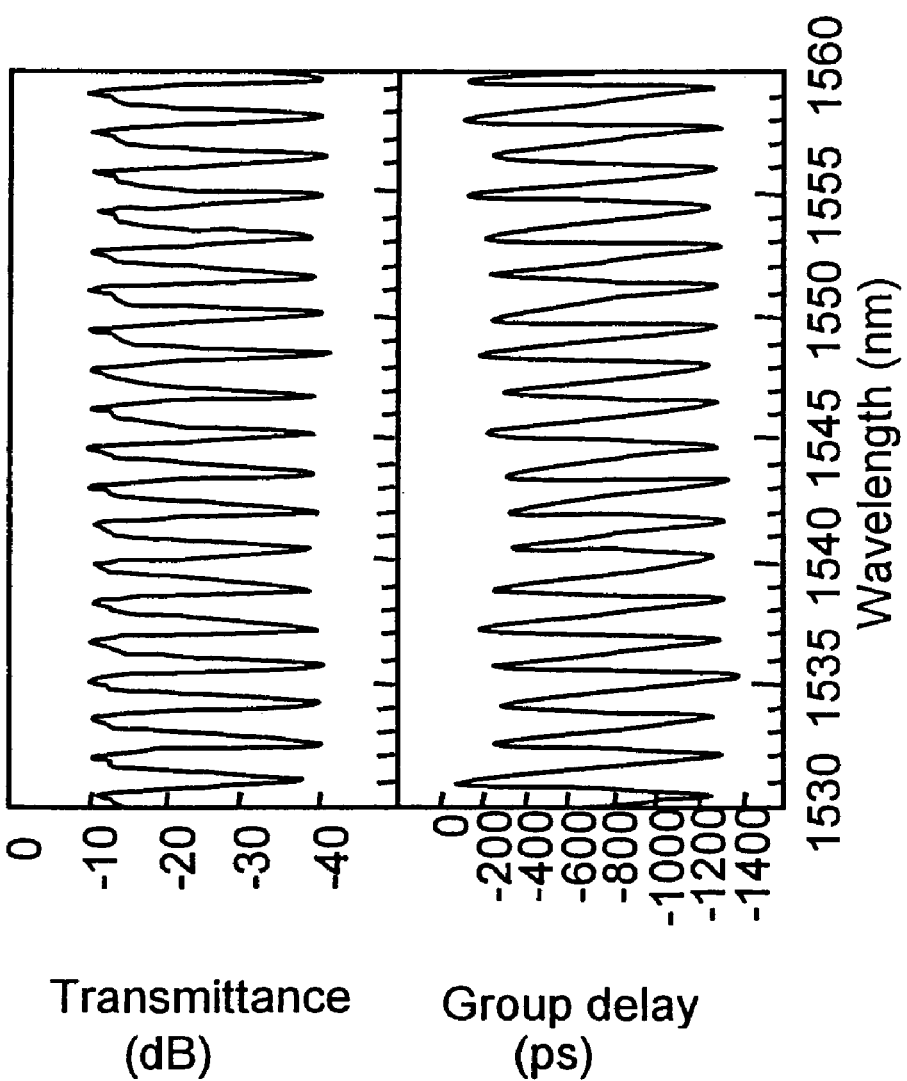
FIG. 4 shows a transmittance characteristic and a group delay characteristic of a VIPA variable dispersion compensator.
Figure 6:
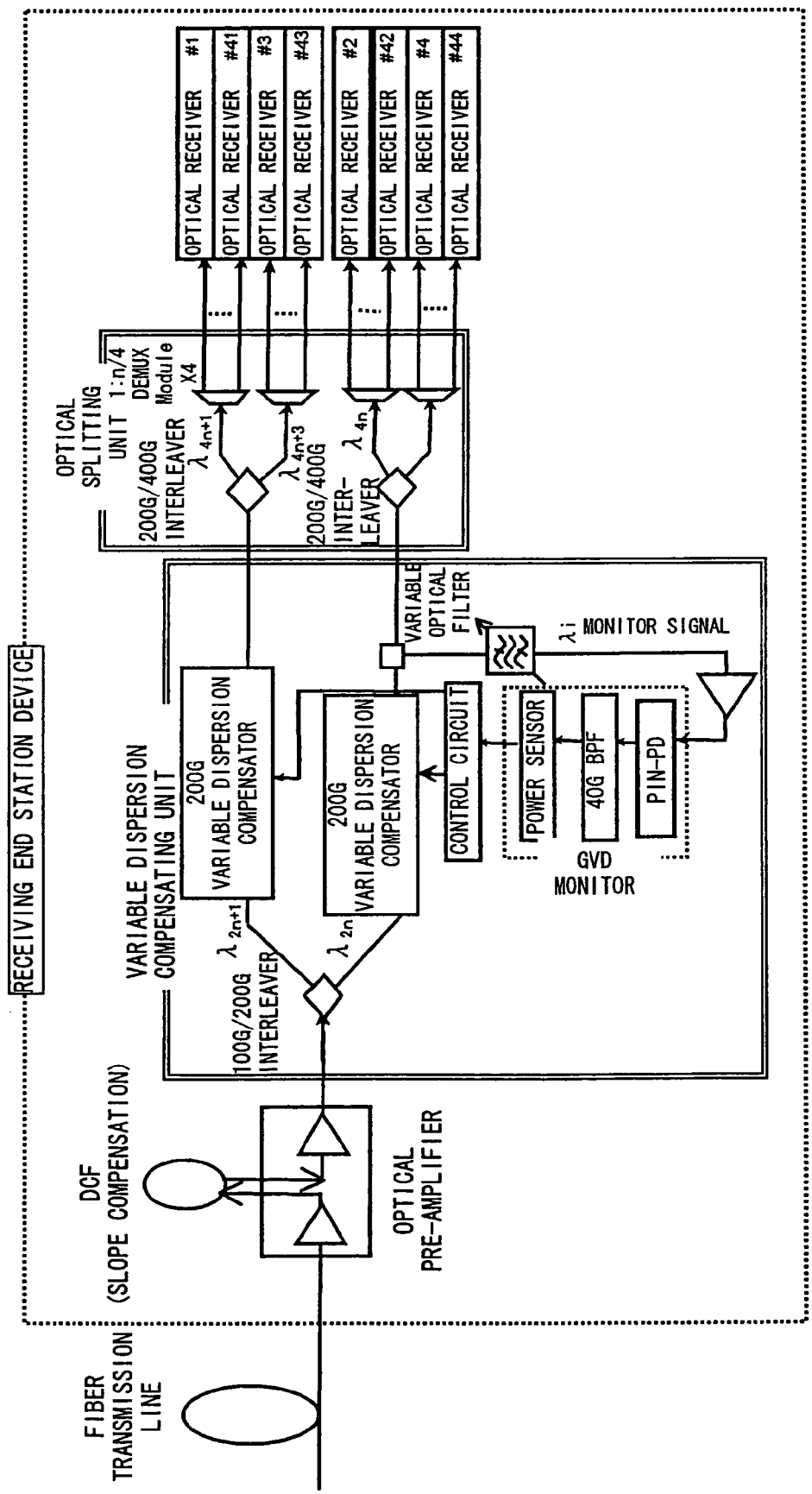
FIG. 6 exemplifies the configuration of an optical receiver of a conventional technique.
Figure 7:
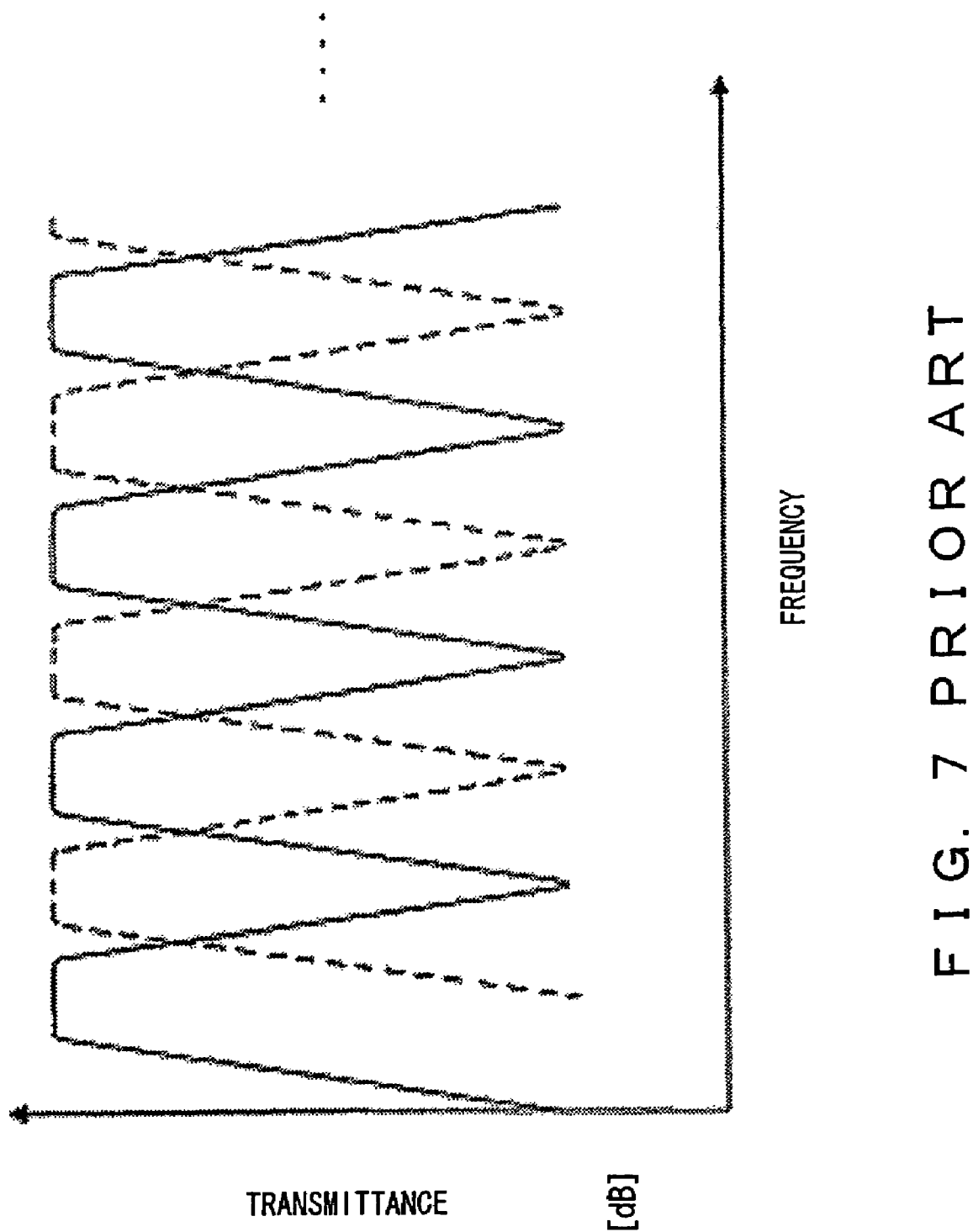
FIG. 7 explains the operations of an interleaver.
Figure 8:
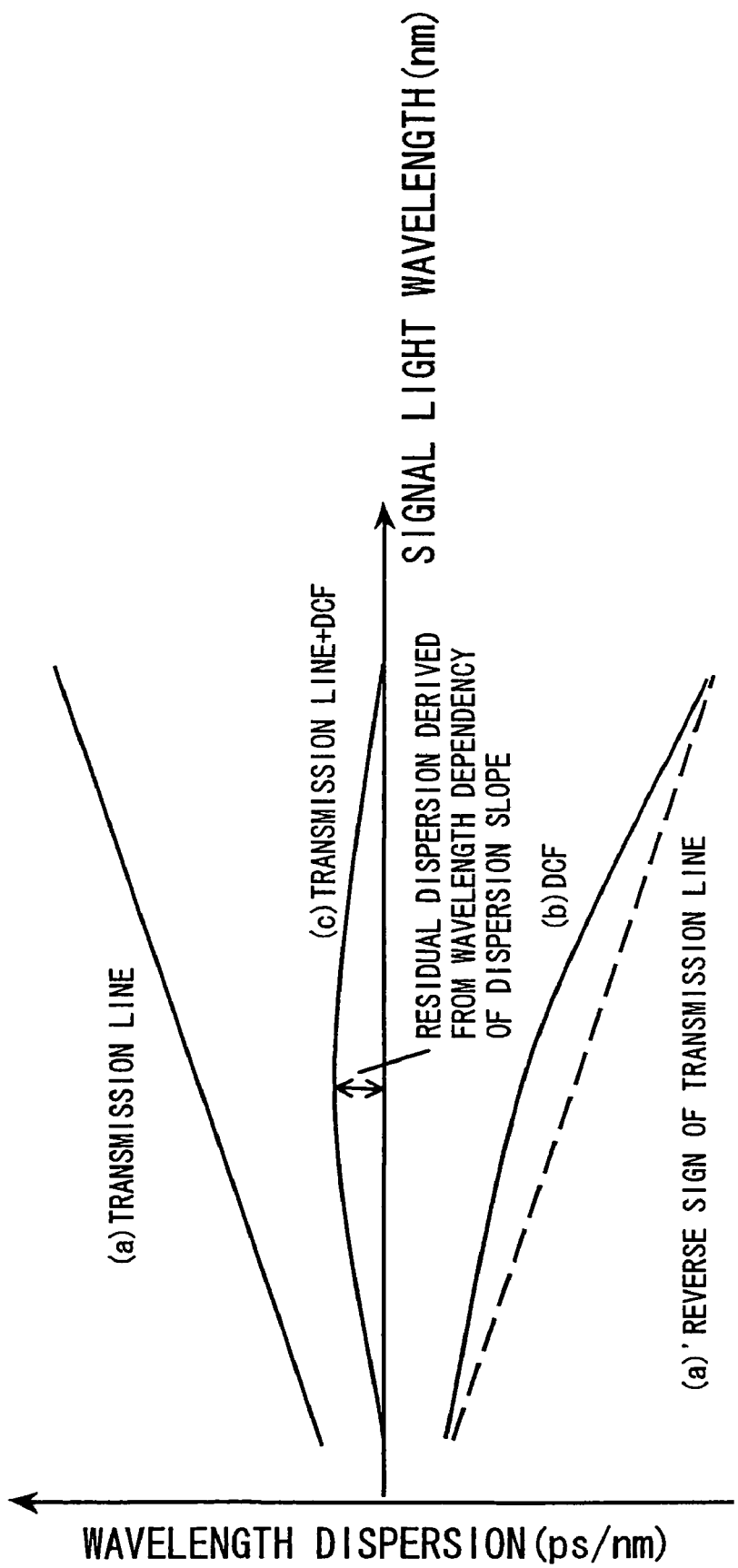
FIG. 8 shows a typical example of a dispersion characteristic on a fiber transmission line.
Figure 9:
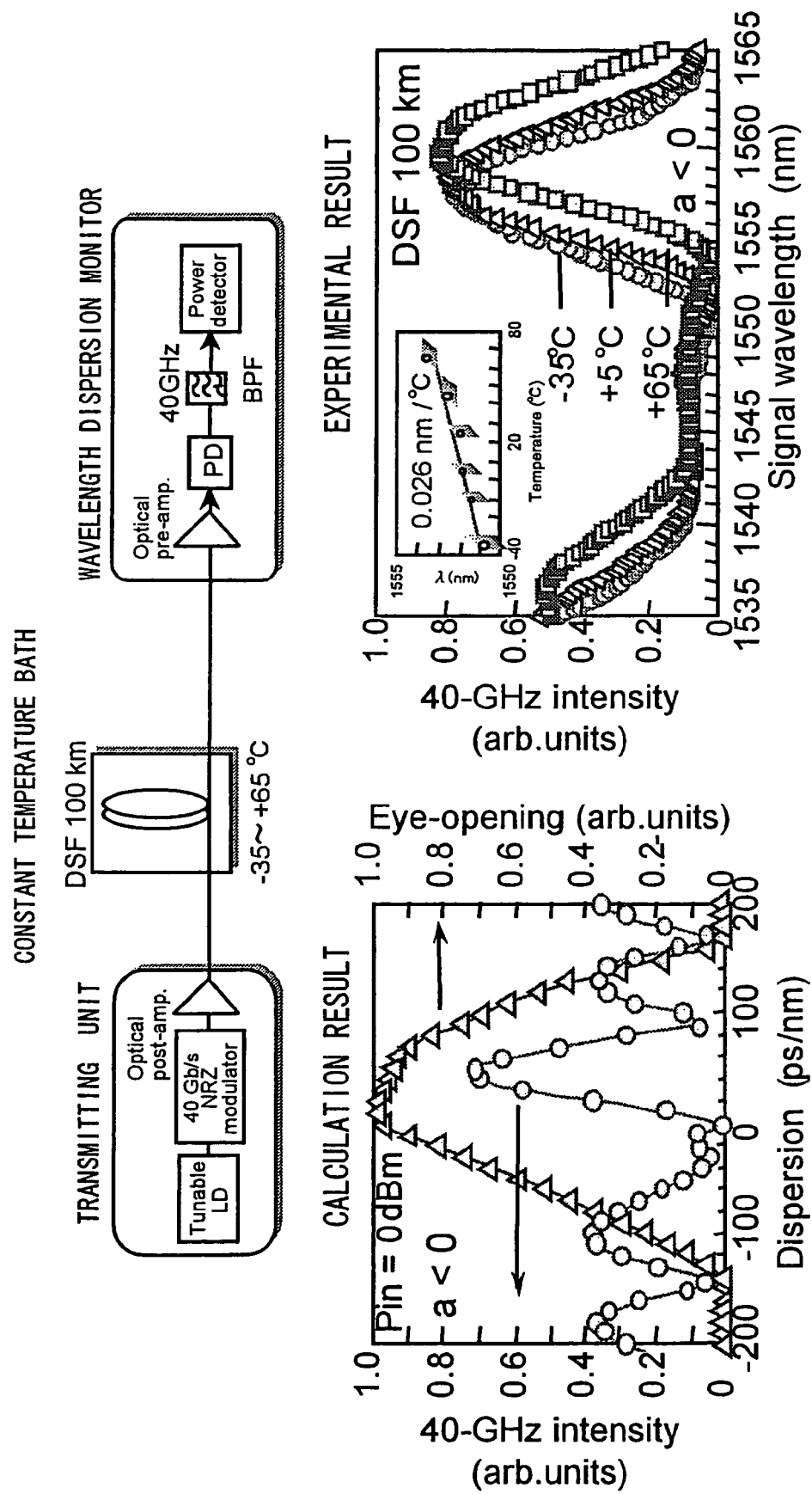
FIG. 9 shows a result of detecting the intensity of a 40-GHz component within a receiving baseband signal of a 40-Gb/s NRZ signal.
Figure 10:
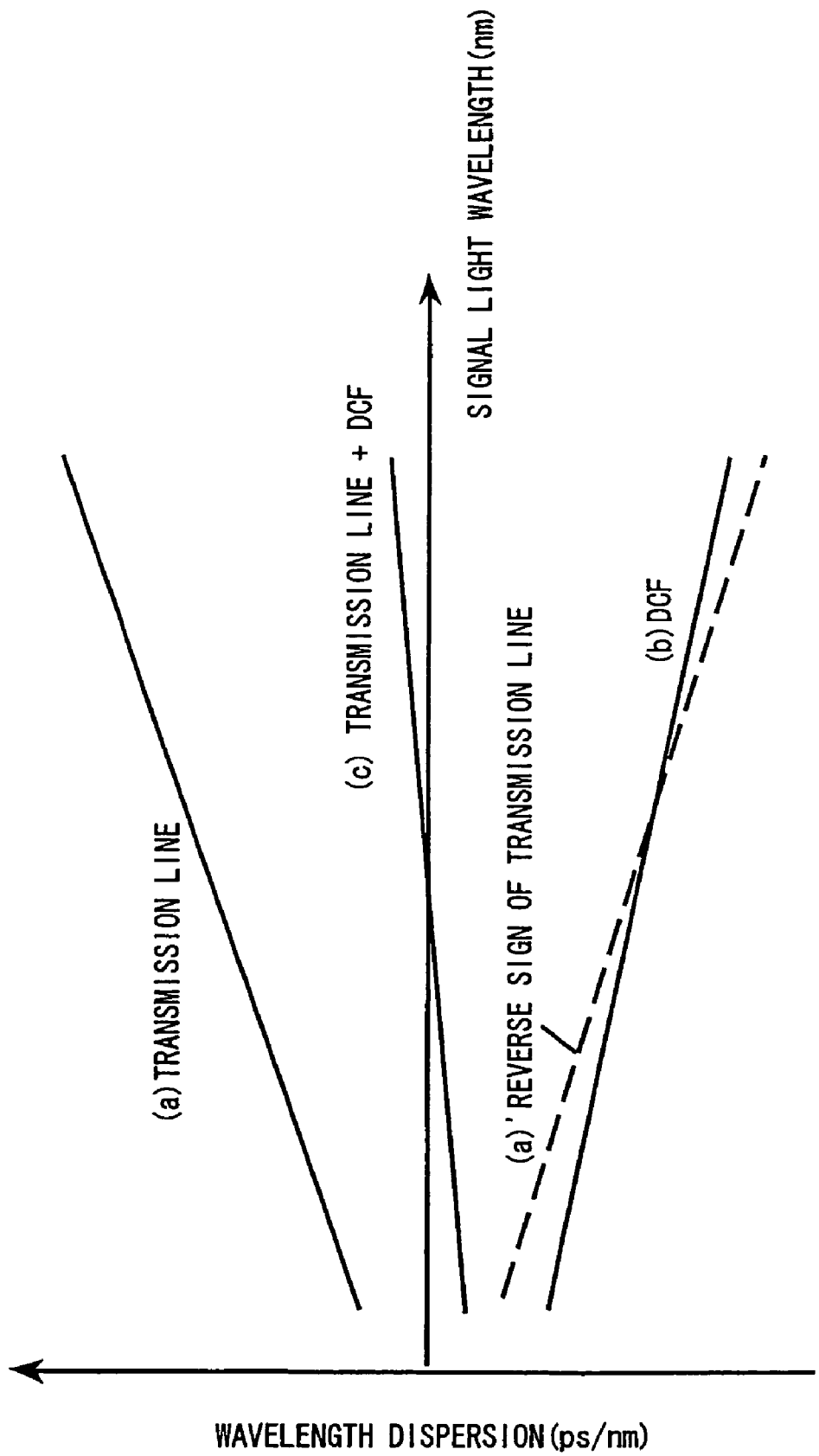
FIG. 10 shows fluctuations of chromatic dispersion on a transmission line due to dispersion slope variations.
Figure 11:
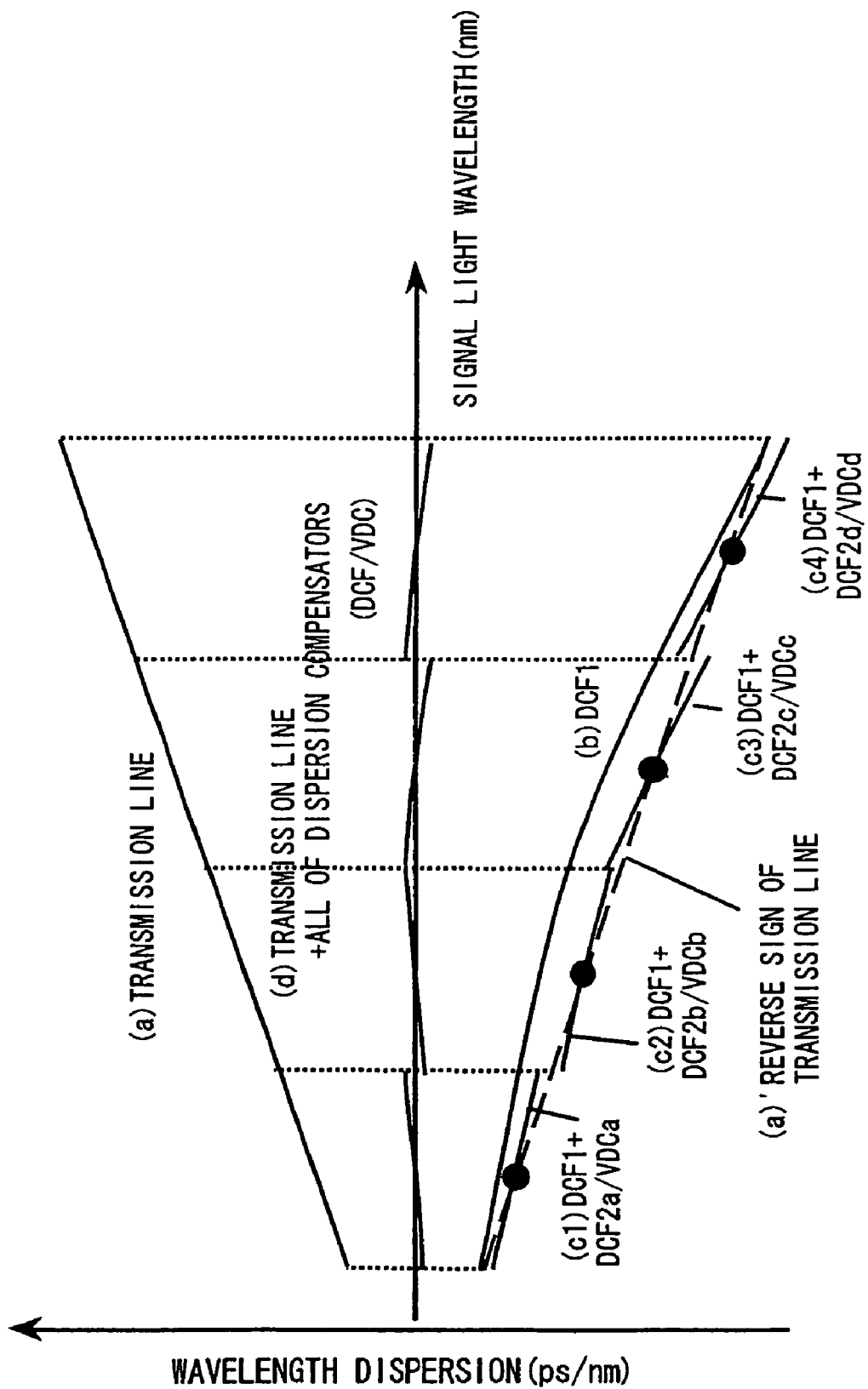
FIG. 11 explains the principle of preferred embodiments according to the present invention.

FIG. 11 explains the principle of preferred embodiments according to the present invention.

For example, in the case of a residual dispersion characteristic of (a) a transmission line and (b) a DCF1 (for simultaneous compensation for all of channels) shown in FIG. 11, a wavelength multiplexed signal is demultiplexed into a plurality of wavelength bands (four bands in this figure), and a dispersion compensation amount is finely adjusted by arranging (c) a fixed dispersion compensator (DCF) or a variable dispersion compensator (VDC) for each of the wavelength bands, so that the residual dispersion of all of the channels can be reduced to a small value (d). In this figure, chromatic dispersion of a predetermined amount is given to all of the channels within the wavelength band so that 100-percent dispersion compensation is made for a central wavelength of each of the wavelength bands. If fine adjustment is made with a fixed dispersion compensator, a fixed dispersion compensation amount must be determined by measuring the dispersion characteristic of a transmission line beforehand (or grasping a dispersion shift amount as a characteristic specific to a fiber). However, if the dispersion of the transmission line varies with time due to a temperature change, the chromatic dispersion amounts of all of the channels vary in the same direction. Therefore, the compensation state can be maintained by varying variable dispersion compensators concurrently used.

All of the following configurations show examples in the case where a wavelength interval of a transmitted wavelength multiplexed signal is 100 GHz (approximately 0.8 nm). Additionally, only a configuration example of a dispersion compensator within an optical receiver is shown. However, a similar configuration can be made also in the case where a dispersion compensator is arranged within an inline amplifier or a transmitter side station.

Figure 12:
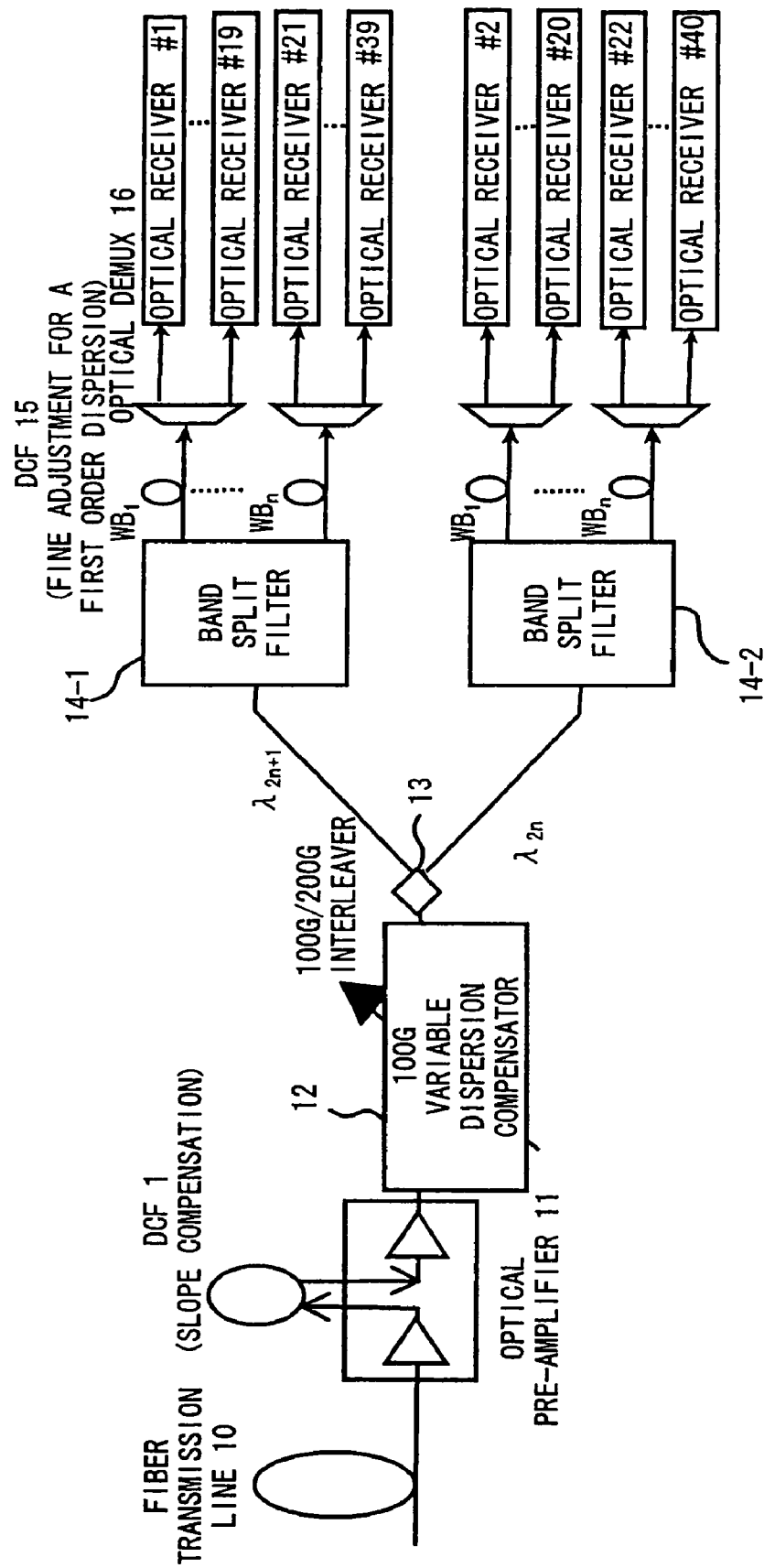
FIG. 12 exemplifies a first configuration implementing a preferred embodiment according to the present invention.

FIG. 12 exemplifies a first configuration for implementing a preferred embodiment according to the present invention.

In this configuration example, after dispersion compensation is made simultaneously for all of channels by a DCF1 and a variable dispersion compensator for 100-GHz intervals, wavelength intervals are separated into 200-GHz (approximately 1.6 nm) intervals by an interleaver. Then, the wavelength bands are respectively split into n wavelength bands by band split filters, and fine adjustment is made by a fixed dispersion compensator in each of the wavelength bands.

Firstly, a wavelength multiplexed optical signal propagated over a fiber transmission line 10 is amplified by an optical pre-amplifier 11, which is a receiver shown in FIG. 12, and at the same time, its dispersion slope is compensated by the DCF1. Then, the optical signal of 100-GHz intervals is input to a variable dispersion compensator 12, which makes dispersion compensation collectively for all of wavelengths. Next, the optical signal of 100-GHz intervals is separated into even- and odd-numbered channels by an interleaver 13, so that the optical signal is converted into optical signals of 200-GHz intervals. The optical signals are respectively input to band split filters 14-1 and 14-2, which split their wavelength bands into n bands. After residual dispersions in the respective bands are compensated by a DCF for a first order dispersion fine adjustment 15, the signals are demultiplexed into optical signals of the respective channels, and received by optical receivers #1 to #40 respectively.

Here, the number of the optical receivers is 40. This is because FIG. 12 assumes the number of multiplexed wavelengths to be 40. However, the number of multiplexed wavelengths is not limited to this value. Rather, optical receivers the number of which is according to the number of multiplexed wavelengths must be arranged. This is similar also in the explanations of the following configuration examples.

Here, optical signals input to the band split filter 14-1 are signals of odd-number channels, whereas optical signals input to the band split filter 14-2 are signals of even-numbered channels. Band split filters are already commercialized and sold by companies such as JDS Uniphase, OPlink, Dicon, Avanex, HD Fiber Systems, Chorum, etc.

Figure 13:
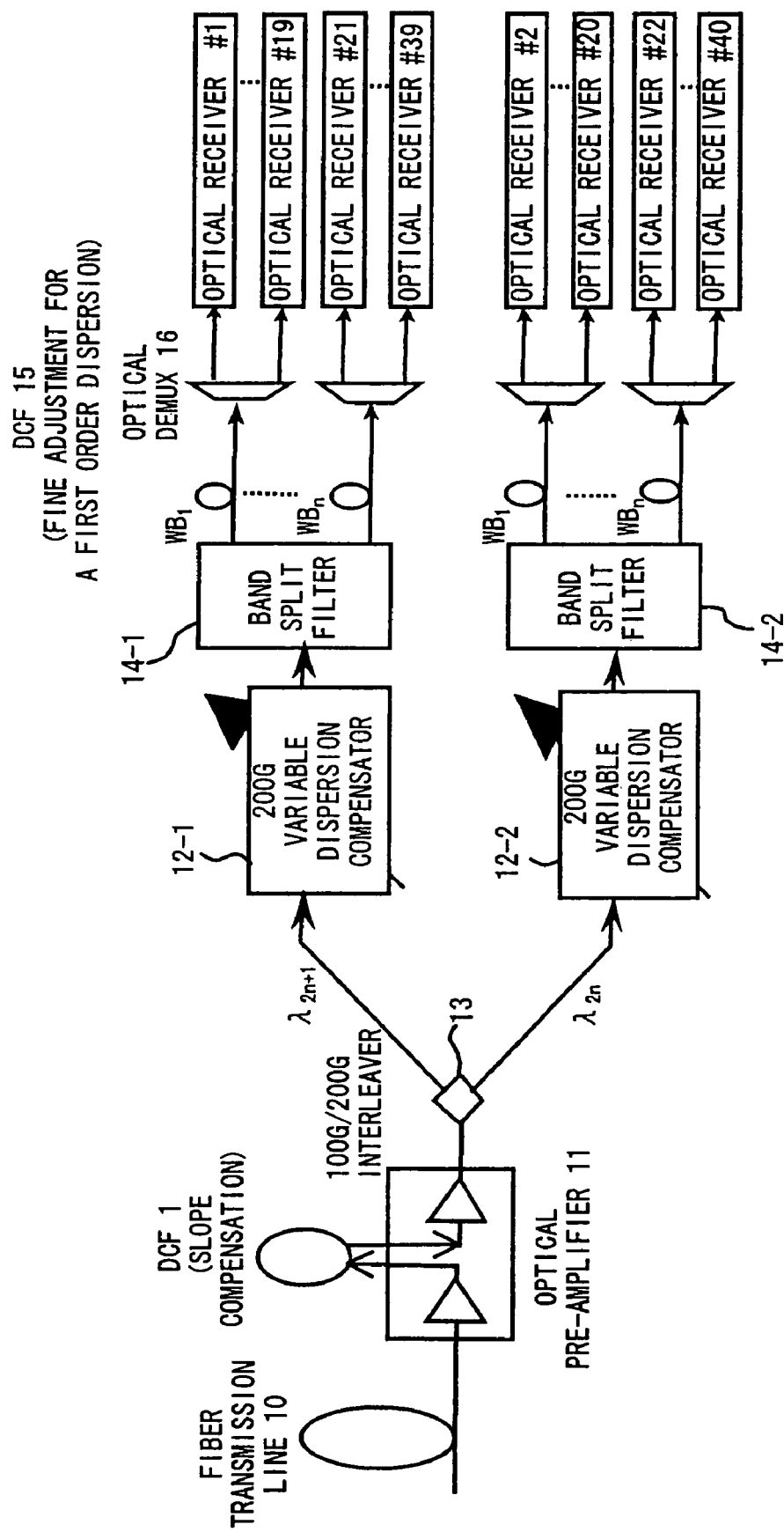
FIG. 13 exemplifies a second configuration of the preferred embodiment according to the present invention.

FIG. 13 exemplifies a second configuration of the preferred embodiment according to the present invention.

In contrast to FIG. 12, FIG. 13 shows the configuration where variable dispersion compensators for 200-GHz intervals are arranged after wavelength intervals are separated into 200-GHz intervals.

An optical signal propagated over a fiber transmission line 10 is amplified by an optical pre-amplifier 11, and at the same time, its dispersion slope is compensated by a DCF1. The optical signal is then input to an interleaver 13, which samples the wavelength multiplexed optical signal of 100-GHz intervals as optical signals of 200-GHz intervals, and transmits odd-numbered and even-numbered channels respectively to variable dispersion compensators for 200-GHz intervals 12-1 and 12-2. The variable dispersion compensators 12-1 and 12-2 respectively perform a chromatic dispersion compensation process for the input optical signals, and input the signals to band split filters 14-1 and 14-2. The band split filters 14-1 and 14-2 split the sampled optical signals into n bands. Then, fine adjustment for a first order dispersion is made by DCFs15 for the respective bands. Optical signals of the respective bands for which the fine adjustment is made are demultiplexed into optical signals of the respective channels by optical DEMUXs 16, and received by optical receivers #1 to #40.

Figure 14:
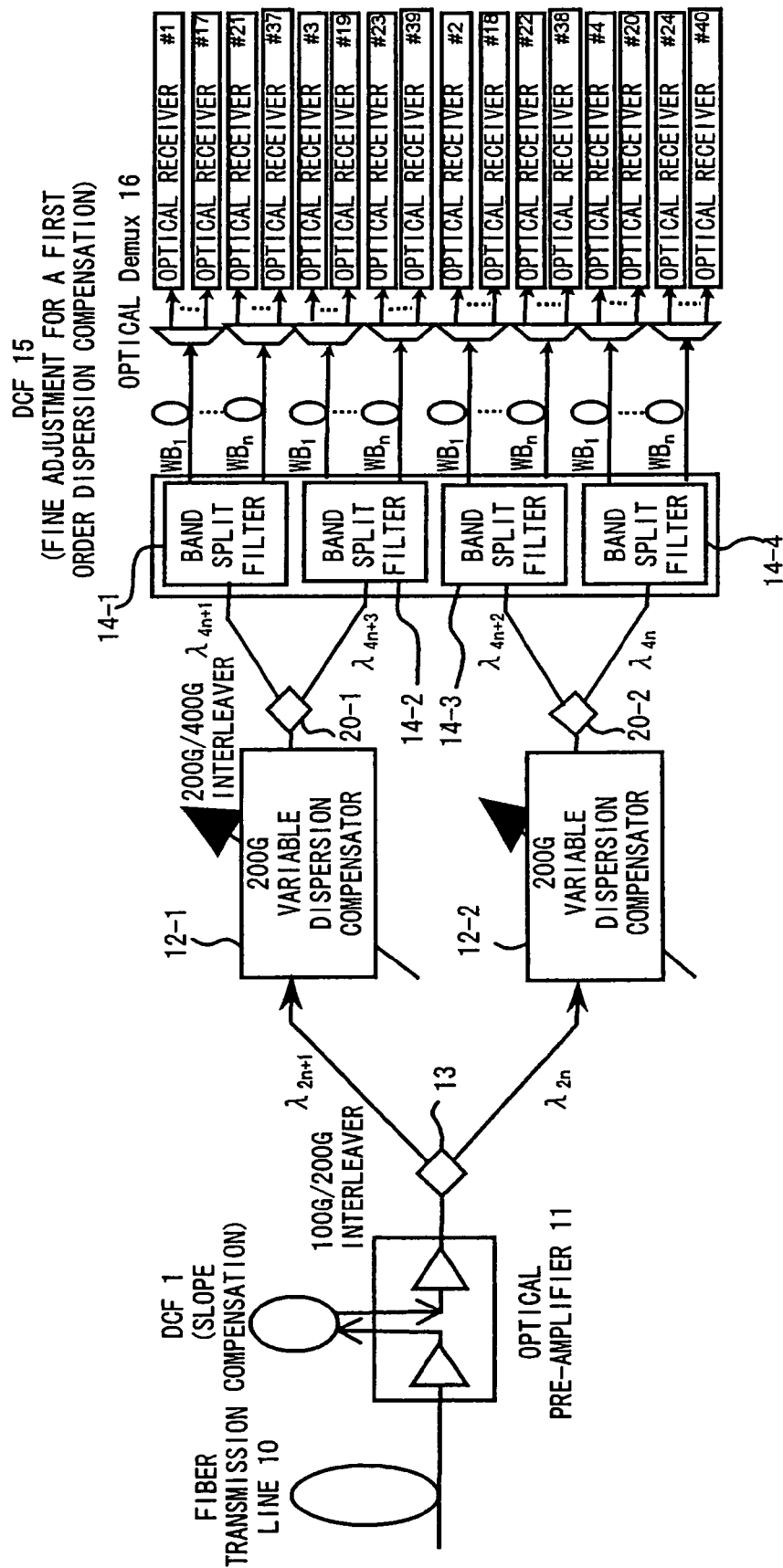
FIG. 14 exemplifies a third configuration of the preferred embodiment according to the present invention.

FIG. 14 exemplifies a third configuration of the preferred embodiment according to the present invention.

In contrast to FIG. 13, FIG. 14 shows the configuration where wavelength intervals are separated into 400-GHz (approximately 3.2 nm) intervals by using two-stage interleavers, optical signals are then split into n wavelength bands by band split filters, and fine adjustment is made for the respective wavelength bands by fixed dispersion compensators. The band split filters have a guard band (wavelength range with no transmittance) in a split wavelength position because of its characteristic. By widening a wavelength interval of a signal light wavelength by an interleaver, a requirement for the band split filter is relaxed (the number of channels that cannot be transmitted becomes zero or is reduced even if a guard band is wide). Also a configuration where the number of stages of interleavers is further increased to still more widen a wavelength interval may be implemented.

An optical signal propagated over a fiber transmission line 10 is amplified by an optical pre-amplifier, and at the same time, its dispersion slope is compensated by a DCF1. The optical signal is then separated into even- and odd-numbered channels by an interleaver 13. As a result, the wavelength intervals of the optical signals change from 100 to 200 GHz. Then, chromatic dispersions of the optical signals of 200-GHz intervals are compensated by variable dispersion compensators 12-1 and 12-2. Interleavers 20-1 and 20-2 further sample the optical signals of 200-GHz intervals to optical signals of 400-GHz intervals, which are respectively input to band split filters 14-1 to 14-4. The band split filters 14-1 to 14-4 split the bands of the input signals into n bands. Then, DCFs15 make fine adjustment for a first order dispersion compensation for the respective bands, and the signals are input to optical DEMUXs 16. Optical signals that are demultiplexed into respective channels by the optical DEMUXs 16 are received by optical receivers #1 to #40 respectively. Widening a wavelength interval of an optical signal before its band is split as described above reduces the possibility that an optical signal comes at a band boundary when the band is split. Accordingly, this is effective in a sense that an optical signal erased by band splitting is eliminated.

Figure 15:
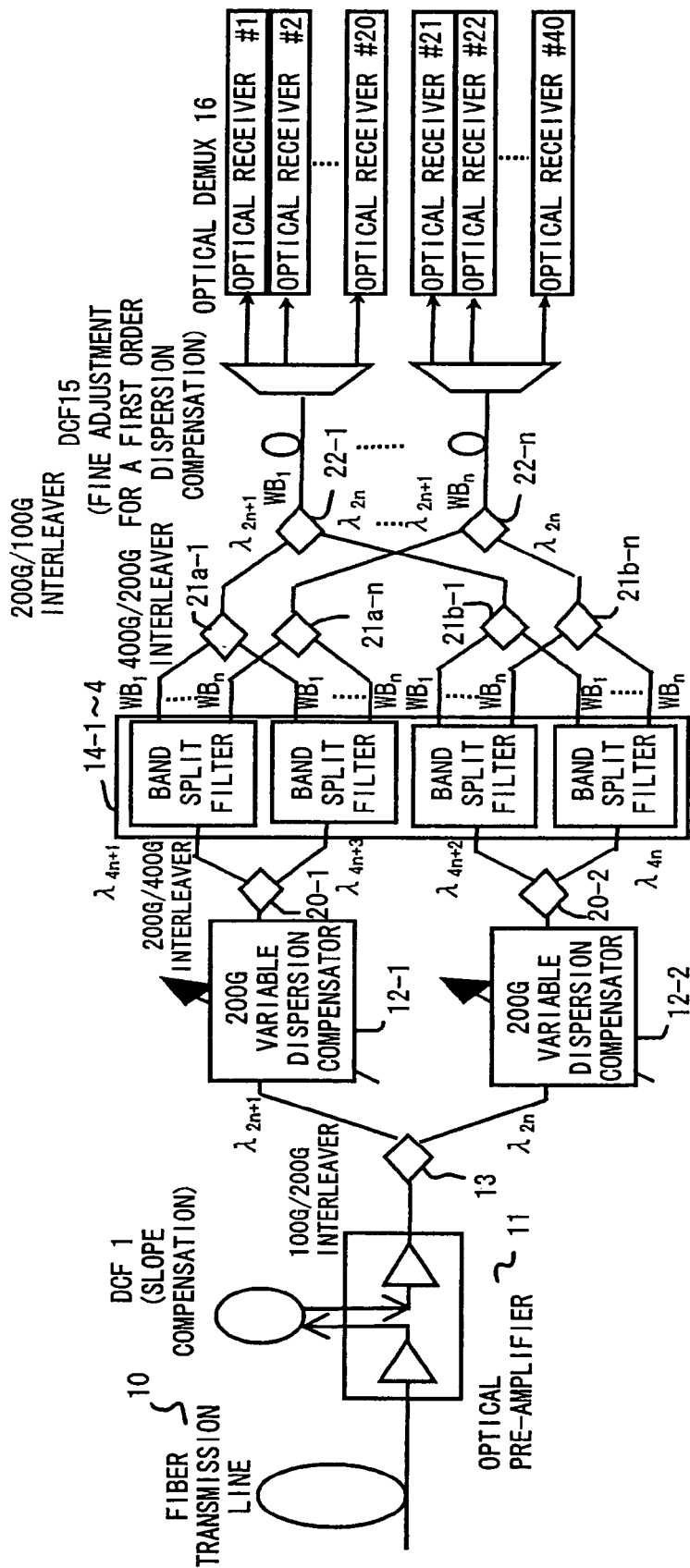
FIG. 15 exemplifies a fourth configuration of the preferred embodiment according to the present invention.

FIG. 15 exemplifies a fourth configuration of the preferred embodiment according to the present invention.

In contrast to FIG. 14, FIG. 15 shows the configuration where after signals of the same wavelength band are combined by interleavers subsequent to band split filters, fine adjustment is made by fixed dispersion compensators. With this configuration, the number of fixed dispersion compensators for fine adjustment can be reduced.

A wavelength multiplexed signal propagated over a fiber transmission line 10 is amplified by an optical pre-amplifier 11, and at the same time, its dispersion slope is compensated by a DCF1. Then, the optical signal is sampled by an interleaver 13, and optical signals having channel intervals (200 GHz) that are double the channel intervals (100 GHz) of the original wavelength multiplexed optical signal are respectively input to variable dispersion compensators 12-1 and 12-2. After dispersion compensation is made for the optical signals by the variable dispersion compensators 12-1 and 12-2, the signals are further sampled by interleavers 20-1 and 20-2. The signals change to those having channel intervals (400 GHz) that are four times the wavelength intervals (100 GHz) of the original wavelength multiplexed optical signal, and are input to band split filters 14-1 to 14-4.

The band split filters 14-1 to 14-4 respectively split the input optical signals into n bands. Then, optical signals of identical wavelength bands are combined by interleavers 21*a*-1 to 21*b*-*n* and 22-1 to 22-*n* in stages, and fine adjustment for a first order dispersion compensation is made for the respective bands by DCFs15. After the fine adjustment is made, the optical signals are input to optical DEMUXs 16, which demultiplex the signals into respective channels. The signals are then received by optical receivers #1 to #40.

Figure 16:
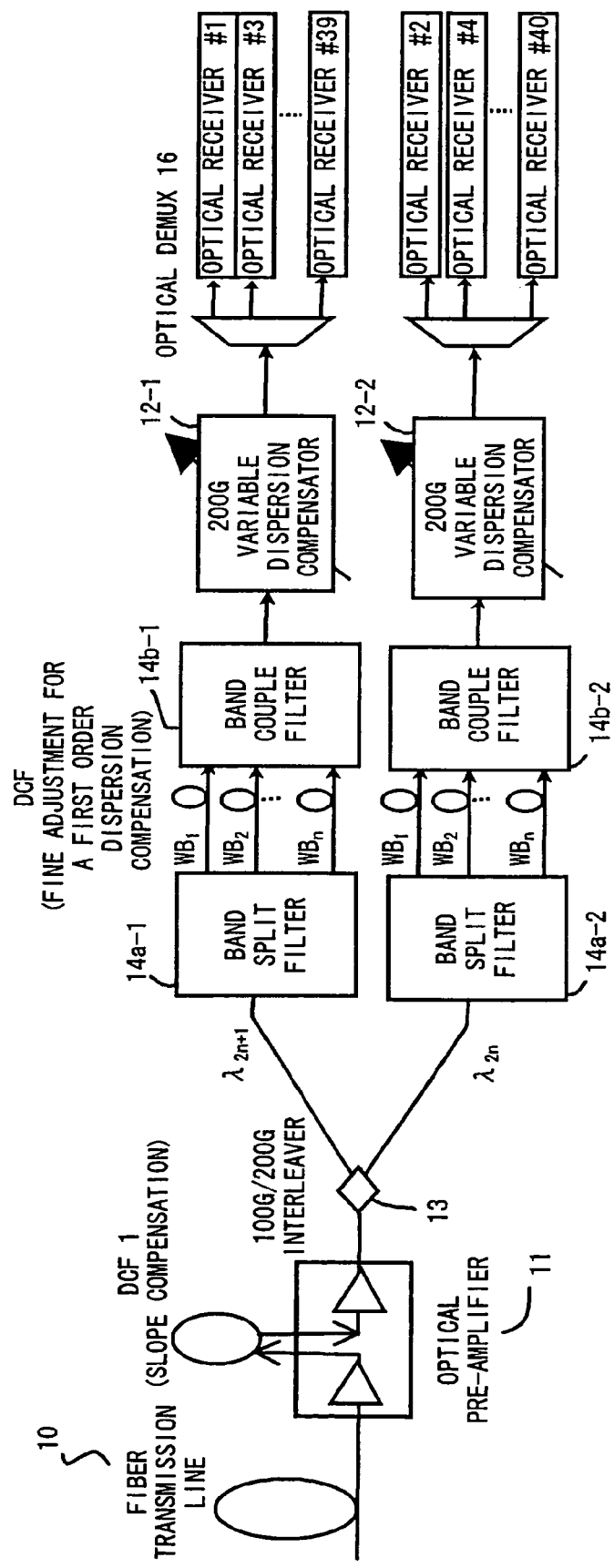
FIG. 16 exemplifies a fifth configuration of the preferred embodiment according to the present invention.

FIG. 16 exemplifies a fifth configuration according to the preferred embodiment of the present invention.

In this configuration example, after compensation is made simultaneously for all of channels by a DCF1, optical signals are split into n wavelength bands by band split filters, fine adjustment is made for the respective wavelength bands by fixed dispersion compensators, and variable dispersion compensators are arranged after the optical signals are coupled by band couple filters.

An optical signal propagated over a fiber transmission line 10 is amplified by an optical pre-amplifier 11, and at the same time, its dispersion slope is compensated by the DCF1. Then, the wavelength multiplexed optical signal is sampled by an interleaver 13, and optical signals of 200-GHz intervals are input to band split filters 14*a*-1 and 14*a*-2. The band split filters 14*a*-1 and 14*a*-2 respectively split the optical signals into n bands, and input the signals to DCFs15 for the respective bands. Then, the DCFs15 make fine adjustment for a first order dispersion compensation. The optical signals for which the fine adjustment is made are input to band couple filters 14*b*-1 and 14*b*-2, which couple the respective bands and input the coupled signals to variable dispersion compensators 12-1 and 12-2. The variable dispersion compensators 12-1 and 12-2 compensate for chromatic dispersion. The optical signals are demultiplexed into respective channels by optical DEMUXs 16, and received by optical receivers #1 to #40.

Figure 17:
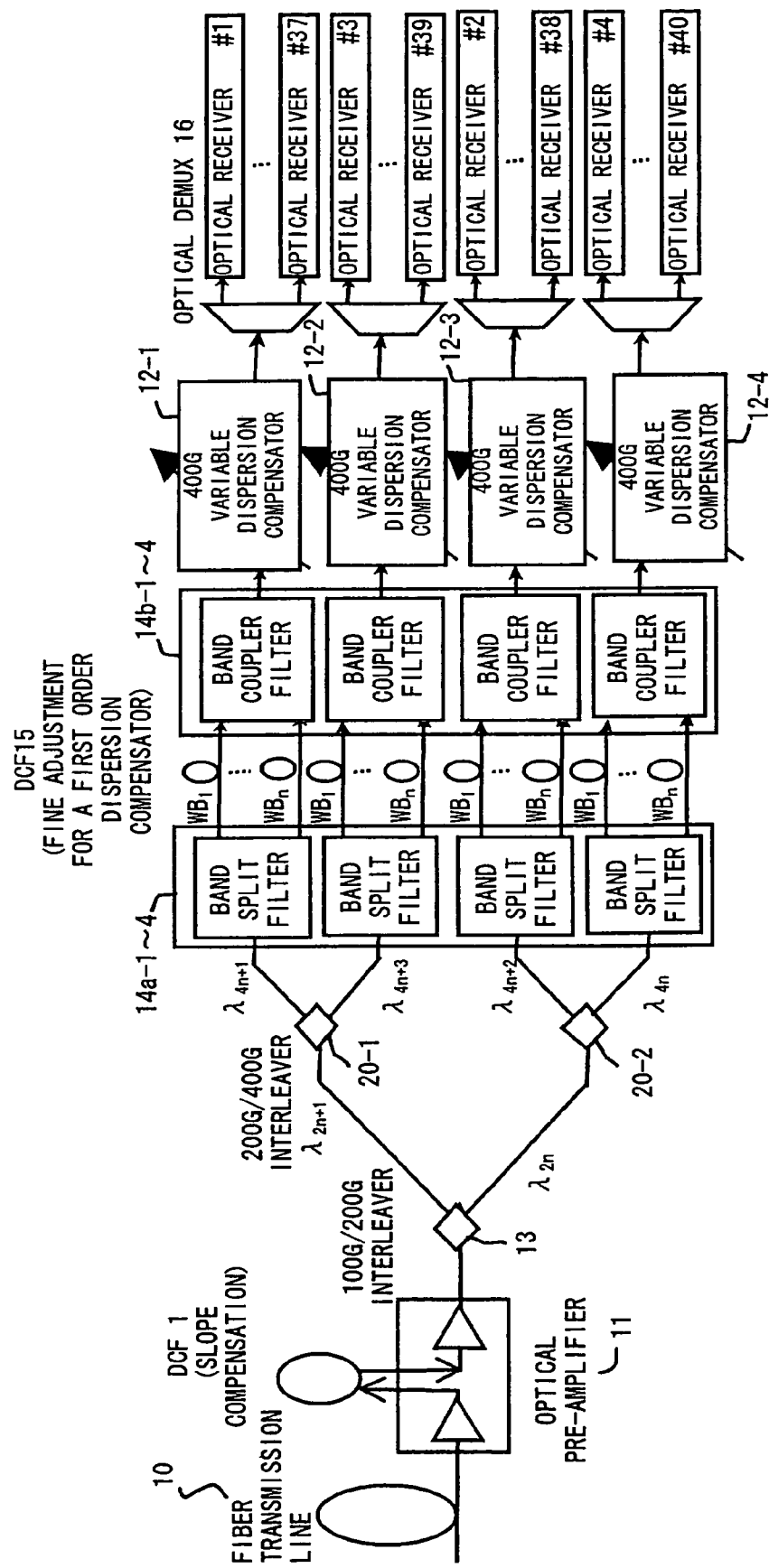
FIG. 17 exemplifies a sixth configuration of the preferred embodiment according to the present invention.

FIG. 17 exemplifies a sixth configuration according to the preferred embodiment of the present invention.

In contrast to FIG. 16, FIG. 17 shows the configuration where wavelength intervals are separated into 400-GHz (approximately 3.2 nm) intervals by using two-stage interleavers, optical signals are split into n wavelength bands by band split filters, fine adjustment is made for each of the wavelength bands by fixed dispersion compensators, and variable dispersion compensators are arranged after the wavelength band signals are coupled by band couple filters. Although the number of variable dispersion compensators increases, requirements for non-transmission wavelength bands of the band split filters are relaxed.

An optical signal propagated over a fiber transmission line 10 is amplified by an optical pre-amplifier 11, and at the same time, its dispersion slope is compensated by a DCF1. Then, the optical signal is sampled by an interleaver 13, and separated into odd- and even-numbered channels of 200-GHz intervals. The respective odd- and even-numbered channels thus separated are further separated into even- and odd-numbered channels by interleavers 20-1 and 20-2, and input to band split filters 14*a*-1 to 14*a*-4.

The band split filters 14*a*-1 to 14*a*-4 split the respective optical signals into n bands, and input the optical signals of the respective bands to DCFs for a first order dispersion compensation fine adjustment 15, which make fine adjustment for dispersion compensation. Then, the optical signals for which the fine adjustment is made are coupled by band couple filters 14*b*-1 to 14*b*-4. Dispersion compensation is then made for the optical signals by variable dispersion compensators 12-1 to 12-4. Outputs of the variable dispersion compensators 12-1 to 12-4 are demultiplexed into respective channels by optical DEMUXs 16, and received by optical receivers #1 to #40.

Figure 18:
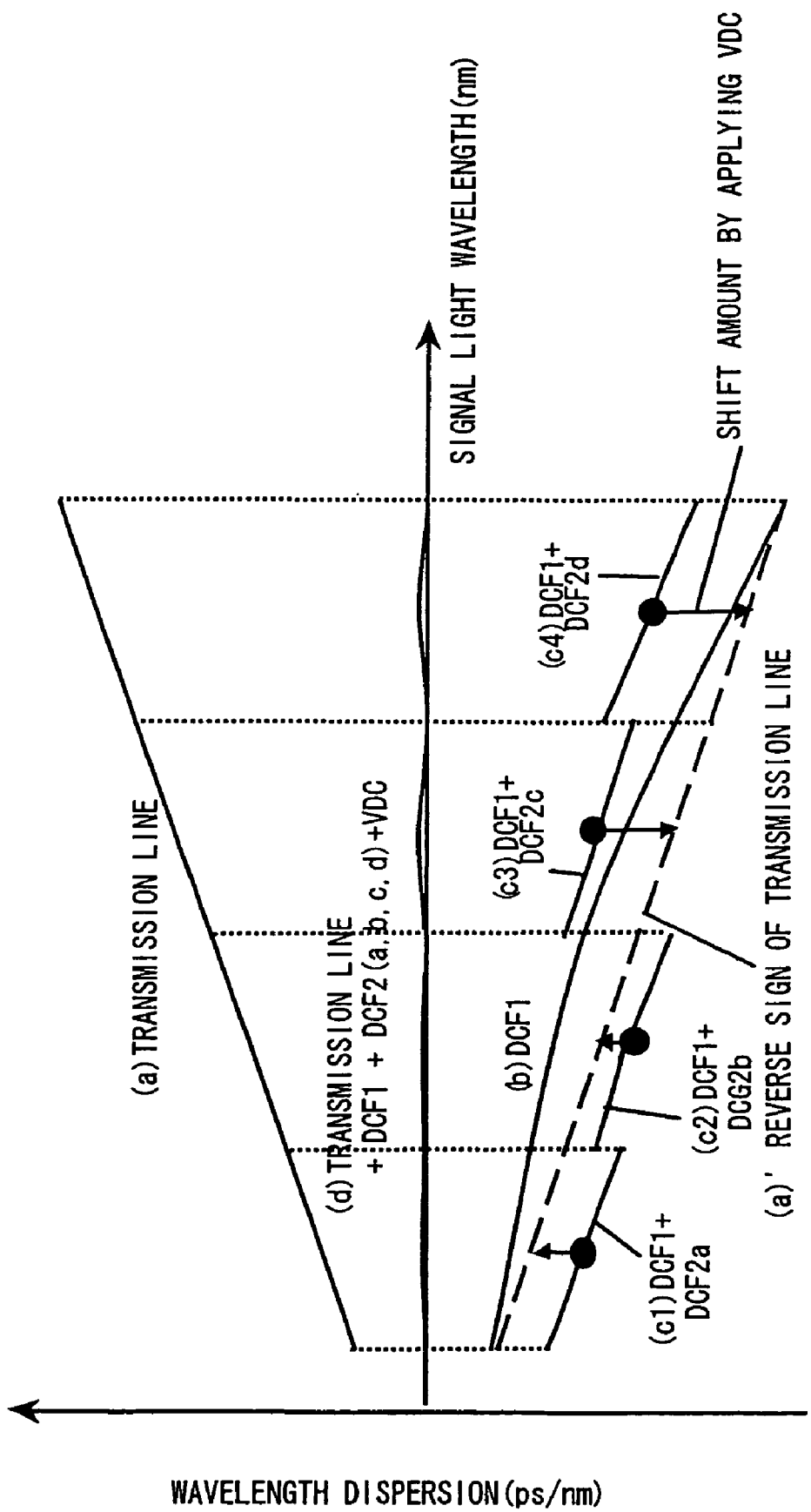
FIG. 18 explains a chromatic dispersion compensation method according to another preferred embodiment of the present invention.

FIG. 18 explains a chromatic dispersion compensation method according to another preferred embodiment of the present invention.

This figure shows another dispersion compensation method in the case of a residual dispersion characteristic of (a) a transmission line and (b) a DCF1 (for compensation collectively for all of channels), which is similar to that shown in FIG. 11. A plurality of (four in this figure) dispersion compensation fibers (fixed dispersion compensators) are arranged, and fine adjustment is made for their lengths, so that a dispersion slope of the transmission line, the DCF1 and the DCFs2 (a, b, . . . ) is canceled. Furthermore, residual chromatic dispersion is collectively compensated by arranging variable dispersion compensators for respective wavelength bands, thereby reducing the residual dispersion of all of channels to a smaller value in comparison with the case shown in FIG. 11. Because the fine adjustment is made for the dispersion slope with the fixed dispersion compensators in a similar manner as in FIG. 11, the dispersion and the dispersion slope characteristic of a transmission line must be measured beforehand. If the dispersion of the transmission line changes with time due to a temperature change thereafter, the chromatic dispersion amounts of all of the channels vary in the same direction. Therefore, the compensation state can be maintained by making a concurrently used variable dispersion compensator variable.

According to the preferred embodiments of the present invention, dispersion compensation for all of channels can be effectively made at low cost and in less size in a wavelength multiplexing transmission system, even if residual dispersion derived from the wavelength characteristic of a dispersion slope of a transmission line and a DCF occurs, or if variations of chromatic dispersion and a dispersion slope are large. As a result, a long-haul transmission can be implemented.

The following configuration example is an example of configuration that can implement not only the principle shown in FIG. 18 but also the principle shown in FIG. 11.

Figure 19:
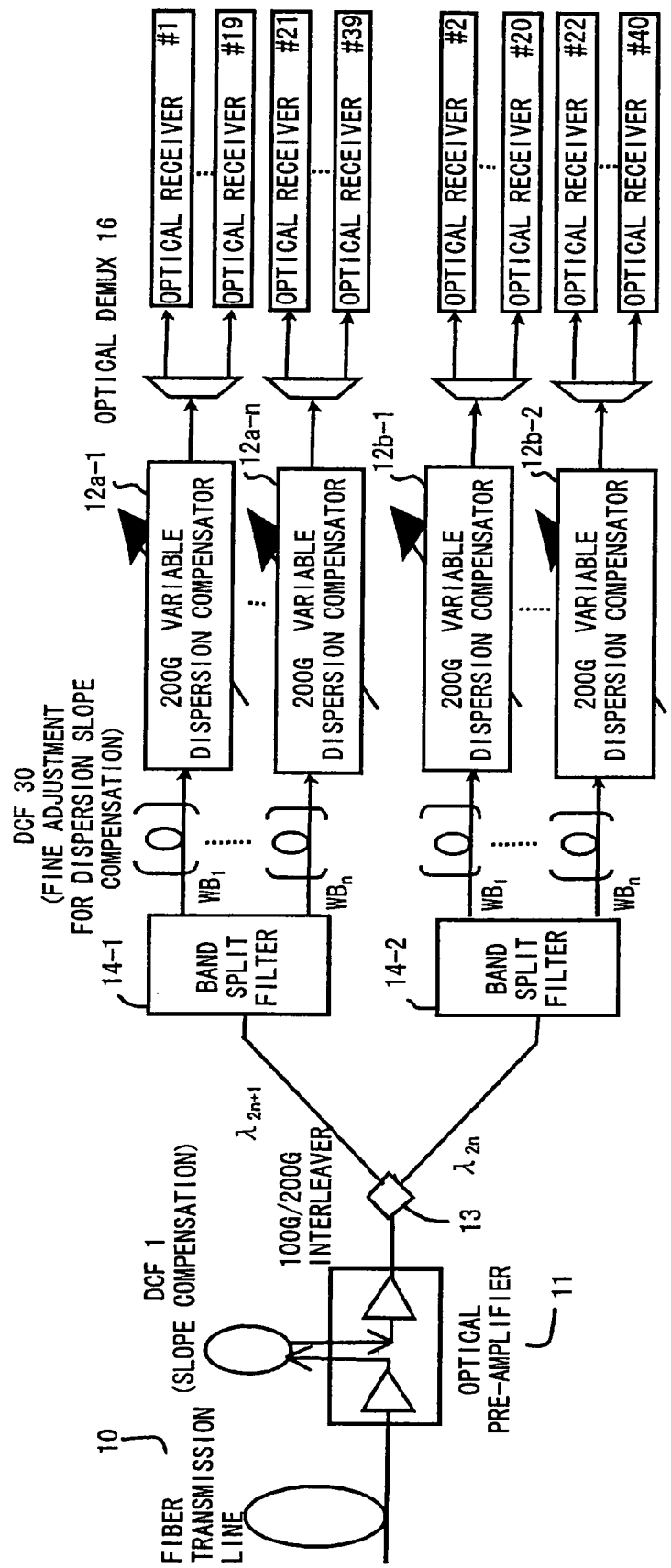
FIG. 19 exemplifies a seventh configuration according to another preferred embodiment of the present invention.

FIG. 19 exemplifies a seventh configuration according to another preferred embodiment of the present invention.

This figure shows the configuration where after compensation is made collectively for all of channels by a DCF1, wavelength intervals are separated into 200-GHz (approximately 1.6 nm) intervals, the optical signals are split into n wavelength bands by band split filters, and fine adjustment is made for the respective wavelength bands by variable dispersion compensators. Variable dispersion compensators the number of which is double the number of wavelength bands are required. A fixed dispersion compensator for making fine adjustment for dispersion slope compensation may be arranged to make compensation for chromatic dispersion and a dispersion slope, which is explained with reference to FIG. 18, with high accuracy.

A wavelength multiplexed optical signal propagated over a fiber transmission line 10 is amplified by an optical pre-amplifier 11, and at the same time, its dispersion slope is compensated by a DCF1. Then, the optical signal is separated into odd- and even-numbered channels by an interleaver 13, and the separated optical signals are respectively input to band split filters 14-1 and 14-2. The band split filters 14-1 and 14-2 split the wavelength bands into n bands, and output optical signals. DCFs30 are used to make fine adjustment for dispersion slope compensation. However, they may not be arranged if dispersion compensation with high accuracy is not demanded on a receiving side. The reason why the DCFs30 are enclosed by brackets is that it is desirable to arrange the DCFs30, but it does not matter unless they are arranged.

After the optical signals pass through the DCFs30, dispersion compensation is made for their respective bands by variable dispersion compensators 12*a*-1 to 12*a*-n, and 12*b*-1 to 12*b*-n. The optical signals are then transmitted to optical DEMUXs 16, which demultiplex the optical signals into respective channels. Optical signals of the respective channels are received by optical receivers #1 to #40.

Figure 20:
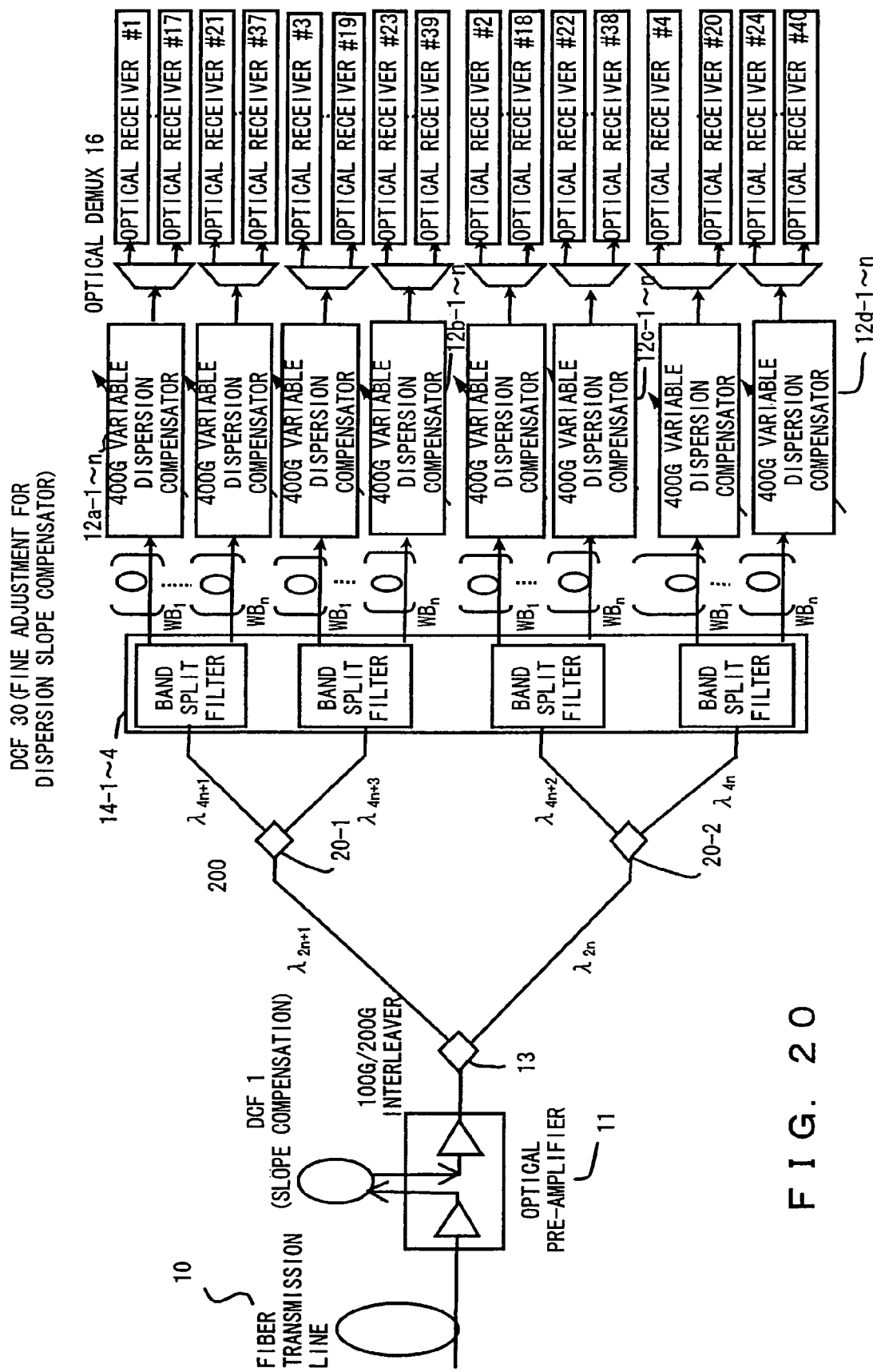
FIG. 20 exemplifies an eighth configuration of the preferred embodiment according to the present invention.

FIG. 20 exemplifies an eighth configuration of the preferred embodiment according to the present invention.

In contrast to FIG. 19, FIG. 20 shows the configuration where wavelength intervals are separated into 400-GHz (approximately 3.2 nm) intervals by using two-stage interleavers, the optical signals are then split into n wavelength bands by band split filters, and fine adjustment is made for the respective wavelength bands by variable dispersion compensators. Variable dispersion compensators the number of which is four times the number of wavelength bands are required. A fixed dispersion compensator for making fine adjustment for dispersion slope compensation may be arranged to make the compensation for chromatic dispersion and a dispersion slope, which is explained with reference to FIG. 18, with high accuracy.

Figure 21:
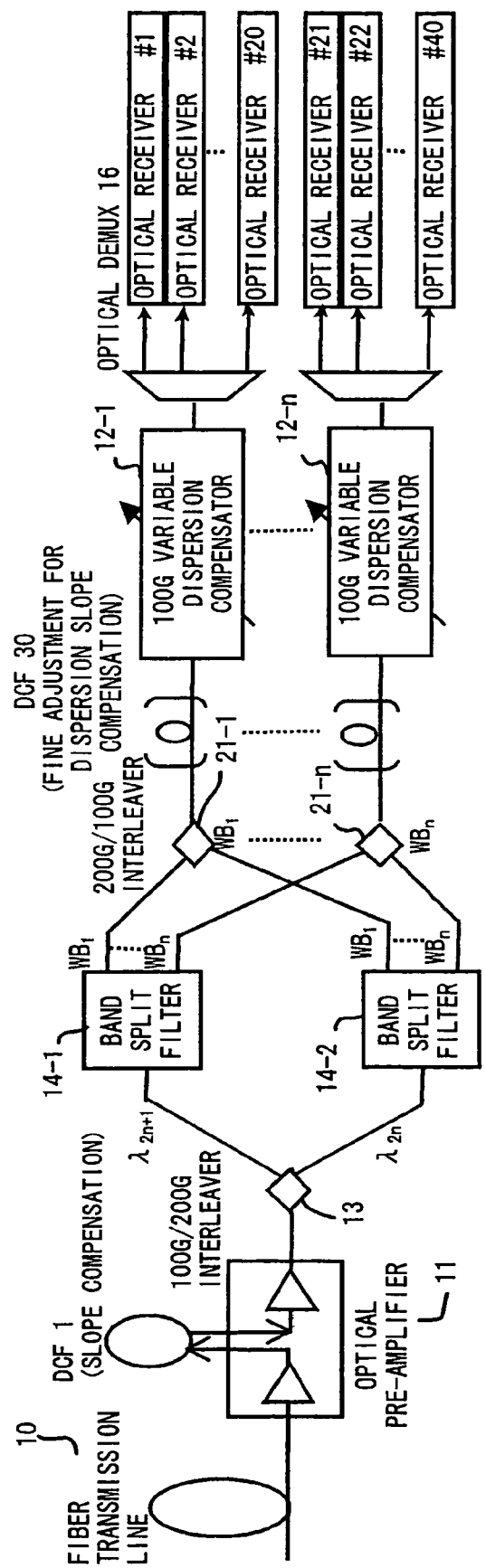
FIG. 21 exemplifies a ninth configuration of the preferred embodiment according to the present invention.

An optical signal propagated over a fiber transmission line 10 is amplified by an optical pre-amplifier 11, and at the same time, its dispersion slope is compensated by a DCF1. Then, the optical signal is separated into odd- and even-numbered channels by an interleaver 13. The optical signals are further sampled and separated by interleavers 20-1 and 20-2 in a succeeding stage, and input to band split filters 14-1 to 14-4. The band split filters 14-1 to 14-4 split the respective input optical signals into n bands. Fine adjustment is made for dispersion slope compensation for the split signals by arbitrarily arranged DCFs30, and dispersion compensation is made for the signals by variable dispersion compensators 12*a*-1 to 12*d*-n. Then, the optical signals are input to optical DEMUXs 16, which demultiplex the signals into respective channels. The optical signals are then received by optical receivers #1 to #40. FIG. 21 exemplifies a ninth configuration of the preferred embodiment according to the present invention.

In contrast to FIG. 20, FIG. 21 shows the configuration where fine adjustment is made by variable dispersion compensators after signals of the same wavelength band are combined by an interleaver. With this configuration, the number of variable dispersion compensators can be reduced. The number of variable dispersion compensators becomes equal to the number of wavelength bands in this example.

An optical signal propagated over a fiber transmission line 10 is amplified by an optical pre-amplifier 11, and at the same time, its dispersion slope is compensated by a DCF1. Then, the optical signal is separated into odd- and even-numbered channels by an interleaver 13, and the optical signals are respectively input to band split filters 14-1 and 14-2. The band split filters 14-1 and 14-2 split the bands of the optical signals into n bands, and optical signals of the same band among the bands split by the band split filters 14-1 and 14-2 are combined by interleavers 21-1 to 21-*n*. Fine adjustment is made for dispersion slope compensation for the respective bands by arbitrarily arranged DCFs30. Then, dispersion compensation is made by variable dispersion compensators 12-1 to 12-*n*, and the optical signals are demultiplexed into respective channels by optical DEMUXs 16, and received by optical receivers #1 to #40.

Figure 22:
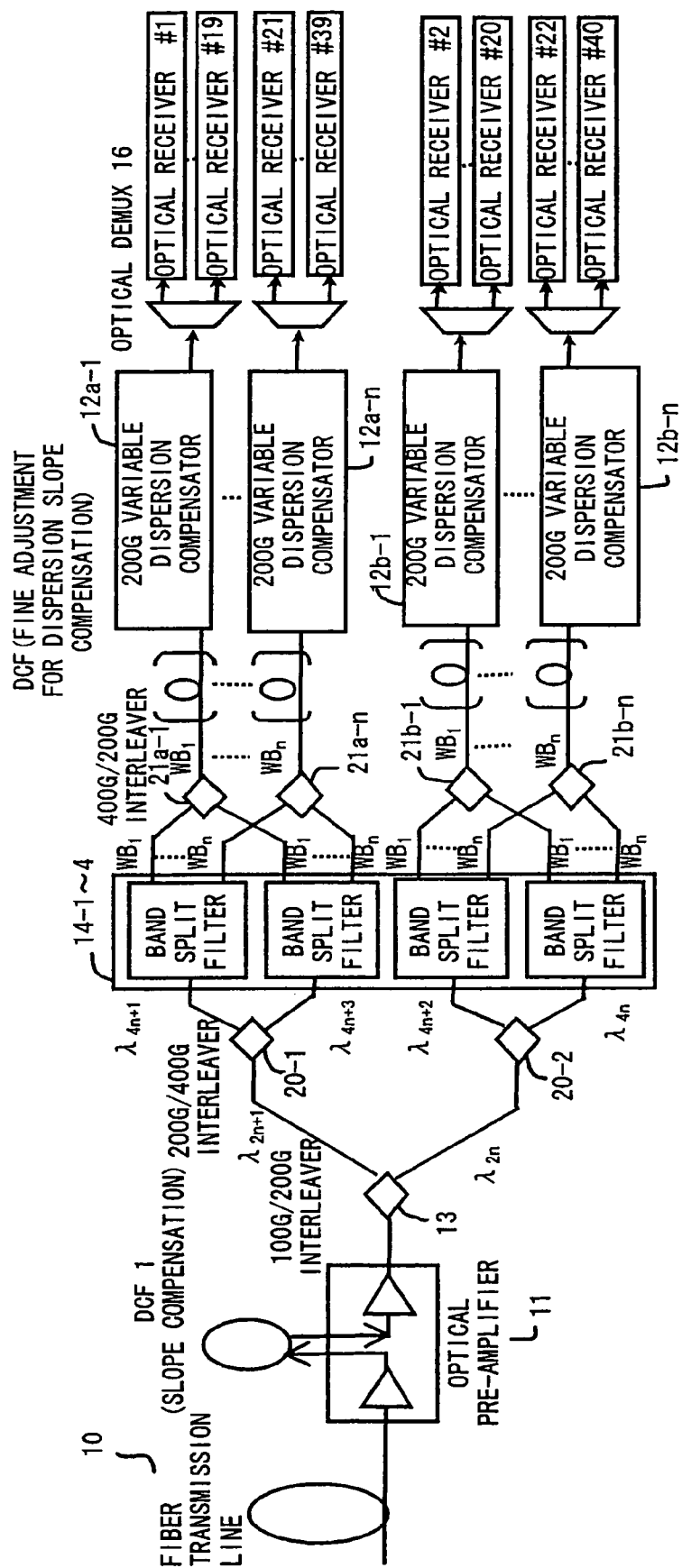
FIG. 22 exemplifies a tenth configuration of the preferred embodiment according to the present invention.

FIG. 22 exemplifies a tenth configuration of the preferred embodiment according to the present invention.

In contrast to FIG. 21, FIG. 22 shows the configuration where fine adjustment is made by variable dispersion compensators after signals of the same wavelength band are combined by an interleaver subsequent to band split filters. With this configuration, the number of variable dispersion compensators can be reduced. In this example, 200-GHz variable dispersion compensators the number of which is double the number of wavelength bands are required. Or, 100-GHz variable dispersion compensators the number of which is equal to the number of wavelength bands may be arranged after signals of the same wavelength bands are further combined into 100-GHz signals by interleavers.

An optical signal propagated over a fiber transmission line is amplified by an optical pre-amplifier 11, and at the same time, its dispersion slope is compensated by a DCF1. Then, the optical signal is separated into odd- and even-numbered channels by an interleaver 13. The signals are further sampled and separated by interleavers 20-1 and 20-2, and respectively input to band split filters 14-1 to 14-4. The band split filters 14-1 to 14-4 separate the input optical signals into n bands. Next, optical signals of the same band are combined by interleavers 21a-1 to 21b-n, and fine adjustment is made for dispersion slope compensation for the respective bands by DCFs30. Then, dispersion compensation is made for the signals by variable dispersion compensators 12a-1 to 12b-n. The optical signals are demultiplexed into respective channels by optical DEMUXs 16, and received by optical receivers #1 to #40.

Figure 23:
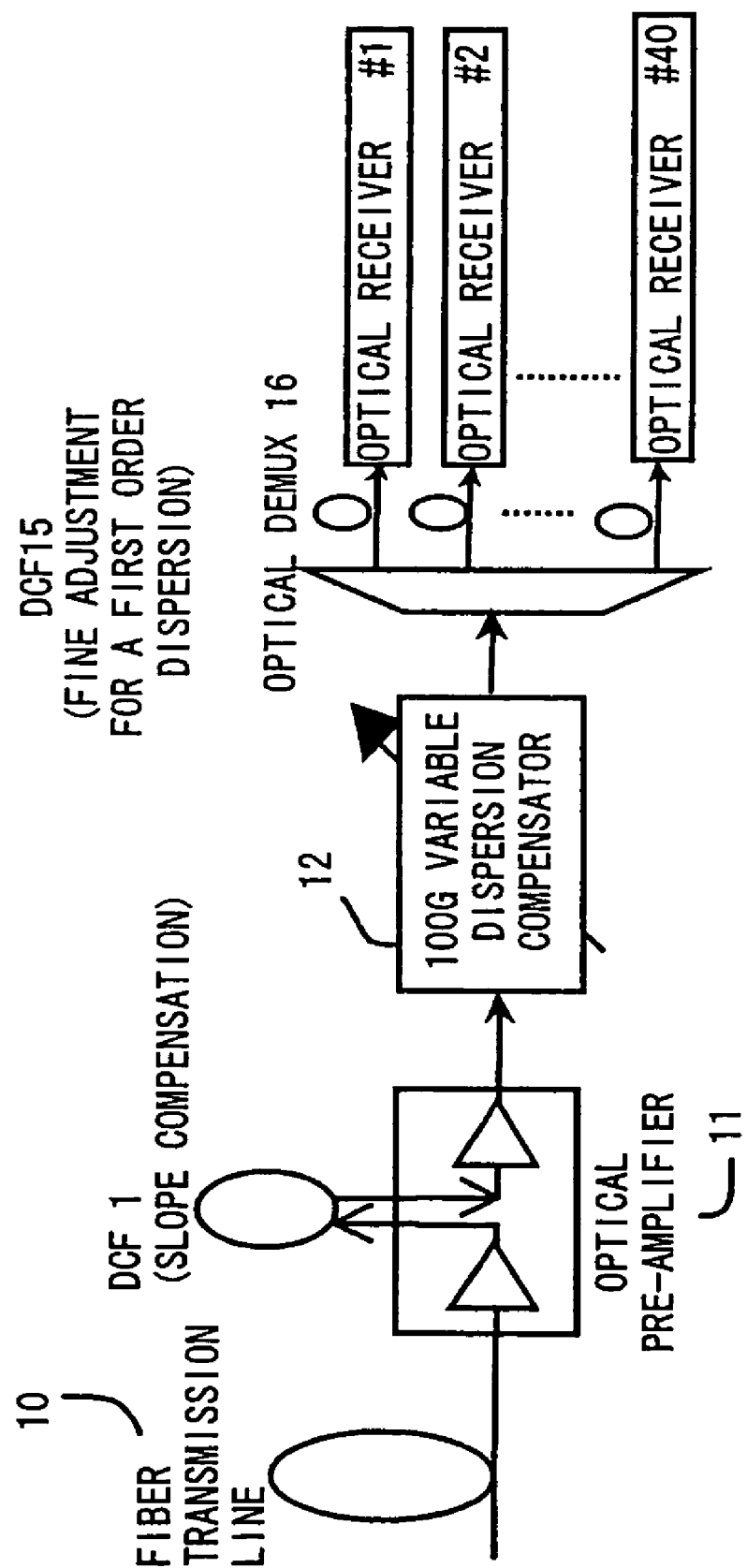
FIG. 23 exemplifies an eleventh configuration of the preferred embodiment according to the present invention.

FIG. 23 exemplifies an eleventh configuration of the preferred embodiment according to the present invention.

This figure shows the configuration where compensation is made simultaneously for all of channels by a DCF1 and a variable dispersion compensator for 100-GHz intervals, all of the channels are then demultiplexed by an optical DEMUX, and fine adjustment is made for the respective channels by fixed dispersion compensators.

An optical signal propagated over a fiber transmission line 10 is amplified by an optical pre-amplifier 11, and at the same time, its dispersion slope is compensated by a DCF1. Then, chromatic dispersion compensation is made for the signal by a variable dispersion compensator 12. The optical signal for which the chromatic dispersion compensation is made is demultiplexed into respective channels by an optical DEMUX 16. Then, fine adjustment for a first order dispersion is made for the respective channels by DCFs15, and the signals are received by optical receivers #1 to #40.

FIG. 24 exemplifies a twelfth configuration of the preferred embodiment according to the present invention.

In contrast to FIG. 19, this figure shows the configuration where variable dispersion compensators for 200-GHz intervals are arranged after wavelength intervals are separated into 200-GHz intervals.

An optical signal propagated over a fiber transmission line 10 is amplified by an optical pre-amplifier 11, and at the same time, its dispersion slope is compensated by a DCF1. Then, the optical signal is sampled and separated into odd- and even-numbered channels by an interleaver 13. Dispersion compensation is then made for the respective optical signals by variable dispersion compensators 12-1 and 12-2, and the signals are demultiplexed into respective channels by optical DEMUXs 16. Fine adjustment for a first order dispersion is then made for the optical signals of the respective channels by DCFs15, and the signals are received by optical receivers #1 to #40.

A dispersion compensating apparatus in an inline amplifier is explained next. As a solution to the above described (2) incompleteness of a slope compensation rate of a DCF, (3) manufacturing variations of a slope coefficient of a transmission line/DCF, and (5) influence of the wavelength dependency of a chromatic dispersion slope, a method making compensation by splitting a wavelength band into a plurality of bands is also used.

Figure 25A:
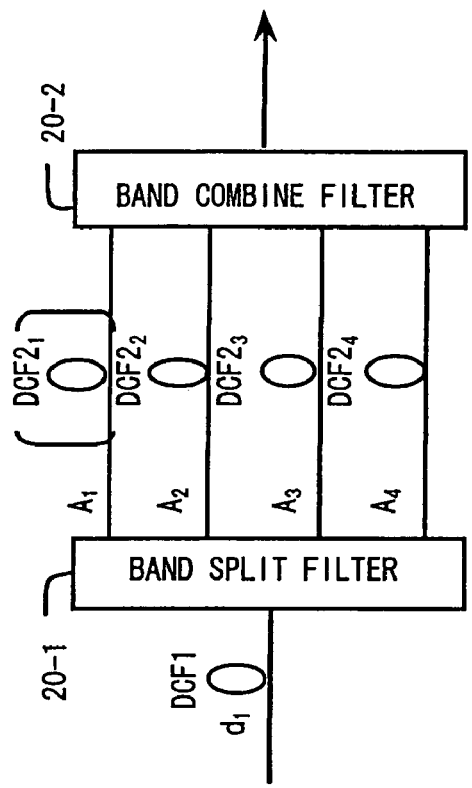
FIGS. 25A and 25B show the principle configurations in the case where a preferred embodiment according to the present invention is applied to an inline amplifier.
Figure 25B:
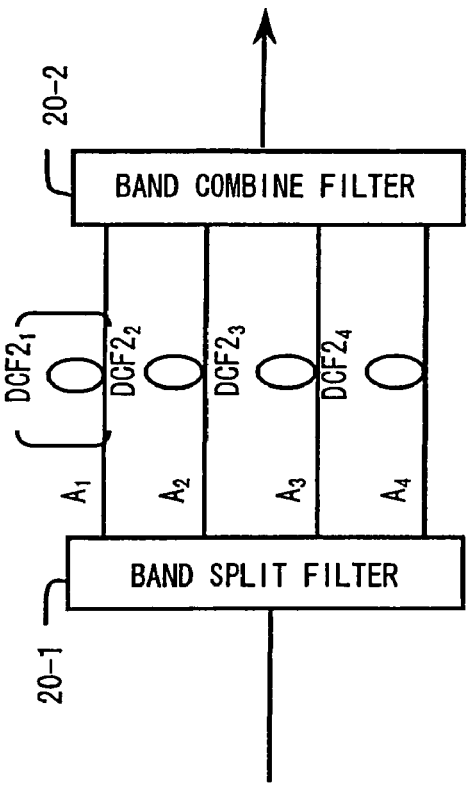
Figure 26:
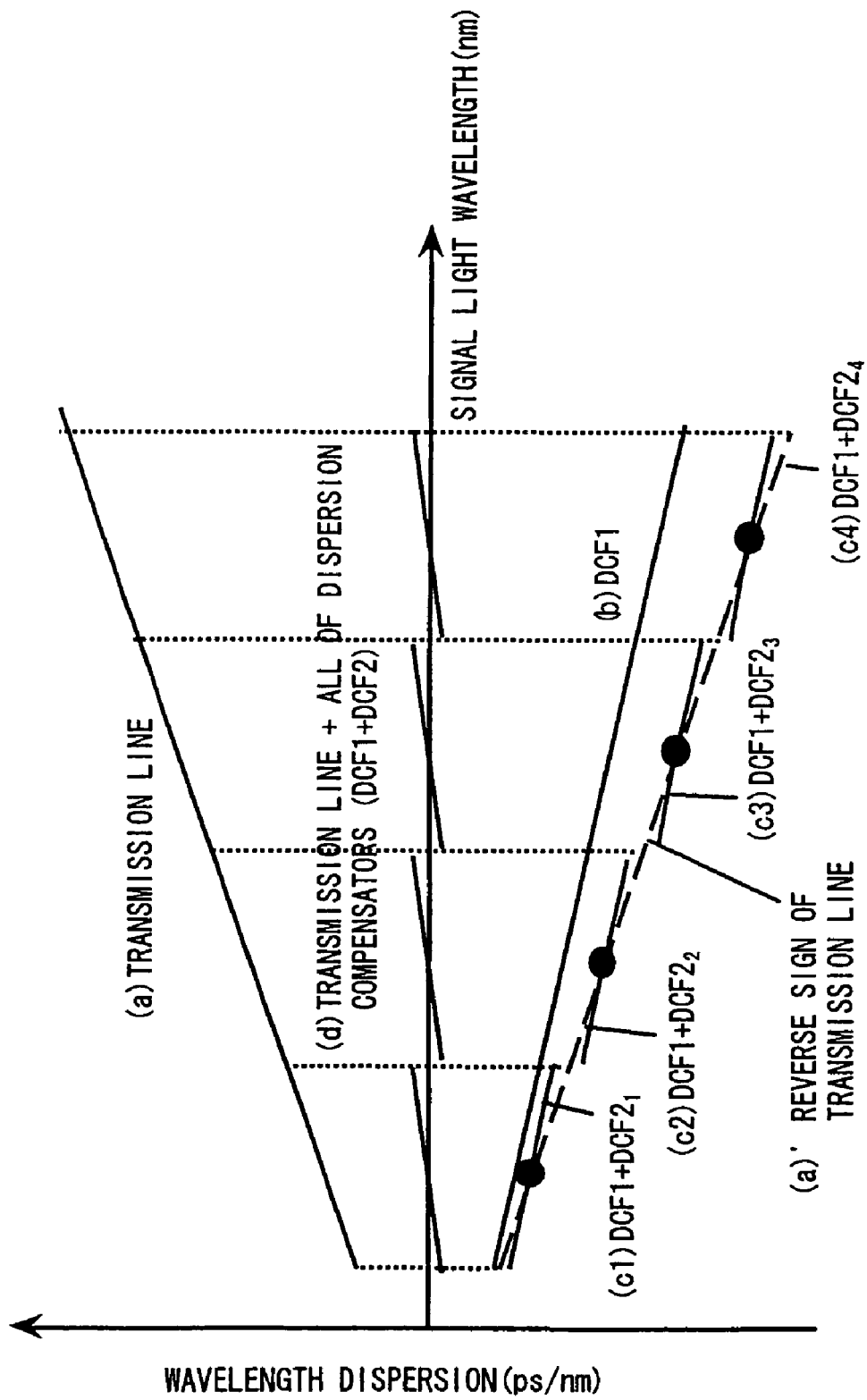
FIG. 26 explains the principle of a dispersion compensation method according to a preferred embodiment of the present invention (No. 1)
Figure 27:
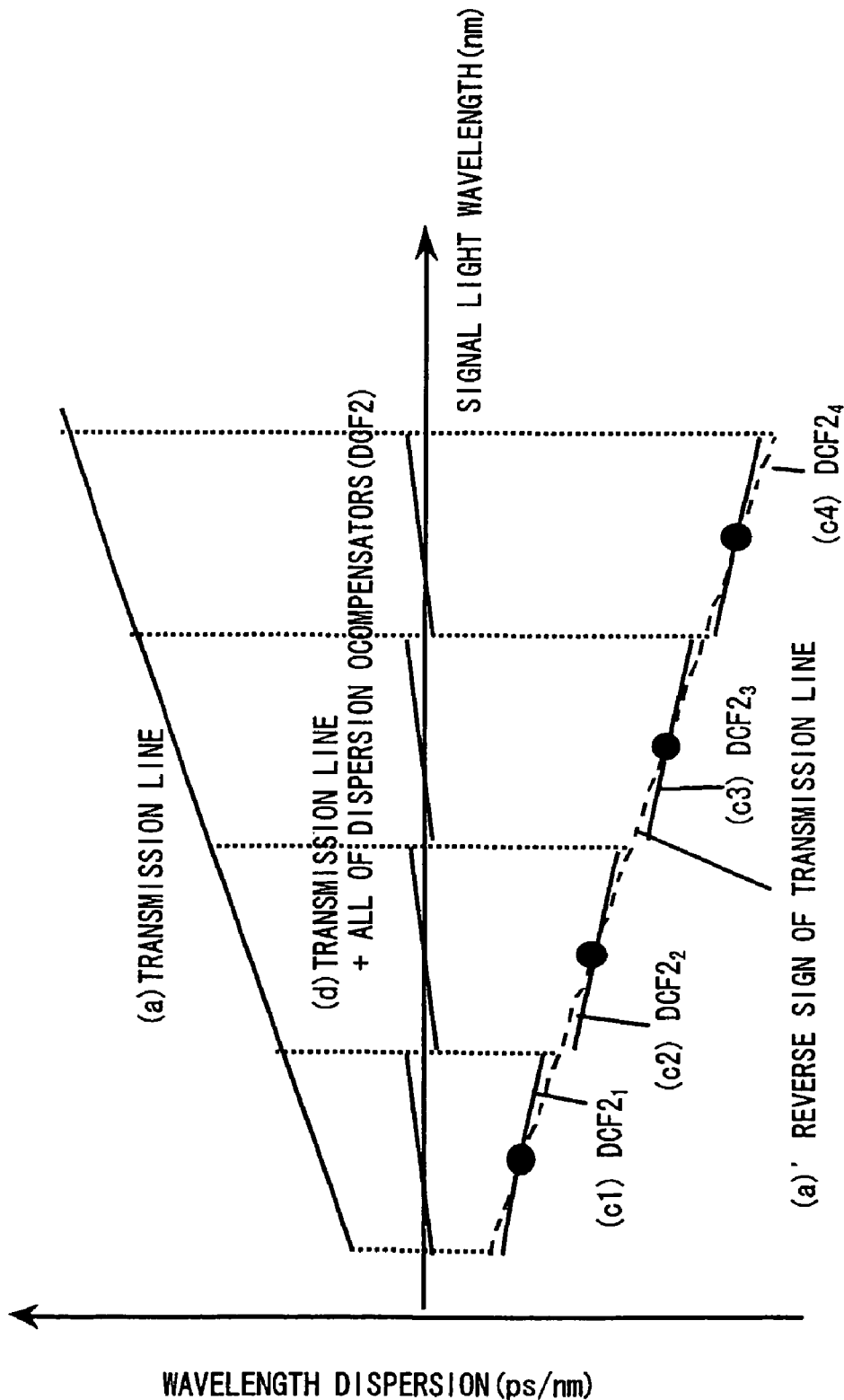
FIG. 27 explains the principle of a dispersion compensation method according to a preferred embodiment of the present invention (No. 2)

FIGS. 25A and 25B show the principle configurations in the case where a preferred embodiment according to the present invention is applied to an inline amplifier. FIGS. 26 and 27 explain the principle of a dispersion compensation method according to the preferred embodiment of the present invention.

FIG. 25A shows the fundamental configuration (the case where fixed dispersion compensators are applied) of compensation made by splitting a wavelength band into four bands. After a dispersion compensator DCF1 (dispersion compensation amount $d_1$) is arranged in common to all of channels of a wavelength multiplexed signal, the signal is split into four wavelength bands ($\Lambda_1$, $\Lambda_2$, $\Lambda_3$, and $\Lambda_4$ from a short wavelength side) by a band split filter 20-1. DCF$2_1$, DCF$2_2$, DCF$2_3$, and DCF$2_4$, which are intended to compensate for residual dispersion differences among the bands, are arranged in the respective bands. In each span or a plurality of spans, adjustment is made so that 100-percent dispersion compensation is made in central wavelengths of the respective wavelength bands by the fixed dispersion compensators DCF$2_1$, DCF$2_2$, DCF$2_3$, and DCF$2_4$ in the case of the residual dispersion characteristics of (a) a transmission line and (b) a DCF1 shown in FIG. 26. As a result, the residual dispersions of all of the channels can be reduced to small values (d). Not only a dispersion compensation fiber but also various types of devices such as a chirped fiber Bragg grating (CFBG), a VIPA dispersion compensator, etc. are applicable as a dispersion compensator. FIG. 25B shows the configuration where not a dispersion compensator DCF1 for making compensation collectively for all of channels, but only dispersion compensators for making adjustment for bands are applied. Its effect is similar to that in the case of FIG. 25A. However, dispersion compensators whose dispersion compensation amounts are large as shown in FIG. 27 must be applied as the fixed dispersion compensators DCF$2_1$, DCF$2_2$, DCF$2_3$, and DCF$2_4$.

The bands of the optical signals for which the dispersion compensation is made are coupled by a band split filter 20-2 (that also functions as an element for coupling bands because of the reversibility of light propagation, which is a characteristic of an optical element, although its name is band split), and the signal of the coupled bands is output.

FIG. 28 shows the configurations where the fixed dispersion compensators for the respective wavelength bands are replaced by variable dispersion compensators in correspondence with FIGS. 25A and 25B.

How to set a dispersion compensation amount is the same as those in FIG. 26 (the case of the configuration shown in FIG. 28A) and FIG. 27 (the case of the configuration shown in FIG. 28B). However, since the dispersion compensation amounts are variable, dispersion compensation with higher accuracy can be made, and besides, a dispersion amount that changes with time due to a temperature change in a transmission line, or the like can be coped with.

Namely, in FIG. 28A, after dispersion compensation is made for an input optical signal by a chromatic dispersion compensation fiber DCF1, the signal is split into respective bands $\Lambda_1$ to $\Lambda_4$ by a band split filter 20-1, and input to a band split filter 20-2. The band split filter 20-2 couples optical signals, which are split into the respective bands and input, and outputs the coupled signal as an optical signal of one band. FIG. 28B shows the configuration where a chromatic dispersion compensation fiber DCF1 that makes dispersion compensation collectively is omitted from the configuration shown in FIG. 28A.

According to the preferred embodiments of the present invention, dispersion compensation can be effectively made for all of channels at low cost and in less size in a dense wavelength multiplexing transmission system, even if manufacturing variations of chromatic dispersion/dispersion slope of a transmission line and a DCF are large, if slope compensation ratio of a DCF is low, or if residual dispersion derived from fourth order dispersion occurs. As a result, a long-haul transmission can be implemented.

FIGS. 29A to 33B exemplify specific configurations of an inline amplifier in the case of wavelength band split compensation.

Figure 29A:
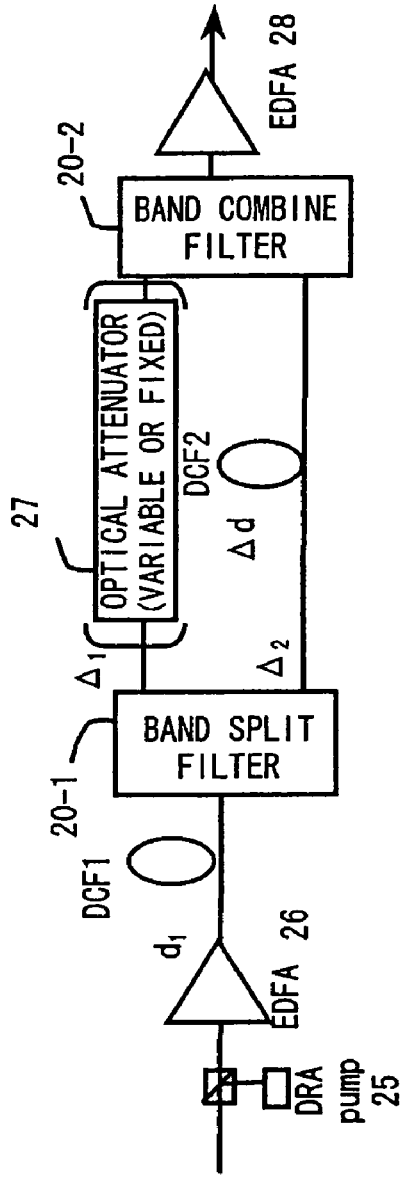
FIGS. 29A and 29B exemplify the configurations of a specific inline amplifier in the case where wavelength band split compensation is made (No. 1)

In FIG. 29A, a pump light source 25 for distributed Raman amplification is arranged, and an EDFA 26 is arranged in the next stage, so that an optical signal is amplified. After dispersion compensation is simultaneously made by a chromatic dispersion compensation fiber DCF1, a wavelength band is split into two bands $\Lambda_1$ and $\Lambda_2$ by a band split filter 20-1. Dispersion compensation is further made for one of the bands by a chromatic dispersion compensation fiber DCF2. For the band $\Lambda_1$, a (variable or fixed) optical attenuator 27 for providing a loss, which is almost equal to an optical loss produced by the chromatic dispersion compensation fiber DCF2, is arranged depending on need. After optical signals of the respective bands are coupled by a band split filter 20-2, the coupled signal is output, amplified by an EDFA 28, and output to a transmission line.

Figure 29B:
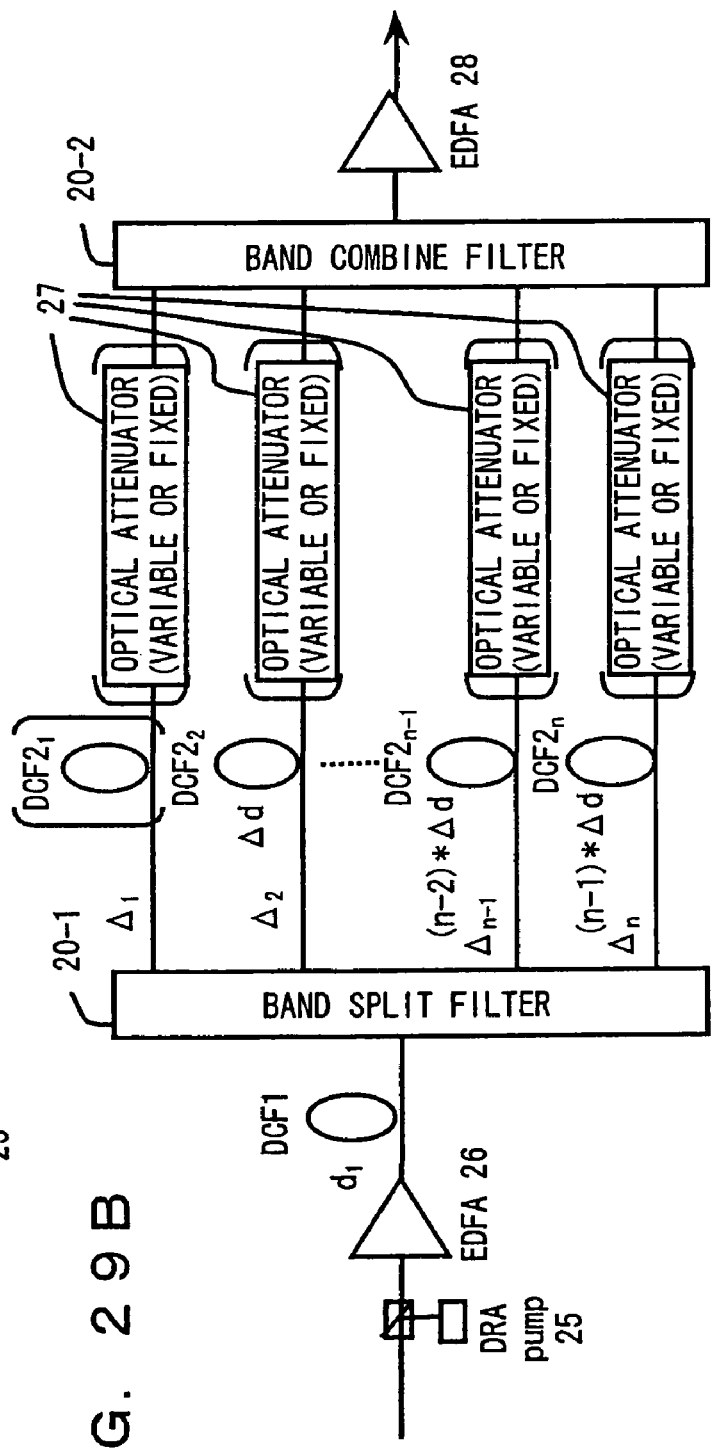

FIG. 29B shows the configuration where a wavelength band is split into n bands. The fundamental configuration is the same as that shown in FIG. 29A. Accordingly, the same constituent elements are denoted with the same reference numerals, and an explanation about the configuration is omitted.

FIGS. 29A and 29B exemplify the configurations where the inline amplifier is configured by the two-stage erbium-doped fiber optical amplifiers (EDFAs). Distributed Raman amplification (DRA) for improving an optical signal-to-noise ratio (OSNR) is made as occasion demands. FIG. 29A shows the configuration where a wavelength band is split into two bands. In this figure, a wavelength band is split into a blue band ($\Lambda_1$) on a short wavelength side and a red band ($\Lambda_2$) on a long wavelength side by using the band split filter. The dispersion compensator (DCF1) arranged in the stage preceding the band split filter is set so that chromatic dispersion is optimally compensated in a central channel of the blue band ($\Lambda_1$). Therefore, a dispersion compensator is not arranged on an optical path of the blue band ($\Lambda_1$). However, the variable or fixed optical attenuator for providing an optical loss that is almost equal to a dispersion compensator DCF2 is inserted on the optical path of the blue band depending on need. Assume that the dispersion slope of the transmission line fiber is S (ps/nm²/km), the slope compensation ratio of the DCF is $\beta$ (0 to 1), the wavelength difference between the central channels of the blue band ($\Lambda_1$) and the red band ($\Lambda_2$) is $\Delta\Lambda$ (nm), and the transmission line length per span is L (km). In this case, the residual dispersion difference between the central channels of the red band ($\Lambda_1$) and the blue band ($\Lambda_2$) per span becomes $S \cdot (1-\beta) \cdot \Delta\lambda \cdot L$. Accordingly, the dispersion compensation amount of the DCF for making adjustment may be set as follows: $\Delta d = -S \cdot (1-\beta) \cdot \Delta\lambda \cdot L$.

FIG. 29B shows the further expanded configuration where a wavelength band is split into n bands. The wavelength band is split into n bands from the short wavelength side to the long wavelength side, and the dispersion compensators for making adjustment, which are intended to optimize the dispersion compensation amounts in the respective signal bands after being split, DCF$2_1$, DCF$2_2$, . . . , DCF$2_{n-1}$, and DCF$2_n$ are arranged. The dispersion compensation amounts of the respective dispersion compensators are set to 0, $\Delta d$, . . . , $(n-2) \cdot \Delta d$, $(n-1) \cdot \Delta d$. Similar to FIG. 29A, the value of $\Delta d$ may be set as follows: $\Delta d = -S \cdot (1-\beta) \cdot \Delta\lambda \cdot L$ ($\Delta\lambda$ is the wavelength difference between the central channels of adjacent wavelength bands). In both of FIGS. 29A and 29B, a variable or fixed optical attenuator for compensating for a loss difference between wavelength bands is arranged depending on need.

Figure 30A:
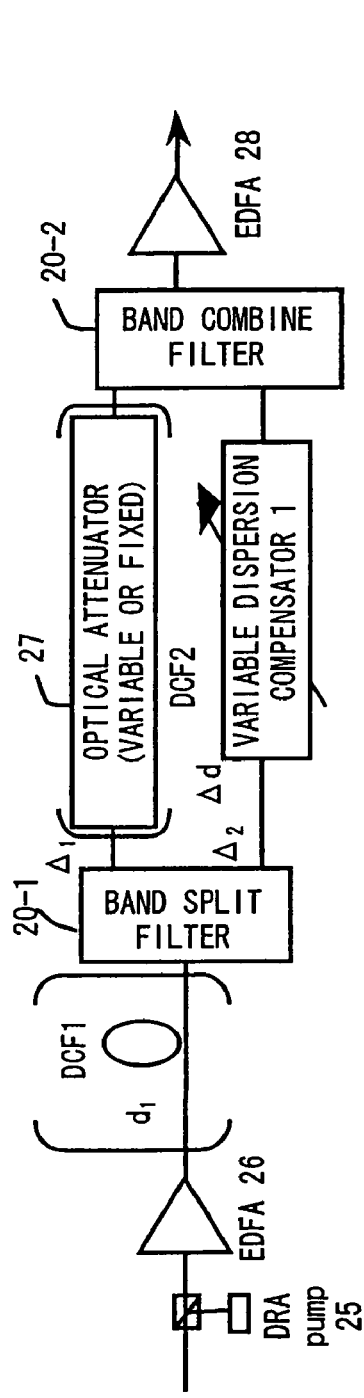
FIGS. 30A and 30B exemplify the configurations of a specific inline amplifier in the case where wavelength band split compensation is made (No. 2)
Figure 30B:
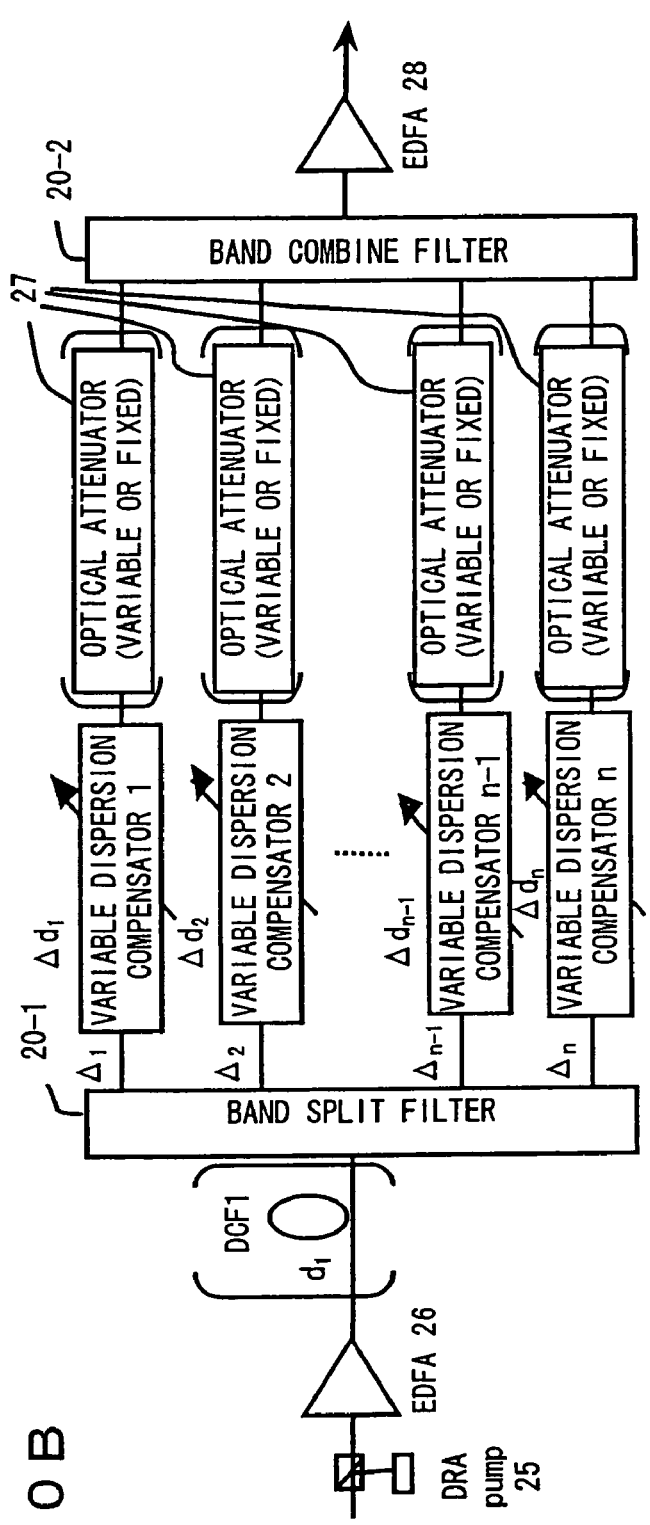

FIGS. 30A and 30B show the configurations where the fixed dispersion compensators for the respective wavelength bands in FIGS. 29A and 29B are replaced by variable dispersion compensators. Although how to set a dispersion compensation amount is the same as those in the configurations shown in FIGS. 29A and 29B, the dispersion compensation amount is variable. Accordingly, there are advantages that dispersion compensation with higher accuracy can be implemented, and that the dispersion amount that changes with time due to a temperature change in a transmission line can be coped with.

In FIG. 30A, after distributed Raman amplification (amplification by a pump light source 25), and amplification by an EDFA 26 are made, dispersion compensation for a blue band ($\Lambda_1$) is optimized by a DCF1. Then, a wavelength band is split by a band split filter 20-1. Dispersion compensation for a red band ($\Lambda_2$) is optimized by a variable dispersion compensator 1. An optical attenuator on the path of the blue band provides a loss that is almost equal to the loss of the variable dispersion compensator 1 to the optical signal of the blue band. This prevents a difference between the optical intensities of the optical signals of the blue and the red bands from occurring, when the optical signals are coupled by a band split filter. Then, the bands are coupled and output by a band split filter 20-2, amplified by an EDFA 28, and output to a transmission line.

In FIG. 30B, the DCFs shown in FIG. 29B are replaced by variable dispersion compensators. Since a dispersion value that a variable dispersion compensator 1 arranged for the band $\Lambda_1$ can compensate for is variable, a DCF1 in the stage preceding the band split filter may be arranged depending on need.

The configuration shown in FIG. 30B is similar to that shown in FIG. 30A except that the number of split bands is n. Therefore, the same constituent elements as those shown in FIG. 30A are denoted with the same reference numerals, and their explanations are omitted.

In FIGS. 31A and 31B, the same constituent elements as those of the above described configuration examples are denoted with the same reference numerals, and their explanations are omitted. FIGS. 31A and 31B exemplify the configurations where an inline amplifier is composed of a dispersion compensating fiber Raman amplification unit 30 (DCFRA: So called hereinafter is an amplification unit that makes Raman amplification by using a DCF as an amplification medium. The DCFRA makes optical amplification and dispersion compensation at the same time), and an EDFA 28 in a later stage. How to split a wavelength band signal, and how to arrange a dispersion compensation fiber for making adjustment are the same as those in FIGS. 29A and 29B. The DCFRA 30 is located before a band split filter, and adjusts the power and the wavelength of pumped light so as to provide a gain to all of wavelength bands ($\Lambda_1, \Lambda_2 \ldots \Lambda_n$). The number of stages of DCFRAs 30 may be 1, 2 or more according to a required gain as shown in FIGS. 31A and 31B. In both of FIGS. 31A and 31B, a variable or fixed optical attenuator for compensating for a loss difference between wavelength bands is arranged depending on need. Because the dispersion compensation of the band $\Lambda_1$ is made in the stage before the band split filter as described above, a DCF for this band may not be particularly arranged, and arranged if necessary from a design viewpoint.

In FIGS. 32A and 32B, the same constituent elements as those shown in FIGS. 31A and 31B are denoted with the same reference numerals, and their explanations are omitted. FIGS. 32A and 32B show the configurations where the fixed dispersion compensators for the respective wavelength bands in FIGS. 31A and 31B are replaced by variable dispersion compensators. How to set a dispersion compensation amount is the same as those in the configurations shown in FIGS. 31A and 31B. However, the dispersion compensation amount is variable. Therefore, dispersion compensation with higher accuracy can be implemented, and besides, the dispersion amount that changes with time due to a temperature change in a transmission line can be coped with. In FIG. 32A, dispersion compensation for a band $\Lambda_1$ is made by a DCF1 in an earlier stage or along with a DCF2 depending on need. Therefore, only a variable or fixed optical attenuator is arranged.

In FIG. 32B, a variable dispersion compensator 1 is arranged on the path of the band $\Lambda_1$. Therefore, if amplification of an optical signal is sufficient, DCF1 and DCF2 may be omitted.

Figures 33A, 33B:
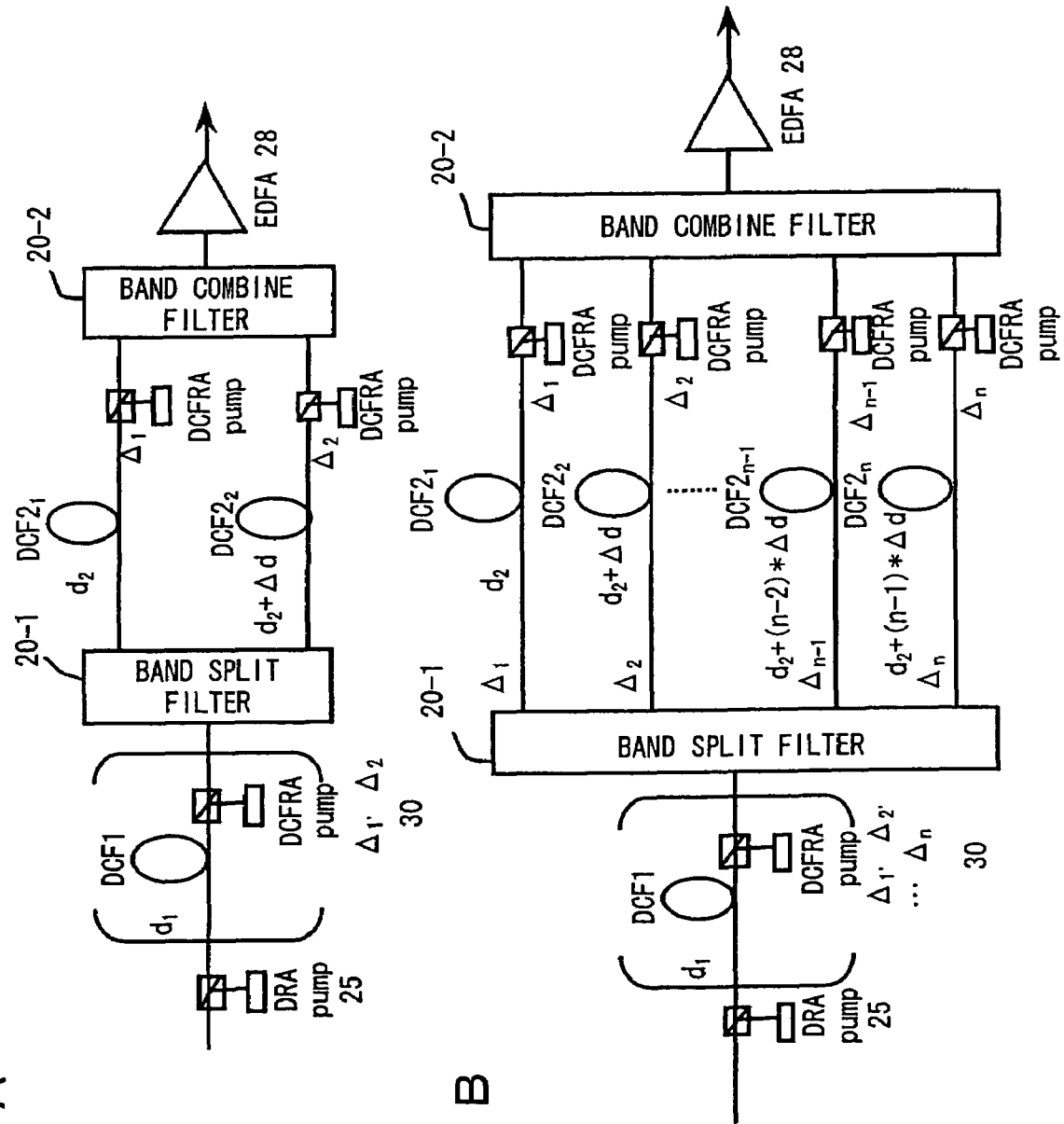
FIGS. 33A and 33B exemplify the configurations of a specific inline amplifier in the case where wavelength band split compensation is made (No. 5)

In FIGS. 33A and 33B, the same constituent elements as those shown in FIGS. 31A and 31B are denoted with the same reference numerals, and their explanations are omitted. FIGS. 33A and 33B exemplify the configurations where DCFRAs are arranged within a band split compensation unit, or arranged before and within the band split compensation unit. In FIG. 33A, a wavelength band is split into a blue band ($\Lambda_1$) on a short wavelength side, and a red band ($\Lambda_2$) on a long wavelength band by using a band split filter. Dispersion compensators $DCF2_1$ and $DCF2_2$, which are arranged within the band split compensation unit, respectively make adjustment so that sums $d_1+d_2$ and $d_1+d_2+\Delta d$ of their dispersion compensation amounts become optimal compensation amounts in central channels of the blue band ($\Lambda_1$) and the red band ($\Lambda_2$). Furthermore, their lengths are set to obtain sufficient Raman amplification gains on the compensators $DCF2_1$ and $DCF2_2$ themselves. Similar to FIG. 27, the dispersion compensation amount of the DCF may be set as follows: $\Delta d = -S \cdot (1-\beta) \cdot \Delta\lambda \cdot L$. Additionally, Raman amplification gains of the $DCF2_1$ and $CDF2_2$ can be adjusted so that the optical levels of wavelength bands become equal. Namely, by adjusting a Raman amplification gain, a function similar to that of an optical attenuator can be implemented.

FIG. 33B shows a further expanded configuration where a wavelength band is split into n bands. A wavelength band is split into n bands from the short wavelength side to the long wavelength side, and dispersion compensators for making adjustment $DCF2_1, DCF2_2, \ldots DCF2_{n-1}, DCF2_n$, which are intended to optimize dispersion compensation amounts for the respective signal bands after being split, are arranged. Dispersion compensation amounts of the respective dispersion compensators are set as follows: $d_2, d_2+\Delta d, \ldots d_2+(n-2)\cdot\Delta d, d_2+(n-1)\cdot\Delta d$. The value of $\Delta d$ may be set in a similar manner as in FIG. 33A: $\Delta d = -S \cdot (1-\beta) \cdot \Delta\lambda \cdot L$ ($\Delta\lambda$ is a wavelength difference between the central channels of adjacent wavelength bands). Furthermore, Raman amplification gains of $DCF2_1, DCF2_2, \ldots, DCF2_n$ are adjusted so that the optical levels of wavelength bands become equal.

Figure 34:
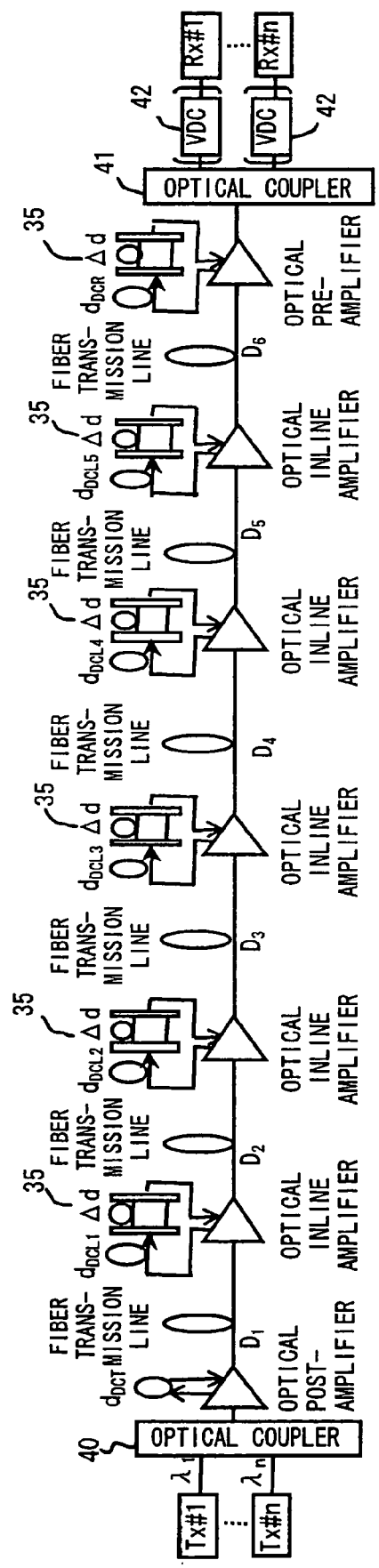
FIG. 34 exemplifies the configuration of a system using the inline amplifiers that make the band split compensation shown in FIGS. 29 to 33 (No. 1)
Figure 35:
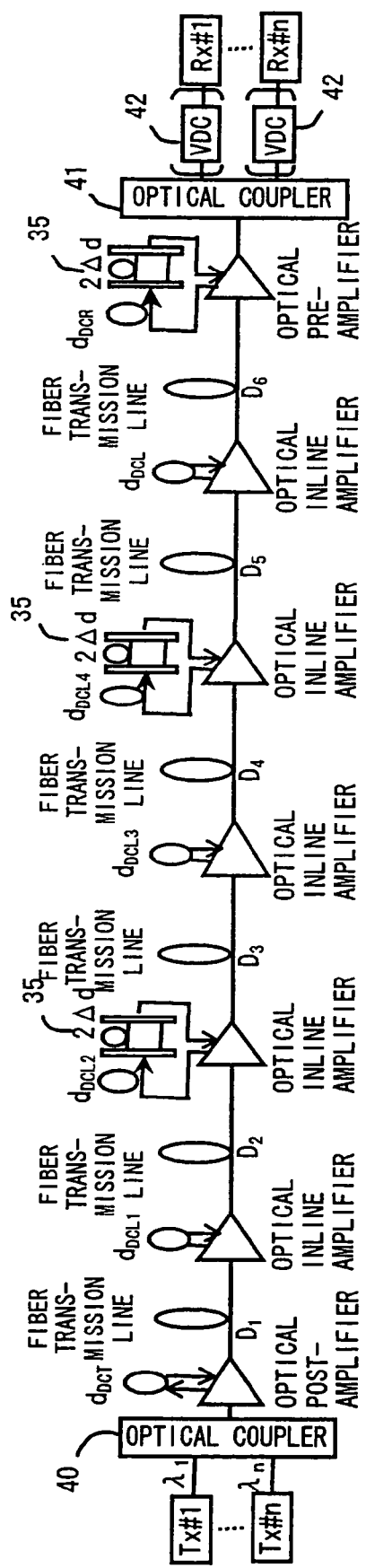
FIG. 35 exemplifies the configuration of a system using the inline amplifiers that make the band split compensation shown in FIGS. 29 to 33 (No. 2)
Figure 36:
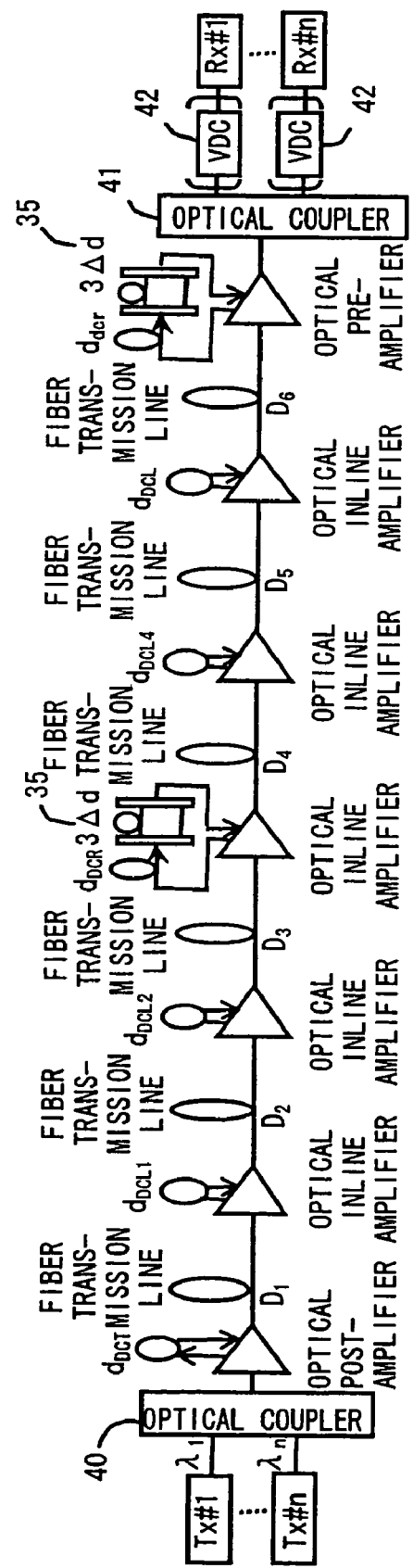
FIG. 36 exemplifies the configuration of a system using the inline amplifiers that make the band split compensation shown in FIGS. 29 to 33 (No. 3)

FIGS. 34 to 36 exemplify the configurations of a system using inline amplifiers that make band split compensation shown in FIGS. 29 to 33.

These figures show the examples of a 6-span transmission. A similar configuration can be implemented also for spans the number of which is different. Additionally, these figures show the examples in the case where a wavelength band is split into two bands. However, a similar configuration can be implemented also when a wavelength band is split into a larger number of bands.

In FIG. 34, band split compensation is made by each of inline amplifiers 35 according to the above described preferred embodiments of the present invention, and a difference of $\Delta d$ between the dispersion compensation amounts of split bands is provided. Optical signals of respective wavelengths, which are output from transmitters Tx #1 to #n, are coupled by an optical coupler 40, and output to a transmission line. Over the transmission line, the optical signal is relayed by the inline amplifiers 35, and split into the respective wavelengths by an optical coupler 41. The optical signals then pass through arbitrarily arranged variable dispersion compensators 42, and are received by receivers Rx #1 to #n.

In FIGS. 35 and 36, the same constituent elements as those shown in FIG. 34 are denoted with the same reference numerals, and their explanations are omitted. In FIG. 35, band split compensation is made every 2 spans, and a difference of $2\Delta d$ between the dispersion compensation amounts of split bands is provided. In FIG. 36, band split compensation is made every 3 spans, and a difference of $3\Delta d$ between the dispersion compensation amounts of split bands is provided. As the configuration of every 3 spans in FIG. 36 gets closer to that of every 1 span in FIG. 34, residual dispersion in an inline amplifier is reduced to a smaller value. Therefore, wavelength degradation caused by chromatic dispersion and non-linear effects of a fiber is suppressed. However, since the number of split compensation units becomes large, the cost and the size increase, which is disadvantageous from the viewpoint of securing an optical signal-to-noise ratio (OSNR). Actual arrangement locations of band split units must be determined in consideration of such a trade-off in an entire system.

A preferred embodiment for determining how to set a dispersion compensation amount in an inline section is explained below.

For the above described (1) variations of the length of a transmission line and (2) manufacturing variations of a chromatic dispersion coefficient, a chromatic dispersion amount (of all of sections or each inline section) of an installed fiber transmission line must be actually measured, and a dispersion compensating fiber having a chromatic dispersion amount that suits the measured amount must be installed. However, since there is the problem of (2) manufacturing variations of a dispersion slope, strict dispersion compensation cannot be made for other channels even if chromatic dispersion is strictly compensated for one channel (such as a central channel). To make strict dispersion compensation, a method securing as large dispersion tolerance as possible in each span, and making strict dispersion compensation for all of channels at a receiver side is effective.

FIGS. 37A to 37C show a Q penalty (a degradation amount of a Q value) against residual dispersion (a total dispersion amount of a transmission line and a dispersion compensator) in the case of an inline dispersion compensation ratio $D_{DCL}=100$ percent and 114 percent in a 600-km SMF transmission (100 km×6 spans).

Here, the Q penalty is a difference between a back-to-back value of a Q value and the Q value after being transmitted over a transmission line. The Q value is a value obtained by dividing a sum of a standard deviation of a sample distribution on the side of "1" and that on the side of "0" by the amplitude of signals at the centers of the sample distributions between the sides of "1" and "0", when an eye pattern is obtained by converting an optical signal waveform into an electric signal, and a cross section of the eye is vertically taken at the center of the eye.

FIG. 37A plots the Q penalty against a total residual dispersion value. FIG. 37B shows an eye pattern when residual dispersion is made zero at a receiving end in the case where an inline dispersion compensation amount is set to compensate for a propagation dispersion amount by 100 percent. FIG. 37C shows an eye pattern in the case where the inline dispersion compensation ratio is set to compensate for the propagation dispersion amount by 114 percent.

As is evident from FIGS. 37A to 37C, wavelength degradation and the Q penalty in the case of the 114-percent over-compensation are smaller than those in the case of the 100-percent dispersion compensation (complete wavelength deformation is more advantageous). However, the residual dispersion must be strictly made zero by adjusting the dispersion compensation amount ($D_{DCR}$) at a receiving end. Note that, however, $D_{DCT}$ may be optimized to a different value depending on a difference in a transmission condition (fiber type, transmission distance, bit rate, etc.).

FIG. 38 shows a Q penalty characteristic against an inline dispersion compensation residual amount (the dispersion amount of a transmission line per span+the residual dispersion amount of an inline DCF) in the case where the residual dispersion is made zero by adjusting the dispersion compensation amount ($D_{DCR}$) at the receiving end in each case in a 600-km SMF transmission (100 km×6 spans).

It can be verified that over-compensation (an inline dispersion compensation residual amount is negative) makes the penalty smaller for an inline DCF. Furthermore, it is proved that a tolerance (approximately 400 ps/nm when a 1.5 dB penalty is allowed), which is considerably larger than the dispersion tolerance (approximately 70 ps/nm) of a 40-Gb/s signal, can be secured.

Here, a dispersion shift amount $\Delta D$ is given by the following equation.

$$\Delta D(\text{ps/nm}) = (\text{dispersion amount per span}(\text{ps/nm})) \times (1 - \text{dispersion compensation ratio})$$

Here, dispersion compensation rate=(percentage of dispersion compensation ratio)/100. In the case shown in FIG. 38, (dispersion amount per span (ps/nm))=(17 (ps/nm/km))×(100 (km) (per span))=(1700 (ps/nm)).

Especially, the Q penalty is good in the neighborhood of −200 ps/nm, where the inline dispersion compensation amount corresponds to the approximately 114-percent compensation, and an especially good characteristic is obtained in a range from approximately 105-percent compensation to approximately 120-percent compensation.

Accordingly, according to the preferred embodiments of the present invention, dispersion compensation for all of channels can be effectively made at low cost and in less size in an ultrahigh-speed wavelength multiplexing transmission system, even if manufacturing variations of chromatic dispersion/dispersion slope of a transmission line and a DCF are large, if a slope compensation rate of a CCF is low, or if residual dispersion derived from the wavelength dependency of a dispersion slope occurs. As a result, a long-haul transmission can be implemented. FIG. 39 exemplifies a first configuration corresponding to a preferred embodiment for optimizing an inline dispersion compensation amount.

In this figure, the same constituent elements as those shown in FIG. 34 are denoted with the same reference numerals, and their explanations are omitted.

If dispersion amounts in central channels in respective inline relay sections are actually measured as $D_1, D_2, \ldots, D_{n-1}, D_n$, dispersion compensation amounts of inline amplifiers ILA1, ILA2, and ILA(n−1) are set as follows: $d_{DCL1} = -(1+\gamma) \cdot D_1$, $d_{DCL2} = -(1+\gamma) \cdot D_2, \ldots, d_{DCL(n-1)} = -(1+\gamma) \cdot D_{n-1}$. $\gamma$ is an over-compensation rate of a dispersion compensation amount, and typically 0.10 to 0.15 (10 to 15 percent). At a transmitting end, a dispersion compensation (dispersion compensation in an optical post-amplifier) DCT (dispersion compensation amount $d_{DCT}$) for improving a transmission characteristic can possibly be arranged ($d_{DCT}$=0 as a typical value (not arranged)). To set the residual dispersion (the total dispersion amount of the transmission line and the dispersion compensator) to $D_{RD}$ (zero as a typical value) by making up for the over-compensation of the dispersion inline amplifier, the dispersion compensation amount at the receiver side of a reception dispersion compensator DCR of an optical pre-amplifier is set to $\gamma(D_1+D_2+\ldots+D_{n-1})-d_{DCT}-D_n+D_{RD}$.

If the dispersion amount of spans are equal ($D_1=D_2=\ldots=D_{n-1}=D_n=D$), $((n-1)\gamma-1)D - d_{DCT} + D_{RD}$ is obtained. Furthermore, a variable dispersion compensator for adjusting various types of dispersion variations or changes with time can possibly be arranged for each channel or all of channels.

Figure 40:
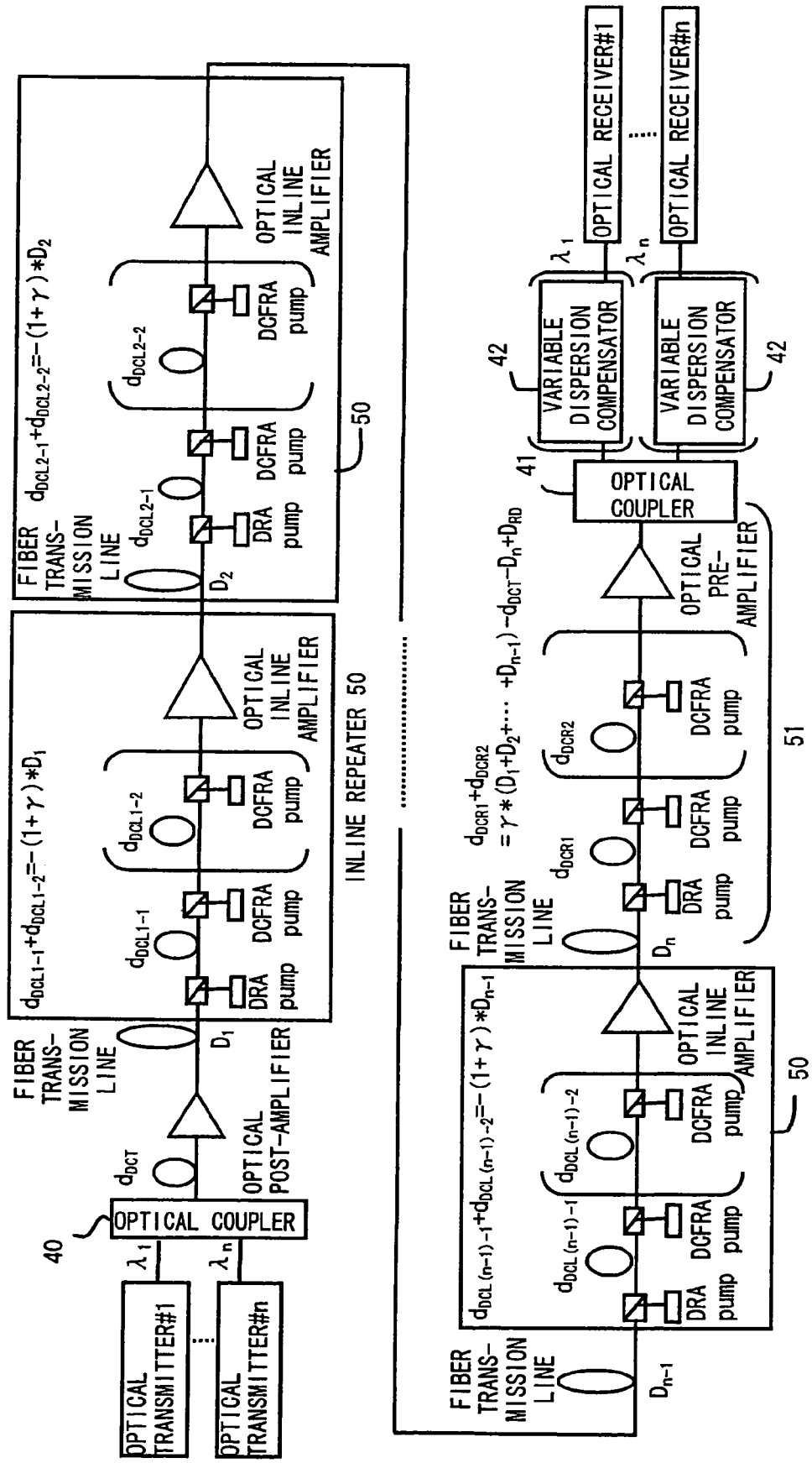
FIG. 40 shows a further specific example of the configuration shown in FIG. 39.

FIG. 40 shows one example of a further specific configuration.

In this figure, the same constituent elements as those shown in FIG. 39 are denoted with the same reference numerals.

In each of inline amplifiers 50, distributed Raman amplification (DRA) and dispersion compensating fiber Raman amplification (DCFRA) using a DCF are made. The number of stages of DCFRA units can possibly be one or more according to a required gain. In either case, the length of each DCF is adjusted so that the sum of dispersion compensation amounts of DCFs becomes equal to the dispersion compensation amount shown in FIG. 39, and a required value or larger of the Raman amplification gain of each DCF can be secured. At that time, an over-compensation rate $\gamma$ of the dispersion compensation amount must be set not to be too large so as to secure the length which uses the Raman gain at the receiving end DCF as a required amount.

A repeater 51 at a receiving end has fundamentally the same configuration as that of the inline amplifier 50. However, an optical amplifier is an optical pre-amplifier, which makes amplification for detecting a signal at the receiving end.

FIG. 41 exemplifies the configuration implemented by combining band split dispersion compensation and inline over-compensation.

In this figure, the same constituent elements as those shown in FIG. 40 are denoted with the same reference numerals, and their explanations are omitted.

For respective inline amplifiers 50, dispersion compensation fibers DCL1 to DCL(n−1) for making over-compensation are arranged, and over-compensations of $d_{DCL1}$ to $d_{DCLn-1}$ are made. Furthermore, band split filters are arranged at a stage after the dispersion compensation fibers, which respectively make dispersion compensation for bands.

A dispersion compensator arranged within an optical pre-amplifier at a receiving end makes dispersion compensation so that residual dispersion becomes zero in the dispersion compensation fiber DCR and the band split dispersion compensator in the stage after the dispersion compensation fiber.

Or, after a wavelength multiplexed optical signal may be demultiplexed into optical signals of respective wavelengths, fine adjustment may be respectively made for dispersion compensation by arranging variable dispersion compensators.

According to the present invention, dispersion compensation can be effectively made at low cost and with high accuracy in a wavelength multiplexed optical communication.

What is claimed is:

1. A chromatic dispersion compensating apparatus for use in a multi-span optical transmission system, comprising:
   a dispersion compensating unit making 105- to 120-percent over-compensation for a chromatic dispersion amount of each span in each inline amplifier; and
   a variable compensating unit compensating a chromatic dispersion to approach zero dispersion at an optical receiver using a variable dispersion compensator,
   wherein compensation is made so that a total chromatic dispersion amount is close to zero at the optical receiver in the multi-span optical transmission system.

2. The chromatic dispersion compensating apparatus according to claim 1, wherein
   dispersion compensation amounts within each inline amplifier and at the receiver side are set based on chromatic dispersion amount information of each span of a central channel of a wavelength-division multiplexed optical signal.

* * * * *

UNITED STATES PATENT AND TRADEMARK OFFICE
CERTIFICATE OF CORRECTION

PATENT NO. : 7,751,706 B2
APPLICATION NO. : 12/292019
DATED : July 6, 2010
INVENTOR(S) : Hiroki Ooi et al.

Page 1 of 1

It is certified that error appears in the above-identified patent and that said Letters Patent is hereby corrected as shown below:

Title Page, Item (57) Abstract: Line 1 delete "ad" and insert --and--, therefor.

Signed and Sealed this
Twenty-eighth Day of December, 2010

David J. Kappos
*Director of the United States Patent and Trademark Office*